(12) United States Patent
Yang et al.

(10) Patent No.: US 7,353,252 B1
(45) Date of Patent: Apr. 1, 2008

(54) SYSTEM FOR ELECTRONIC FILE COLLABORATION AMONG MULTIPLE USERS USING PEER-TO-PEER NETWORK TOPOLOGY

(75) Inventors: Albert Chih-Chieh Yang, Billerica, MA (US); Charles White, Alexandria, LA (US)

(73) Assignee: Sigma Design, Alexandria, LA (US)

( * ) Notice: Subject to any disclaimer, the term of this patent is extended or adjusted under 35 U.S.C. 154(b) by 817 days.

(21) Appl. No.: 10/188,364

(22) Filed: Jul. 3, 2002

Related U.S. Application Data

(63) Continuation-in-part of application No. 10/146,133, filed on May 16, 2002, now abandoned.

(60) Provisional application No. 60/302,673, filed on Jul. 5, 2001, provisional application No. 60/290,972, filed on May 16, 2001.

(51) Int. Cl.
G06F 15/16 (2006.01)
(52) U.S. Cl. .................................... 709/204
(58) Field of Classification Search ........ 709/204–205; 715/753, 848
See application file for complete search history.

(56) References Cited

U.S. PATENT DOCUMENTS

| | | | |
|---|---|---|---|
| 4,780,821 A | 10/1988 | Crossley | 364/200 |
| 5,495,522 A | 2/1996 | Allen et al. | 379/202 |
| 5,617,539 A | 4/1997 | Ludwig et al. | 395/200.02 |
| 5,638,523 A | 6/1997 | Mullet et al. | 395/326 |
| 5,694,544 A * | 12/1997 | Tanigawa et al. | 709/204 |
| 5,724,508 A * | 3/1998 | Harple et al. | 709/205 |
| 5,727,002 A | 3/1998 | Miller et al. | 371/32 |
| 5,740,421 A | 4/1998 | Palmon | 395/604 |
| 5,758,079 A | 5/1998 | Ludwig et al. | 395/200.34 |
| 5,854,893 A | 12/1998 | Ludwig et al. | 395/200.34 |
| 5,872,924 A * | 2/1999 | Nakayama et al. | 709/205 |
| 5,875,110 A | 2/1999 | Jacobs | 364/479.02 |
| 5,904,485 A | 5/1999 | Siefert | 434/322 |
| 5,915,091 A | 6/1999 | Ludwig et al. | 395/200.34 |
| 5,918,039 A | 6/1999 | Buswell et al. | 395/527 |
| 5,920,694 A * | 7/1999 | Carleton et al. | 709/205 |
| 5,978,835 A * | 11/1999 | Ludwig et al. | 709/204 |
| 5,991,780 A | 11/1999 | Rivette et al. | 707/512 |
| 5,996,054 A | 11/1999 | Ledain et al. | 711/203 |
| 5,999,525 A | 12/1999 | Krishnaswamy et al. | 370/352 |
| 6,026,377 A | 2/2000 | Burke | 705/27 |
| 6,047,054 A | 4/2000 | Bayless et al. | 379/202 |
| 6,100,873 A | 8/2000 | Bayless et al. | 345/150 |
| 6,131,121 A | 10/2000 | Mattaway et al. | 709/227 |

(Continued)

Primary Examiner—Phuoc Nguyen
(74) Attorney, Agent, or Firm—Roylance, Abrams, Berdo & Goodman, L.L.P.

(57) ABSTRACT

A system for electronic file collaboration among multiple users is implemented using command messages transmitted on dedicated network channels established between conference participants in a peer-to-peer architecture with total autonomy from a central server. The system employs owner-in-control methodology to allow direct transmission of copies of documents among participants by permission, and to prevent storage of copies of documents used in a conference by participants. Mark-ups, additions, and other actions occurring on a conference document can only be saved by the document owner. An advanced viewer engine is provided for reading, displaying and manipulating electronic data in texts, tables, vectors and 3D model formats, as well as common raster images. A proxy module allows data transmitted through IPFW routers or firewall devices with sufficient authentications and security measures.

8 Claims, 65 Drawing Sheets

U.S. PATENT DOCUMENTS

| | | |
|---|---|---|
| 6,151,620 A | 11/2000 | Madsen et al. ............. 709/204 |
| 6,151,621 A * | 11/2000 | Colyer et al. ............... 709/204 |
| 6,154,465 A | 11/2000 | Pickett ....................... 370/466 |
| 6,166,727 A * | 12/2000 | Kozuka ...................... 709/235 |
| 6,167,432 A * | 12/2000 | Jiang .......................... 709/204 |
| 6,173,332 B1 | 1/2001 | Hickman .................... 709/235 |
| 6,192,118 B1 | 2/2001 | Bayless et al. ............. 379/201 |
| 6,195,683 B1 | 2/2001 | Palmer et al. .............. 709/204 |
| 6,205,716 B1 | 3/2001 | Peltz .......................... 52/36.2 |
| 6,212,547 B1 | 4/2001 | Ludwig et al. ............. 709/204 |
| 6,219,087 B1 | 4/2001 | Uiterwyk et al. ........ 348/14.08 |
| 6,574,674 B1 * | 6/2003 | May et al. ................... 709/204 |
| 6,731,314 B1 * | 5/2004 | Cheng et al. ............... 715/848 |
| 6,738,076 B1 * | 5/2004 | Mandavilli et al. ......... 715/733 |
| 6,809,749 B1 * | 10/2004 | Chen et al. ................. 715/753 |
| 6,898,642 B2 * | 5/2005 | Chafle et al. ............... 709/248 |

* cited by examiner

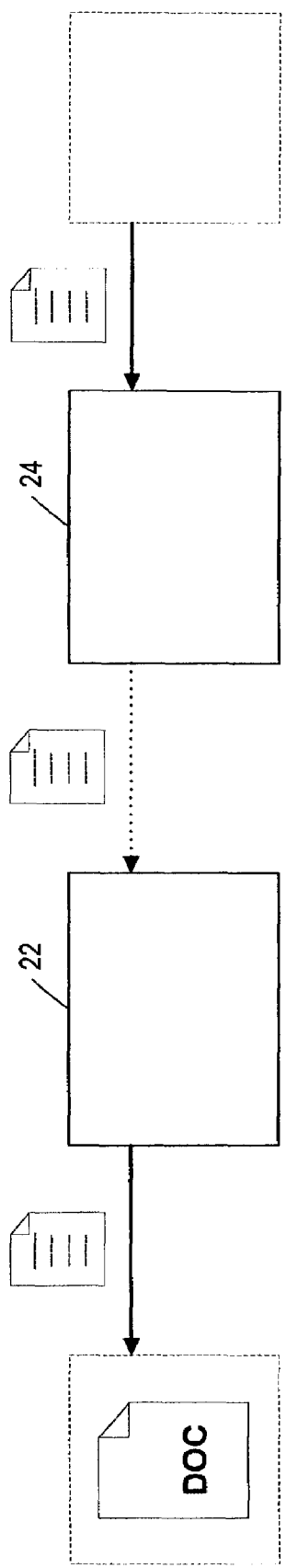
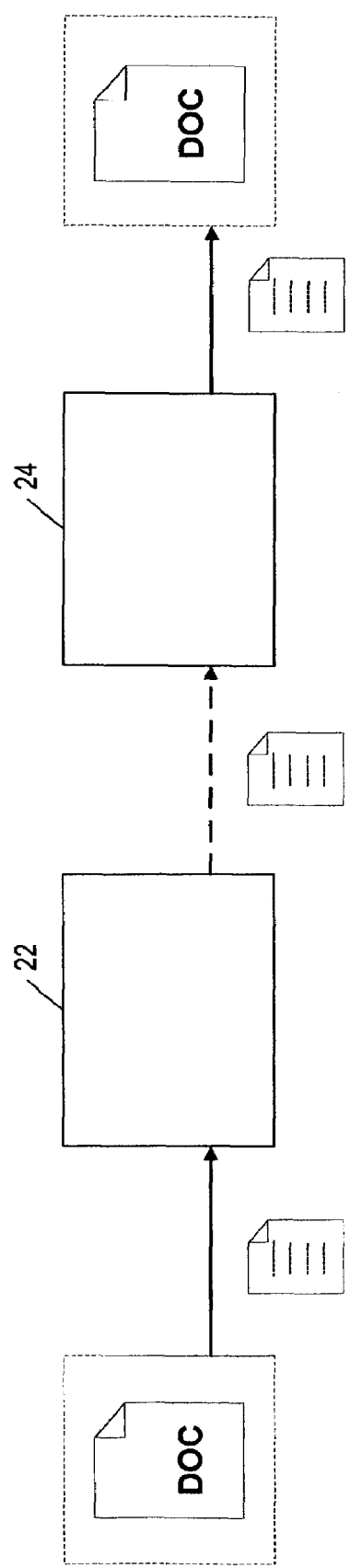
FIG. 10A
FIG. 10B

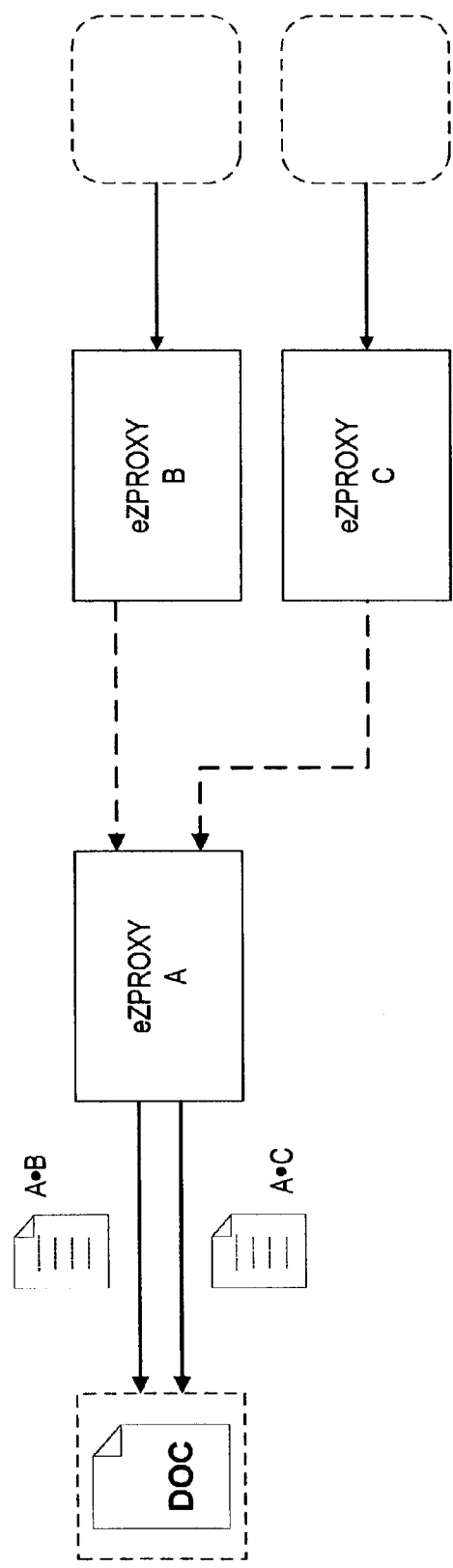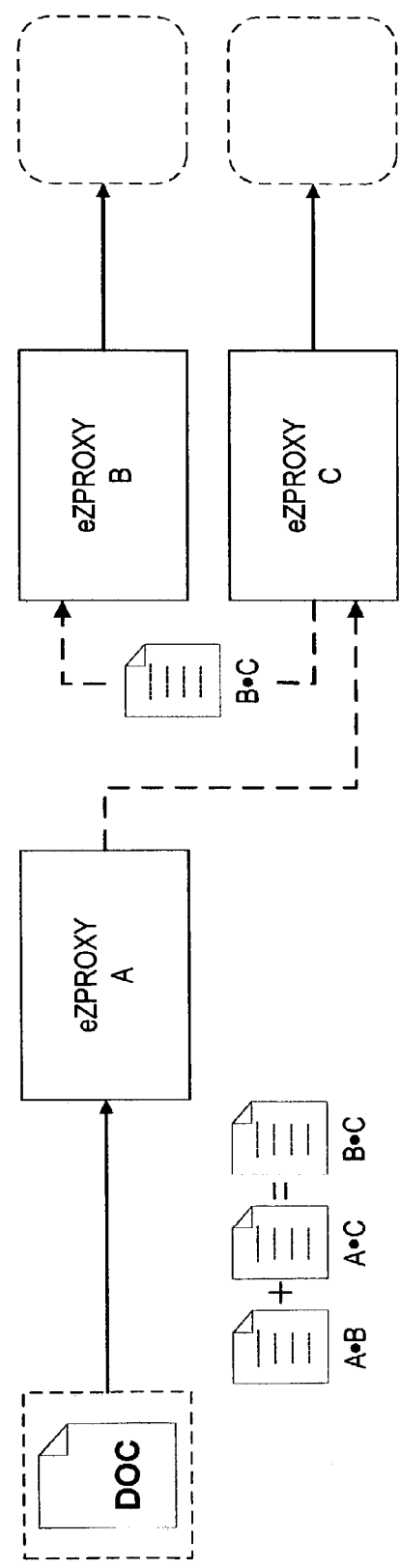
FIG. 11A
FIG. 11B

EDIT MENU > EDIT OBJECT

EDIT MENU > DELETE ALL OBJECTS

EDIT MENU > INSERT MARKUP

CONFERENCE MENU > JOIN > LOCAL

CONFERENCE MENU > JOIN > CHANNEL

CONFERENCE MENU > JOIN >INTERNET

CONFERENCE MENU > JOIN (LIST OF ACTIVE CONFERENCES)

CONFERENCE MENU > MEMBERS

CONFERENCE MENU > SET PASSWORD

CONFERENCE MENU > MY ADDRESS

CAPTURE MENU

VIEW MENU > TOOLBARS

VIEW MENU > CHANGE VIEW

DOCUMENT MENU > DELETE SECTION

RENDERING MENU

WINDOW MENU eZ eZMEETING - ALPHA

File  Edit  Conference  Snapshot  Tools  Help

PROJECT GROUPS                SEARCH [MESSAGES ▼] [        ] FIND     ADVANCED SEARCH

< PREVIOUS GROUP | NEXT GROUP >

*NAME OF CURRENT GROUP*
CREATED BY: OWNER NAME
CREATED ON: 02/02/02

⊕ CONTROL CENTER
⊕ START CONFERENCE
○ VIEW CONTACT LIST

| CONFERENCE ARCHIVE | MEMBERS | SCHEDULE | CHATS | FILES | MESSAGES | | |
|---|---|---|---|---|---|---|---|
| | | | | | < PREVIOUS 25 | 1-15 OF 32 | NEXT 7 > | | |
| CONFERENCE TITLE | DATE | DURATION | HOST | | PARTICIPANTS | SECTIONS | |
| MARKETING CAMPAIGN | 02/02/02 | 1 HR 03 MINS | CLARE | | 2 | 12 | |
| PRODUCT REVIEW | 02/02/02 | 57 MINS | LUCY | | 5 | 3 | |
| COMPETITIVE ANALYSIS | 02/02/02 | 1 HR 23 MINS | ANDY | | 4 | 5 | |
| CUSTOMER SURVEY | 02/02/02 | 32 MINS | ROSLYN | | 1 | 4 | |
| MARKETING CAMPAIGN | 02/02/02 | 12 MINS | THOMAS | | 8 | 8 | |
| PRODUCT REVIEW | 02/02/02 | 57 MINS | DOMINIC | | 5 | 9 | |
| COMPETITIVE ANALYSIS | 02/02/02 | 05 MINS | DAISY | | 3 | 1 | |
| CUSTOMER SURVEY | 02/02/02 | 1 HR 03 MINS | JESS | | 4 | 5 | |
| MARKETING CAMPAIGN | 02/02/02 | 57 MINS | KATE | | 5 | 17 | |
| PRODUCT REVIEW | 02/02/02 | 1 HR 23 MINS | PETER | | 2 | 6 | |
| COMPETITIVE ANALYSIS | 02/02/02 | 32 MINS | HILLARY | | 4 | 21 | |
| CUSTOMER SURVEY | 02/02/02 | 12 MINS | URSULA | | 2 | 4 | |
| MARKETING CAMPAIGN | 02/02/02 | 57 MINS | GEORGE | | 6 | 2 | |
| PRODUCT REVIEW | 02/02/02 | 05 MINS | FREDERICK | | 4 | 7 | |

⊕ USER TO GROUP
⊕ FILE TO GROUP
⊕ SCHEDULED ITEM
⊕ MESSAGE THREAD
⊖ USER FROM GROUP
⊖ FILE FROM GROUP
◀ SETTINGS
◀ GROUP PROFILE

MANAGER / CONFERENCE

*FIG. 56* eZ eZMEETING - ALPHA

FILE  EDIT  CONFERENCE  SNAPSHOT  TOOLS  HELP

PROJECT GROUPS   SEARCH [MESSAGES ▼]   [FIND]   ADVANCED SEARCH

< PREVIOUS GROUP | NEXT GROUP >

*NAME OF CURRENT GROUP*
CREATED BY: OWNER NAME
CREATED ON: 02/02/02

[ALL MY GROUPS ▼]

⊕ CONTROL CENTER
⊕ START CONFERENCE
○ VIEW CONTACT LIST

CONFERENCE ARCHIVE | MEMBERS | SCHEDULE | CHATS | FILES | MESSAGES

< PREVIOUS 25 | 1-15 OF 32 | NEXT 7 >

| HOST | STATUS | IN GROUP SINCE | FILES OWNED | HOSTED | PARTICIPATED |
|---|---|---|---|---|---|
| CLARE | ONLINE | 02/02/02 | 2 | 12 | 2 |
| LUCY | ONLINE | 02/02/02 | 3 | 3 | 5 |
| ANDY | OFFLINE | 02/02/02 | 4 | 5 | 4 |
| ROSLYN | ONLINE | 02/02/02 | 5 | 4 | 1 |
| THOMAS | ONLINE | 02/02/02 | 12 | 8 | 8 |
| DOMINIC | ONLINE | 02/02/02 | 32 | 9 | 5 |
| DAISY | OFFLINE | 02/02/02 | 4 | 1 | 3 |
| JESS | OFFLINE | 02/02/02 | 2 | 5 | 4 |
| KATE | OFFLINE | 02/02/02 | 5 | 17 | 5 |
| PETER | ONLINE | 02/02/02 | 9 | 6 | 2 |
| HILLARY | ONLINE | 02/02/02 | 5 | 21 | 4 |
| URSULA | ONLINE | 02/02/02 | 7 | 4 | 2 |
| GEORGE | ONLINE | 02/02/02 | 3 | 2 | 6 |
| FREDERICK | OFFLINE | 02/02/02 | 1 | 7 | 4 |

⊕ USER TO GROUP
⊕ FILE TO GROUP
⊕ SCHEDULED ITEM
⊕ MESSAGE THREAD
⊖ USER FROM GROUP
⊖ FILE FROM GROUP
◁ SETTINGS
◁ GROUP PROFILE

MANAGER / CONFERENCE

*FIG. 57* eZ eZMEETING - ALPHA

FILE  EDIT  CONFERENCE  SNAPSHOT  TOOLS  HELP

PROJECT GROUPS

< PREVIOUS GROUP | NEXT GROUP >

NAME OF CURRENT GROUP
CREATED BY: OWNER NAME
CREATED ON: 02/02/02

SEARCH MESSAGES ▼ ALL MY GROUPS ▼    FIND    ADVANCED SEARCH

⊕ CONTROL CENTER
⊕ START CONFERENCE
○ VIEW CONTACT LIST

CONFERENCE ARCHIVE  MEMBERS  SCHEDULE  CHATS  FILES  MESSAGES

⊕ USER TO GROUP
⊕ FILE TO GROUP
⊕ SCHEDULED ITEM
⊕ MESSAGE THREAD

MAY 2002
S  M  T  W  T  F  S
         1  2  3  4
5  6  7  8  9 10 11
12 13 14 15 16 17 18
19 20 21 22 23 24 25
26 27 28 29 30 31

JUNE 2002
S  M  T  W  T  F  S
                  1
2  3  4  5  6  7  8
9 10 11 12 13 14 15
16 17 18 19 20 21 22
23 24 25 26 27 28 29
30

TODAY - WEDNESDAY 17th, APRIL 2002          2:13 PM
9:30 AM - 10:30 AM  DOMINIC  TRAVEL ITINERARIES  3 INVITED
2:00 PM - 2:30 PM   LAURA    CUSTOMER FEEDBACK   1 INVITED

OPEN INVITATIONS
DATE                    HOST     TITLE              ACCEPT
02/02/02 - 10:30 AM     ROSLYN   COLOR COORDINATION  YES ✓ NO
02/02/02 - 9 AM         ANDREW   NEXT GENERATION     YES ✓ NO
02/02/02 - 2 PM         LUCY     BUILD REQUIREMENTS  YES ✓ NO ✗

⊖ USER FROM GROUP
⊖ FILE FROM GROUP
▲ SETTINGS
▲ GROUP PROFILE

MANAGER / CONFERENCE

*FIG. 58* eZ eZMEETING - ALPHA

FILE  EDIT  CONFERENCE  SNAPSHOT  TOOLS  HELP

PROJECT GROUPS

SEARCH [MESSAGES ▼]  [ALL MY GROUPS ▼]  FIND  ADVANCED SEARCH

< PREVIOUS GROUP | NEXT GROUP >

*NAME OF CURRENT GROUP*
CREATED BY: OWNER NAME
CREATED ON: 02/02/02

(+) CONTROL CENTER
(+) START CONFERENCE
(○) VIEW CONTACT LIST

| CONFERENCE ARCHIVE | MEMBERS | SCHEDULE | CHATS | FILES | MESSAGES |
|---|---|---|---|---|---|

< PREVIOUS 25 | 1-15 OF 32 | NEXT 7 >

| FILE NAME | ORIGIN | ADDED | SIZE | TYPE |
|---|---|---|---|---|
| EXTERIA | ROSLYN | 02/02/02 | 20 K | .JPG |
| LIVING ROOM | ANDREW | 02/02/02 | 30 K | .JPG |
| FINANCIALS Q1 | LUCY | 02/02/02 | 40 K | .GIF |
| NDA AGREEMENTS | DOMINIC | 02/02/02 | 50 K | .GIF |
| FINALISED FURNISHINGS | CLARE | 02/02/02 | 120 K | .JPG |
| BUDGET | DAISY | 02/02/02 | 320 K | .DOC |
| FLOORPLAN | KATE | 02/02/02 | 40 K | .DWG |
| PROCESS IMPROVEMENT | HESS | 02/02/02 | 20 K | .CNF |
| JANUARY TIMELINES | STEVE | 02/02/02 | 50 K | .XLS |
| SPECIFICATIONS | PETER | 02/02/02 | 90 K | .CNF |
| PROPOSAL | URSULA | 02/02/02 | 50 K | .CNF |
| FRONT ELEVATION | HILLARY | 02/02/02 | 70 K | .DWG |
| BUDGETDRAFT2 | FREDERICK | 02/02/02 | 30 K | .DWG |
| FINANCIALS Q2 | GEORGE | 02/02/02 | 10 K | .CNF |

(+) USER TO GROUP
(+) FILE TO GROUP
(+) SCHEDULED ITEM
(+) MESSAGE THREAD
(−) USER FROM GROUP
(−) FILE FROM GROUP
(◄) SETTINGS
(◄) GROUP PROFILE

MANAGER / CONFERENCE

*FIG. 60*

```
C-02
```
REMOVE CONTACT
SELECT FOR REMOVAL

| ANDREW | ANTHONY |
| ANTHONY | CLARE |
| CLARE | DAISY |
| CLASSES | |
| DAISY | |

REMOVE

FIG. 66B

```
C-03
```
CREATE A LIST
LIST NAME:

SELECT MEMBERS:

CONTACTS | FIND | GLOBAL
<PREVIOUS | NEXT>
  BRANDING PROJ.
SUSIE
  BIZ DEV
THOMAS

BRANDING PROJ.

CREATE

FIG. 66C

```
C-04
```
EDIT LISTS IN MY CONTACTS
TO EDIT LIST, CLICK ON LIST NAME

☐ CLASSES              MEMBERS: ADD/REMOVE
☐ DEVELOPMENT          MEMBERS: ADD/REMOVE
☐ MANAGEMENT           MEMBERS: ADD/REMOVE
☐ REGIONAL MANAGERS    MEMBERS: ADD/REMOVE
☐ SALES                MEMBERS: ADD/REMOVE

DELETE CHECKED

FIG. 66D

PROJECT SELECT

SIGMA DESIGN PROJECTS

| NUMBER | NAME |
|---|---|
| | |

| NUMBER | NAME |
|---|---|
| SIGMA | SIGMA DESIGN INTERNATIONAL |
| 99000 | ARRIS HOUSE |
| 2000SHOWS | 2000 TRADE SHOWS |
| 1999SHOWS | 1999 TRADE SHOWS |
| 1998SHOWS | 1998 TRADE SHOWS |
| 1999SHOOT | 1999 3D CAD SHOOTOUT |
| 1998SHOOT | 1998 3D CAD SHOOTOUT |

- BRITTAN & WHITE ACTIVE PROJECTS
- BRITTAN & WHITE COMPLETED PROJECTS
- BRITTAN & WHITE STANDARDS
- SIGMA DESIGN CLIENTS
- SIGMA DESIGN PROJECTS
- ARRIS SAMPLES

MANAGER    OK    EXIT

*FIG. 71A*

PROJECT PAGE SELECT

| 99000 | ARRIS HOUSE | | NUMBER | | DRAWING |
|---|---|---|---|---|---|
| SHEETS | | | DESCRIPTION | | SHEET |

ARCHITECTURAL
STRUCTURAL/MECHANICAL/ELECTRICAL
SHEETS
MODEL

| PAGE | DESCRIPTION |
|---|---|
| A1 | SITE PLAN |
| A2 | 1st FLOOR PLAN |
| A3 | 2nd FLOOR PLAN |
| A4 | EXTERIOR ELEVATIONS |
| A5 | EXTERIOR ELEVATIONS |
| A6 | BUILDING SECTIONS |
| A7 | ROOF PLAN |
| S1 | FOUNDATION PLAN |
| S2 | 2nd FLOOR / LOW ROOF FRAMING PLAN |
| S3 | HIGH ROOF FRAMING PLAN |
| M1 | 1st FLOOR MECHANICAL PLAN |
| M2 | 2nd FLOOR MECHANICAL PLAN |
| E1 | 1st FLOOR ELECTRICAL PLAN |
| E2 | 2nd FLOOR ELECTRICAL PLAN |

| READ ONLY | LOCK BY SHEET | LOCK BY VPORT | MANAGER | BRIEFCASE | 3D VIEW | 2D VIEW | OPEN | EXIT |

SYSTEM FOR ELECTRONIC FILE COLLABORATION AMONG MULTIPLE USERS USING PEER-TO-PEER NETWORK TOPOLOGY

This application is a continuation-in-part of U.S. patent application Ser. No. 10/146,133, filed May 16, 2002 now abandoned. This application claims priority based on U.S. provisional patent application Ser. No. 60/290,972, filed May 16, 2001, and U.S. provisional patent application Ser. No. 60/302,673, filed Jul. 5, 2001; the entire content of said applications being expressly incorporated herein by reference.

FIELD OF THE INVENTION

The invention relates to a system for electronic file collaboration that allows for multi-user sharing of one or more electronic files. The invention also relates to an electronic file collaboration system that employs peer-to-peer network topology and owner-in-control methodology for direct transmission of electronic files from respective owners to conference participants with permission on dedicated network channels with total autonomy from a central server. Finally, the invention relates to a hybrid peer-to-peer network utilizing discovery, metadata search, and facilitated file transfer and messaging services from distributed servers with a triangulated security model.

BACKGROUND OF THE INVENTION

The internet was originally developed as a peer-to-peer network among academic and government research centers to facilitate location and sharing of electronic information. This original topology, however, presented difficulties in locating electronic information without first knowing exactly what to search for. This problem has been addressed with File Transfer Protocol (FTP), followed by the emergence of HyperText Transfer Protocol (HTTP) or the World Wide Web and Web browser technology, which promote the server-like notion of centralized file management. Thus, internet technology has departed from the original premise of promoting security and reliability through the use of peer-to-peer networks and the avoidance of central servers and central switching nodes.

A number of application-sharing products and services are available; however, they are either Web-server-based or provide only limited peer-to-peer connectivity and, as such, are characterized by a number of disadvantages. For example, a limited peer-to-peer electronic meeting application exists that only allows a single host, the sharing of only a single application or file type at any given time, and only limited one-way collaboration. Further, this application is slow and has high bandwidth requirements. A web-server-based file sharing application also exists, but is characterized by the same drawbacks, that is, the application allows for only a single host, the sharing of only a single application or file type at any given time, and limited one-way collaboration. Similarly, the web-server-based file sharing application has high bandwidth requirements, and is slow. In addition, the web-server-based file sharing application allows non-owner access to documents and compromises security and privacy by granting access to the hard drive and exposing local content directories to Web searching.

As stated previously, many of the advantages of peer-to-peer systems have been underutilized with the advent and popular use of Web technology. For example, in a peer-to-peer system, every document exists as only one version and is located in only one location (i.e., the computer where the document was created). Thus, no one needs to upload files to a central server in the peer-to-peer system, nor access files from that server or synchronize subsequent updates to the file with the version existing at the server. A peer-to-peer system implemented as described below in connection with the present invention is inherently free of risks associated with redundant versions of a file or multiple and conflicting versions. Further, peer-to-peer file access allows for faster throughput and less latency than server-based Web technology.

A need therefore exists for an electronic file collaboration system that employs peer-to-peer connectivity for interactive collaboration that is fast, provides simultaneous multi-file support, and not dependent on a central server. Further, a need exists for an electronic file collaboration system that is secure and that requires neither the publishing of documents in HTML format, nor the rendering of documents by Web browsers. In other words, a need exists for an electronic file collaboration system that allows document owners to retain complete control over an original document and any changes to that document. In addition, a need exists for an electronic file collaboration system that overcomes the high bandwidth requirements associated with existing systems.

SUMMARY OF THE INVENTION

The above-described disadvantages are overcome and a number of advantages are realized with the method and system provided by the present invention for real-time electronic file collaboration using interactive connectivity established via command messages transmitted on dedicated network channels between conference participants in a peer-to-peer architecture that has total autonomy from a central server. The method and system of the present invention employ an owner-in-control methodology to allow direct transmission of copies of documents among participants by permission, and to prevent storage of copies of documents used in a conference by participants. Thus, information (e.g., multiple documents) are hosted and shared from multiple locations. Mark-ups, additions, and other actions occurring on a conference document can only be saved by the document owner.

In accordance with another aspect of the present invention, a viewer engine is provided for reading, displaying and manipulating electronic data in texts, tables, vectors and 3D model formats, as well as common raster images.

In accordance with yet another aspect of the present invention, a conference engine employs highly optimized thread management to handle multiple users connecting to each other and viewing multiple files in multiple formats simultaneously using single or multiple hosts for the files.

In accordance with still yet another aspect of the present invention, a proxy module allows data transmitted through IPFW routers or firewall devices with sufficient authentications and security measures.

BRIEF DESCRIPTION OF THE DRAWINGS

The various aspects, advantages and novel features of the present invention will be more readily comprehended from the following detailed description when read in conjunction with the appended drawings, in which:

FIGS. 10A, 10B and 10C illustrate routing in accordance with an embodiment of the present invention;

FIGS. 11A and 11B illustrate routing in connection with a proxy module in accordance with an embodiment of the present invention;

FIGS. 55-61 are exemplary user interface screens generated at a broker in accordance with an embodiment of the present invention;

FIGS. 71A, 71B, 71C and 72 are exemplary user interface screens illustrating use of thumbnails in accordance with an embodiment of the present invention.

Throughout the drawing figures, like reference numerals will be understood to refer to like parts and components.

DETAILED DESCRIPTION OF THE PREFERRED EMBODIMENTS

Figure 1A:
FIGS. 1A, 1B and 1C depict standalone and conference configurations of an electronic file collaboration application implemented in accordance with an embodiment of the present invention.
Figure 1B:
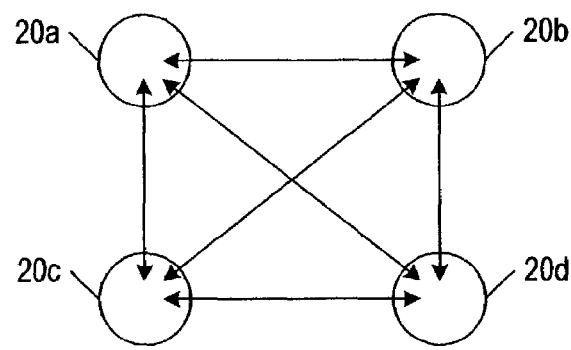
Figure 1C:
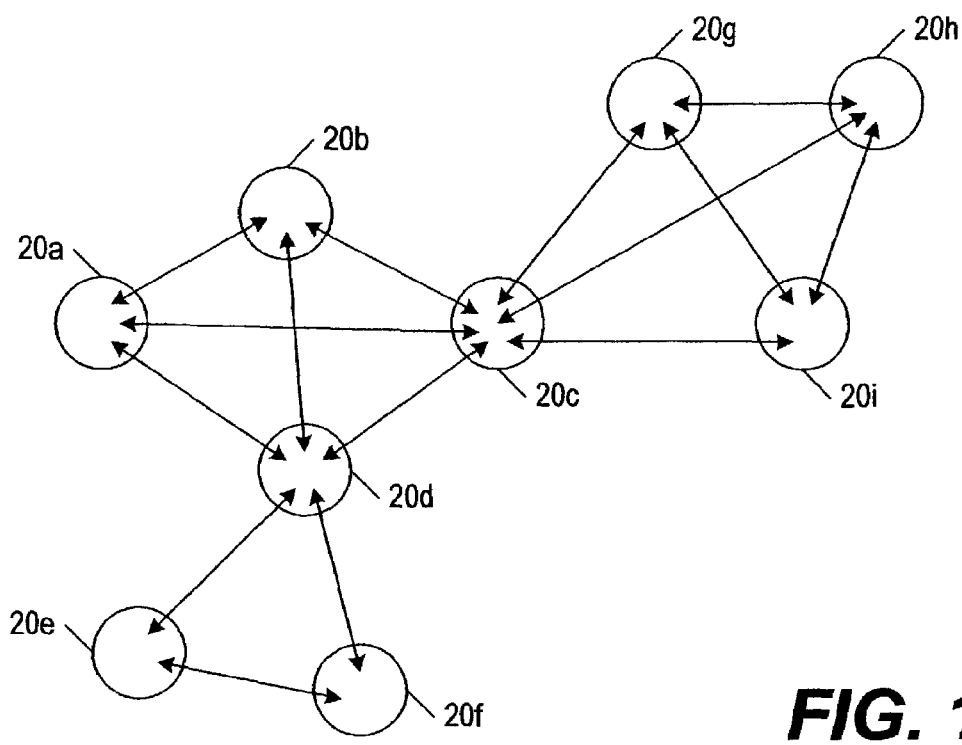

With reference to FIGS. 1A, 1B and 1C, the present invention provides for bi-directional, peer-to-peer (P2P) electronic file collaboration over a communication network or internet using owner-in-control file sharing for private and secure conferencing. The present invention can be implemented as a standalone application, or via fast, direct connections for a one-to-one collaboration (FIG. 1A) or a many-to-many collaboration such as four participants as shown in FIG. 1B. For example, a many-to-many collaboration can be established with as many as 32 participants at a given time. As shown in FIG. 1C, unlimited variations on combinations of conferences are available. In other words, some participants 20 need not collaborate with all other participants. In any event, each participant 20 is able to interact with all other participants or selected other participants in a natural, real-time manner. All communication is private and open only to other participants in the conference.

Figure 2A:
FIGS. 2A, 2B and 2C depict communication between a owner/host of an electronic file to be shared with a guest or conference participant in accordance with an embodiment of the present invention.
Figure 2B:
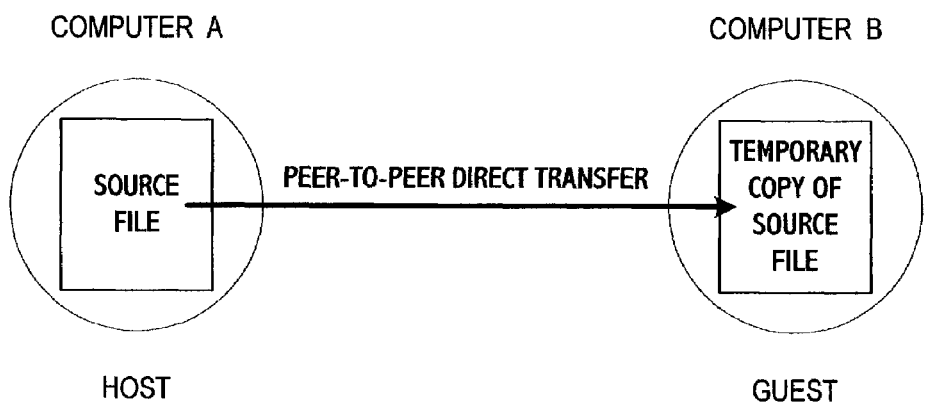
Figure 2C:
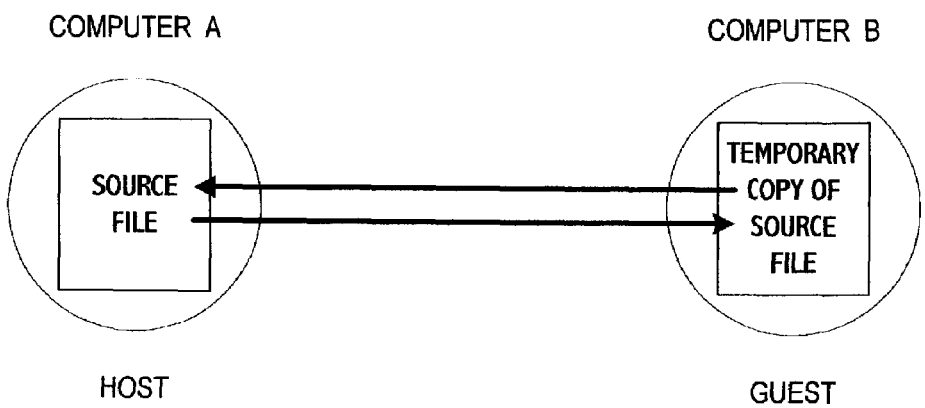

The owner-in-control file sharing of the present invention is illustrated in FIGS. 2A, 2B and 2C. With reference to FIG. 2A, a computer A is the owner of a source file. The computer A performs a P2P direct transfer of the source file to computer B, as shown in FIG. 2B. The file can be compressed by the computer A and then decompressed by the computer B. The copy of the document received at the computer B is placed in its memory (e.g., run-time memory), but vanishes when the collaboration session ends or the program is terminated normally or abnormally. The computer B is not permitted to save or print the source file copy in its memory. As shown in FIG. 2C, computers A and B interact in accordance with the present invention by sending commands such as zoom, draw line, and the like, to each other's collaboration application. Actions such as these, as well as markups and changes to the source file or temporary copy of the source file, are saved by the file owner (e.g., computer A in the illustrated example). The actions occur on both the host file and the guest copy.

Figure 6:
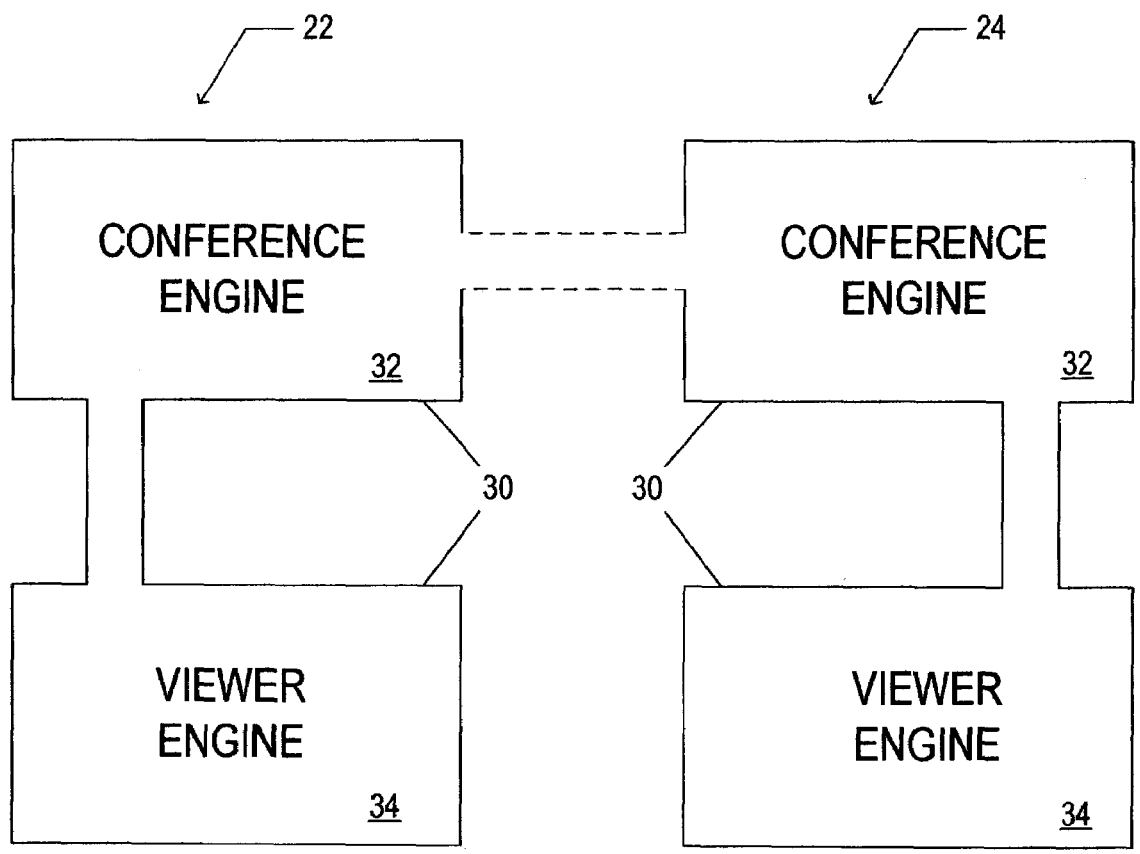
FIGS. 6 and 7 are block diagrams of collaboration application software constructed in accordance with an embodiment of the present invention.

In accordance with one embodiment of the present invention, participants' computers are provided with a collaboration application 30, which is described in further detail below in connection with FIGS. 6 and 7. The application can be downloaded from the internet, for example, or stored in the participant's computer from a disk copy of the application code, and is then installed locally. The application allows a client computer to view files on other computers as soon as it is installed. The client, upon registration and payment, can then obtain an authorization code to have the ability as a participant 20 to mark up and otherwise operate on viewed files, or to initiate a session with other participants based on the client's files. Screens (FIGS. 13-52) are described below to illustrate the ease with which a client using the collaboration application 30 of the present invention can initiate a conference session with any local file with any other user(s) connected to any IP-based network, regardless of whether that network is a local area network (LAN), wide area network (WAN), intranet or internet.

Figure 3A:
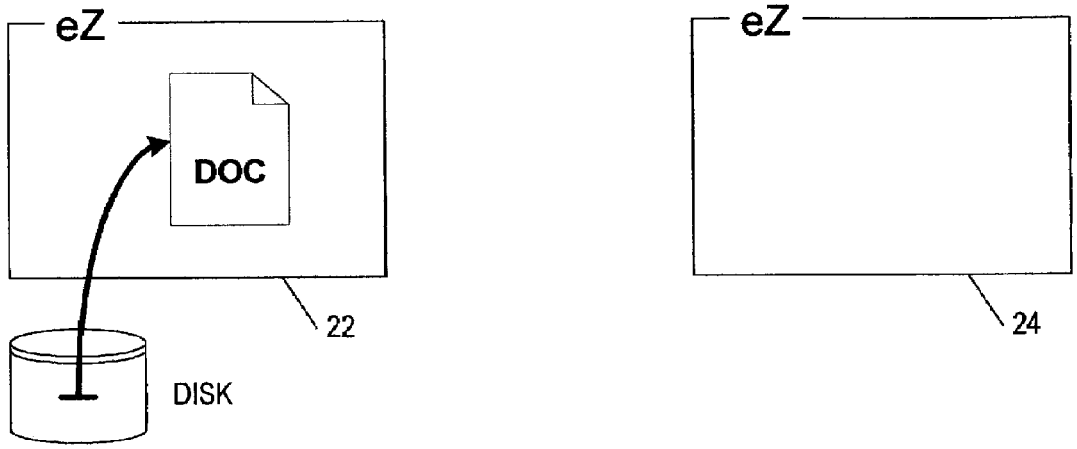
FIGS. 3A, 3B, 3C, 3D, 3E, 3F, 3G, 3H, and 3I illustrate connection establishment for a conference in accordance with an embodiment of the present invention.
Figure 3B:
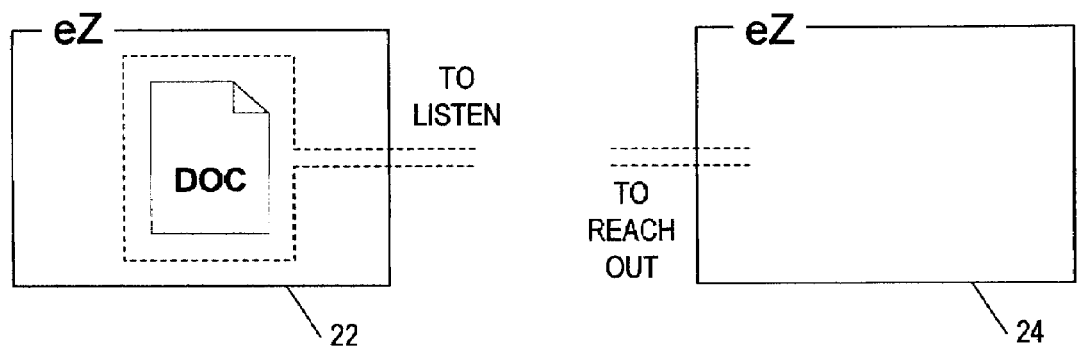
Figure 3C:
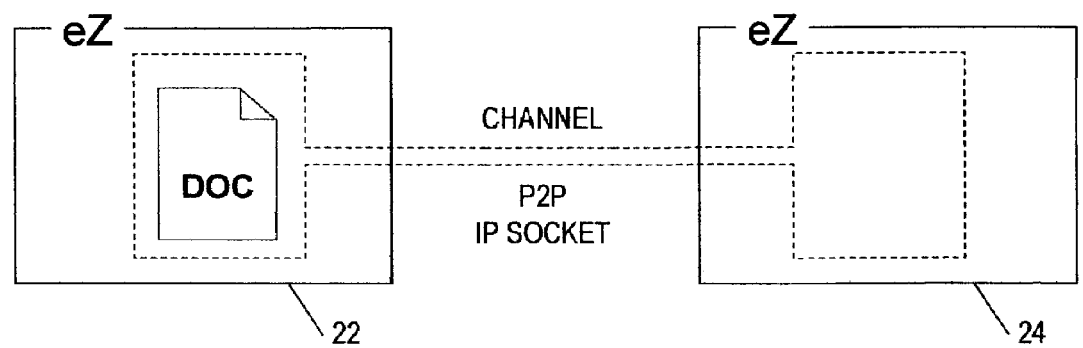
Figure 3D:
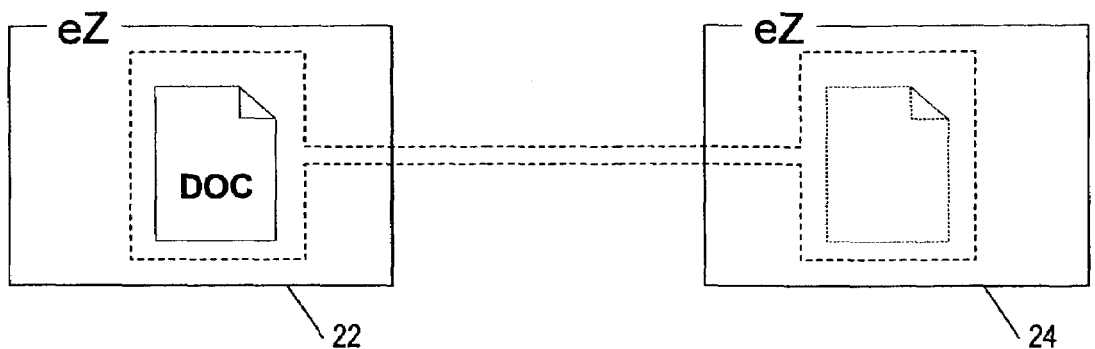

Conference initiation will now be described with reference to FIGS. 3A through 3I. FIG. 3A illustrates two clients 22 and 24 which each have the collaborative application 30 of the present invention installed on their computers. The client 22 can initiate a collaborative meeting with another client 24 by loading a locally stored document, for example, using the application software 30. The document or file is on, for example, a local drive or a mapped network drive. In the illustrated embodiment, the client 22 starts a conference, and the client 24 joins the conference, as shown in FIG. 3B. The client 22 sends control data (e.g., channel and port number) for establishing a bi-directional connection to the client 24 such as identification of a channel based on sockets, as shown in FIG. 3C. With reference to FIG. 3D, the loaded document is then sent to the client 24 from the client 22 via the established connection. The client 24 stores the document into its runtime memory, for example. As stated above, the client does not have the ability to save or print the document owned by and being hosted from the client 22.

Figure 3E:
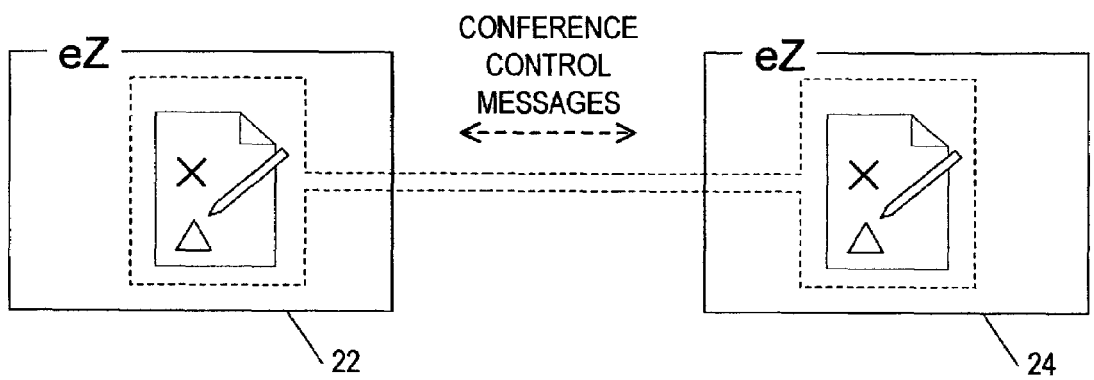
Figure 3F:
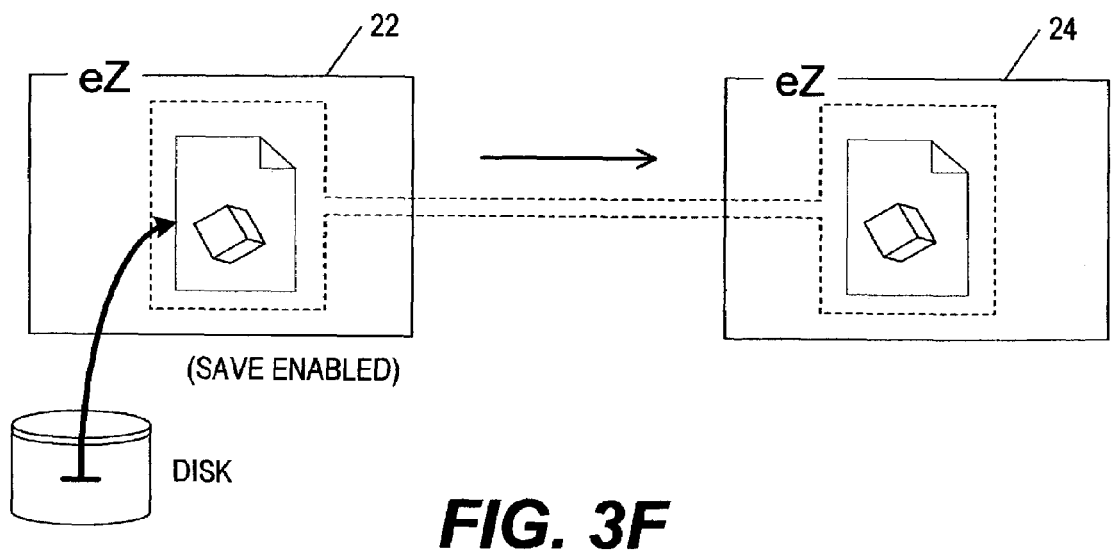
Figure 3G:
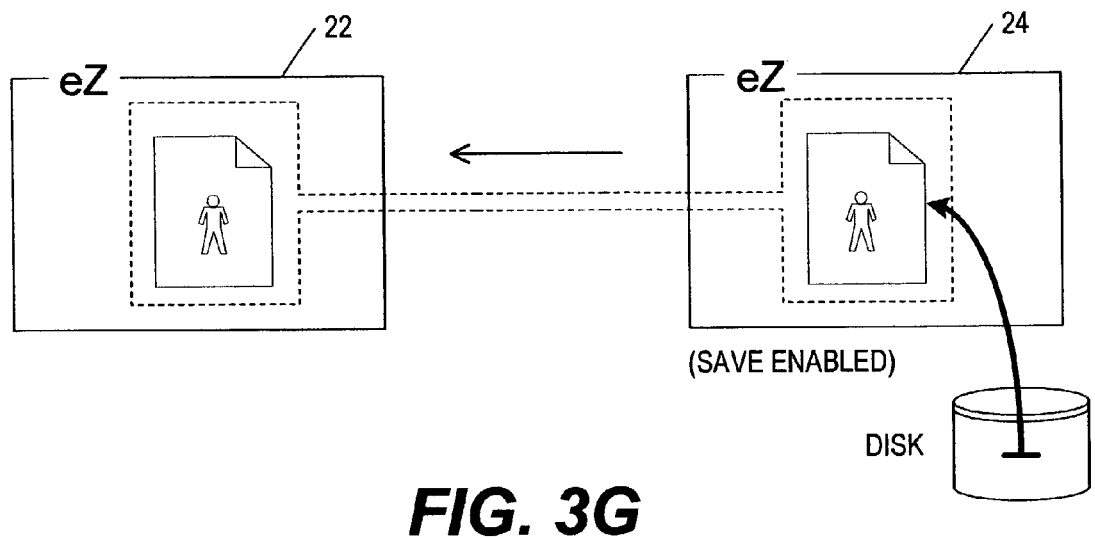
Figure 3H:
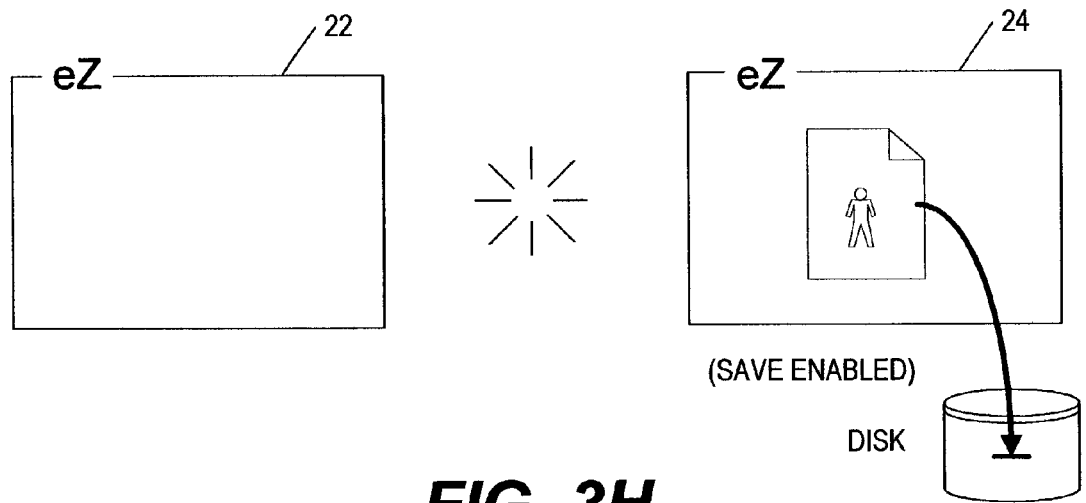
Figure 3I:
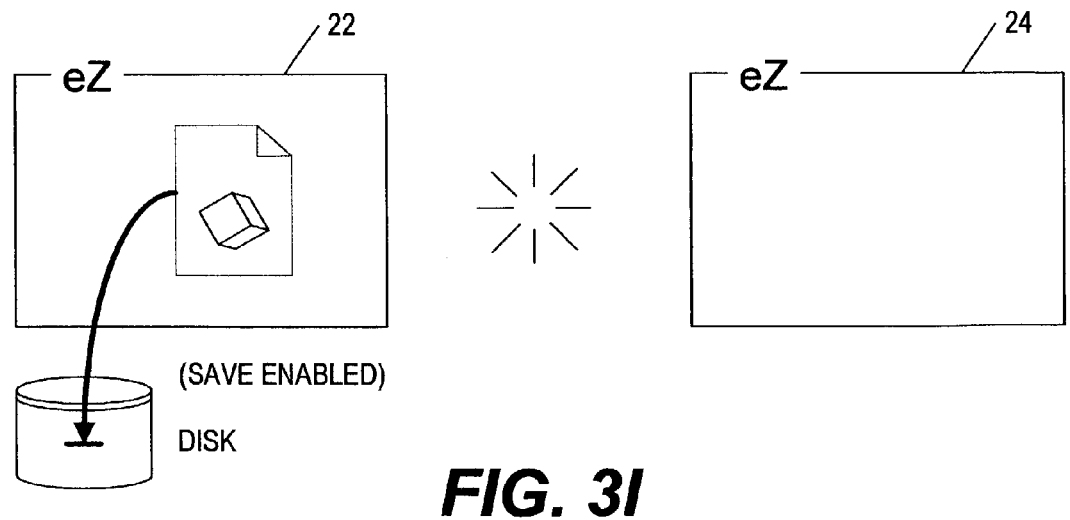

Conference control messages are transmitted which allow markups and other operations on the document, as depicted in FIG. 3E. FIGS. 3F and 3G illustrate, respectively, the forwarding of a second document from the client 22 to the client 24 and the forwarding of a third document from the client 24 to the client 22. Upon termination of the conference, which can be initiated by either the client 22 or the client 24, the second document and any markups thereof are saved at the client 24 (FIG. 3H). Similarly, the first and the third documents and any markups thereof are saved at the client 22 (FIG. 3I). Thus, the present invention provides for the establishment of ad hoc P2P networks for collaboration purposes that are not tied to a fixed internet location (i.e., URL or IP address) and therefore are less susceptible to systematic hacking or cracking.

Figure 4A:
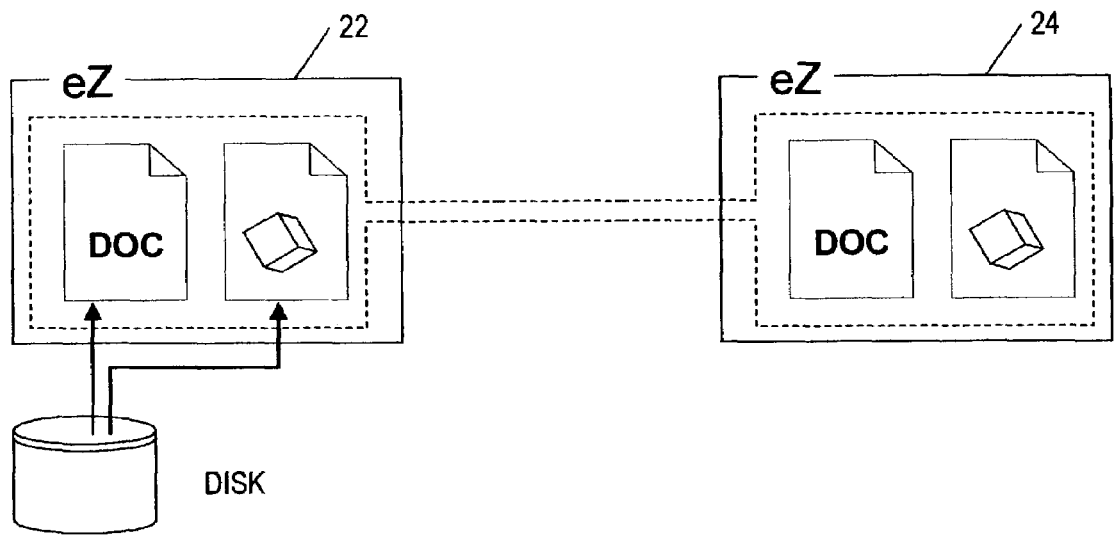
FIGS. 4A and 4B depict simultaneous collaboration on multiple documents in accordance with an embodiment of the present invention.
Figure 4B:
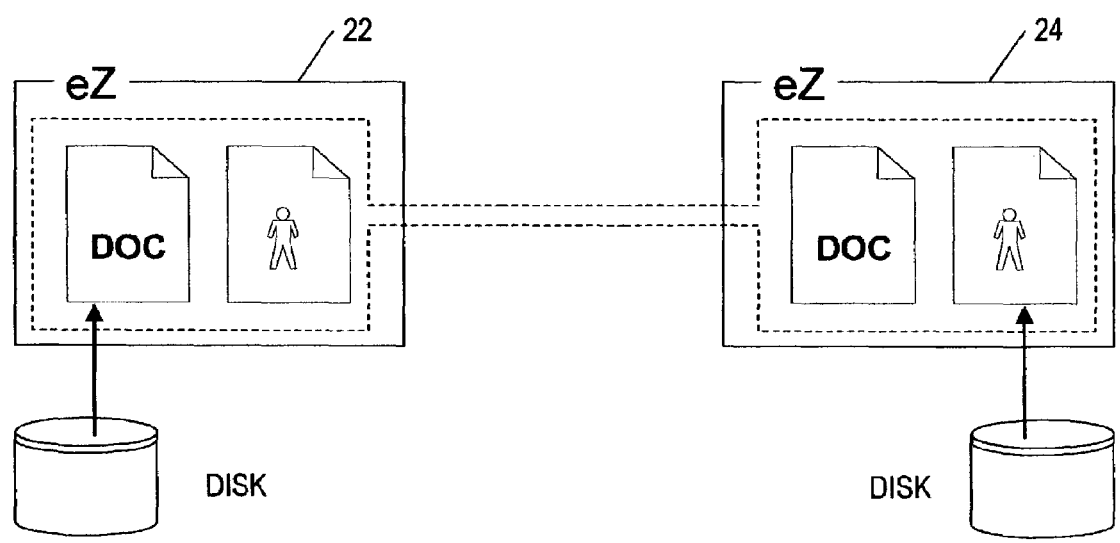
Figure 5:
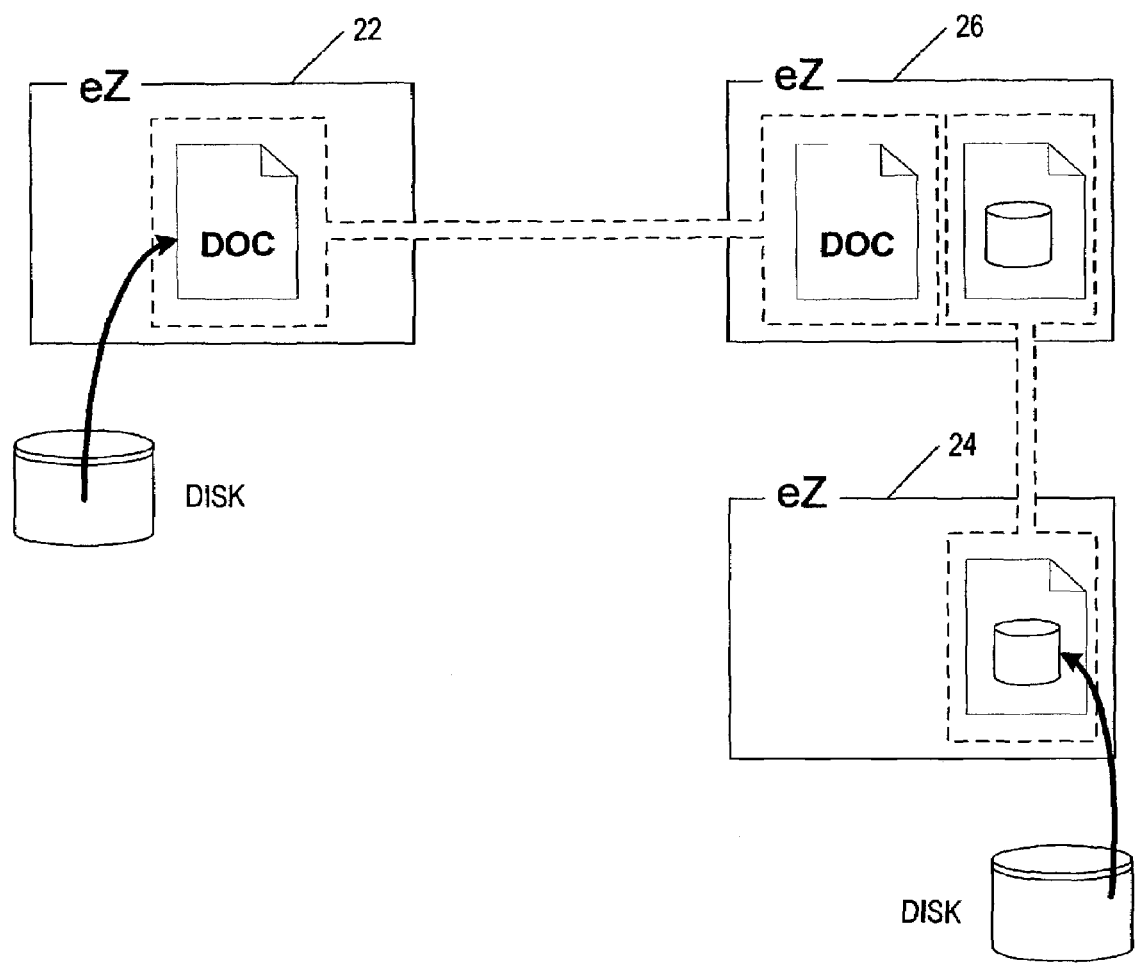
FIG. 5 depicts simultaneous multiple conferences in accordance with an embodiment of the present invention.

FIGS. 4A and 4B illustrate collaboration on multiple electronic files in accordance with the present invention. For example, a client 22 can forward two of its locally stored documents to the same client 24 (FIG. 4A). Clients 22 and 24 can also each forward a document to the other client 24 and 22, respectively, such that both of the clients have more than one electronic file to share (i.e., their own document being hosted and the document received from the other client). FIG. 5 illustrates the manner in which a client 26 can support multiple collaborative meetings (i.e., a meeting with the client 22 and a separate meeting with the client 24 for which the client 22 is not a participant).

The collaboration application 30 will now be described with reference to FIGS. 6 and 7. The collaboration application 30 at each client preferably comprises a conference engine 32 and a viewer engine 34, as shown in FIG. 6. As shown in FIG. 7, the conference engine 32 comprises a conference module and a socket module. The viewer engine comprises a number of components for supporting different file types and operations.

There are various P2P methodologies such as a centrally coordinated P2P system (e.g., Napster), and a hierarchical P2P system that employs a tree of coordinators (e.g., DNS). The collaboration application 30 is essentially decentralized and requires no global coordination. This autonomy ensures that every owner or host of an electronic item to be shared is an equal participant. Further, no hosts are given a special facilitating or administrative role. The collaboration software 30 overcomes many of the obstacles that prevent the P2P hosts from connecting directly such as firewalls, routers, dynamic IP, IPFW, Network Address Translation and platform differences while providing a secured solution.

In accordance with the present invention, a cyber space conference room is established to allow two users 22 and 24 to connect directly to each other and to collaborate on a shared document, for example. Other participants can subsequently join the conference room, as indicated generally at 20 in FIGS. 1B and 1C. Thus, each conference room can be initiated with only one document as the subject on which members collaborate. However, the collaboration application 30 running on a client's computer is capable of handling multiple documents within a session, and concurrent communication between all participating members to a conference. Initially the user 22 who starts a conference is the "owner" of the document. All participating members 20 are given equal abilities in viewing and manipulating the document in a concurrent manner, but only the document owner can save the record. Since there is no dominant participant in a conference, any other participant can push (e.g., with the built-in browser utility) a different document to replace the document currently in session and become the document owner. As illustrated in FIGS. 4A and 4B, a participant user can push plural documents to be shared concurrently. Alternatively, plural participants can push respective documents that they own for concurrent collaboration.

Thus, the collaboration application 30 of the present invention provides for fast, direct connectivity and real-time information sharing and collaboration over the internet or other networks (e.g., an intranet) for spontaneous and interactive communication between conference participants. Further, the collaboration applications 30 on participants' computers provide for sharing and hosting of information from multiple locations simultaneously to enhance knowledge capture, collaboration and management among a group of people such as within an organization. Input from conference members is multi-directional and simultaneous for natural interaction. During a conference, concurrent collaboration on multiple file types is supported by the collaboration application 30 of the present invention.

The collaboration application 30 is configured to be adapted with ease to support future connection infrastructure and file types. The collaboration application 30 can support, for example, ordinary pictures currently used for most internet communication, as well as vector-2D and geometric-3D pictures with visual capabilities that are currently only available in high-end CAD system. Further, although an international language such as English is preferred for writing markup text during international conferences, the collaboration application 30 supports foreign languages and characters and can be localized by the foreign users directly.

The collaboration application 30 operates with low-bandwidth connection at the client computer such as a 56K dial-up modem, and is fast to provide participants with essentially real-time interaction. The collaboration application 30 applies optimal mathematical disciplines of graph theory for a connection matrix. Once a socket connection is established between any two users, the channel remains intact for other uses or reuse until the session is terminated completely on either end. Documents and other files to be shared during a conference are prepared at all remote machines prior to the conference. During the conference, markups and view manipulations are synchronized between conference members by control messages applying to each local copy in memory.

The collaboration application 30 provides data privacy and security. Data (e.g., documents) in a conference are considered private and unique. They are not copied or posted in public space (e.g., on a server). Documents shared among participants are temporary at non-owners' computers and protected from being duplicated to other remote systems. For private conferences, password control is available as an option. Data in transmission can also be encrypted if additional confidentiality protection is desired. Prior to the data transmission, hosts or proxies on both ends of a P2P connection (e.g., computers 22 and 24) are authenticated so that the established channel is restricted to the meeting packets only.

Figure 7:
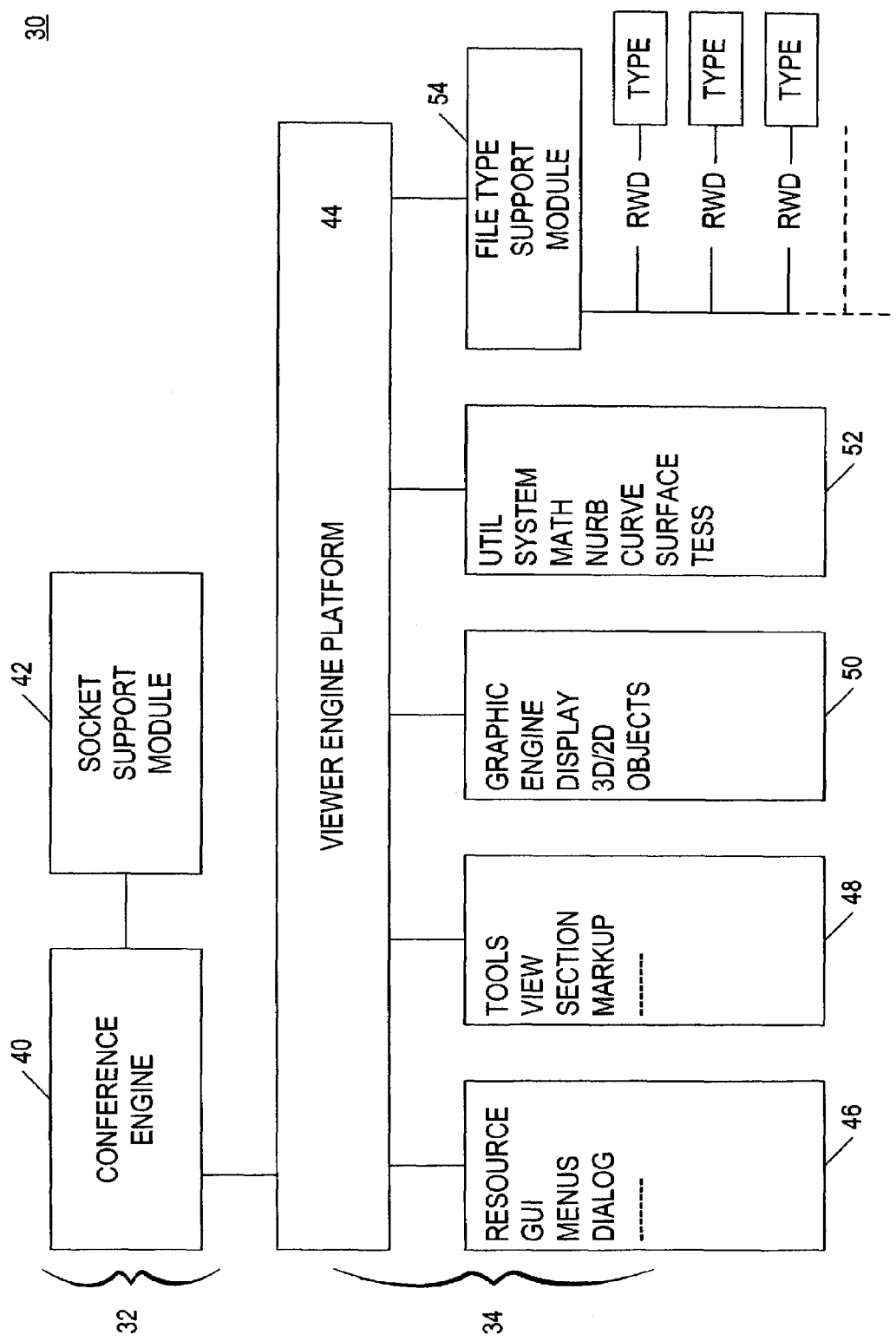
Figure 8A:
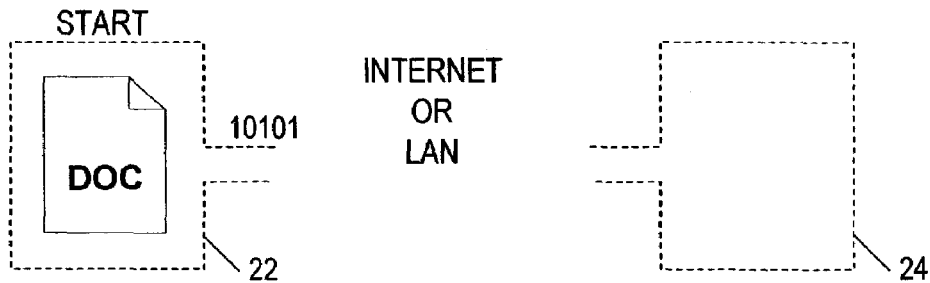
FIGS. 8A, 8B, 8C and 8D depict connection establishment for a conference via the internet or a local area network (LAN) in accordance with an embodiment of the present invention.
Figure 8B:
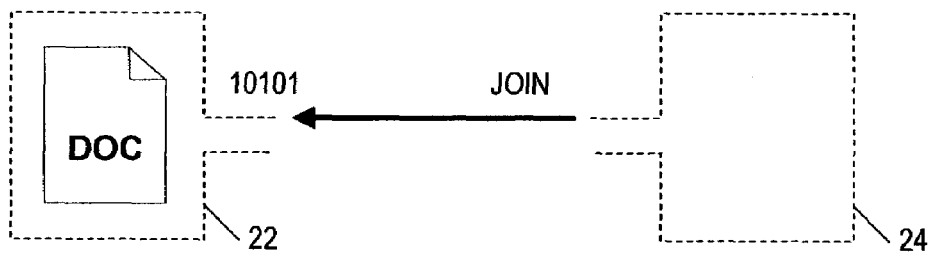
Figure 8C:
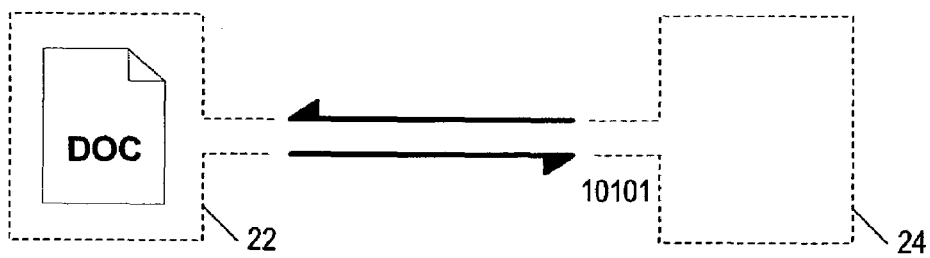
Figure 8D:
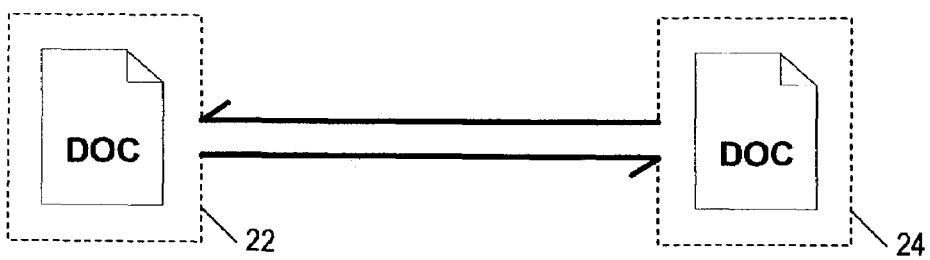

With continued reference to FIG. 7, the collaboration application 30 comprises a conference engine 32 having a conference module 40 and a socket module 42. The viewer engine 34 comprises a platform 44 and a number of modules indicated generally at 46, 48, 50, 52 and 54 which are described in more detail below. Most code in the core system (i.e., the engines 32 and 34) are preferably written in ANSI C portable for both Windows and UNIX.

As stated previously, the collaboration application 30 provides P2P connections via a network. The conference module 40 is a highly optimized thread manager that is capable of handling multiple users (e.g., as many as 32 participants 20) connecting to each other and viewing multiple documents simultaneously. Events/requests transmitted between participating members are document-dependent and queued in on a first-come-first-serve basis without imposed priorities. This multi-document interface (MDI) mechanism allows different sets of members for each concurrent conference. In addition to linked functions with the socket module 42, the conference module 40 manages commands, routing controls, user controls, and conference joining controls (e.g., leave, lock, owner, remove, site list, member list, data transfer, file status, and so on). A message log is provided for monitoring conference events and issuing alert dialogs.

The collaboration application 30 uses sockets (e.g., a multi-threaded TCP/IP socket manager) to establish two-way communication between two computer hosts 22 and 24 that are identifiable via IP addresses. The system library on which the collaboration application 30 preferably depends is Microsoft Windowsk2. The infrastructure of conferences is based on the concept of P2P communication for which TCP/IP was developed originally. Once a connection is successfully made, this communication channel is preserved for reuse until the conference or the collaboration application 30 is terminated. The socket module 42 handles all socket messages such as create, destroy, read, write, connect, close, receive, send, accept, binding, password authentication, and so on, and is capable of connecting Windows and UNIX systems. A log system is provided for tracking any errors that may have occurred. UDP broadcasting for notifying IP and conference existence is coded for both the core software (e.g., the conference and viewer engines 32 and 34), as well as a proxy module 60 described below.

The platform or system engine 44 is a core layer that interfaces with the operating system of the client computer, as well as the video display and disk input/output (I/O). System engine tasks and resource module 46 tasks include, but are not limited to, shared-memory management, heap management, debugger information, message digest, byte-swapping, user environment operations, memory operations, and process thread management, except handler, swap information, system logs, parameter handlers and other system-related processes.

The utilities module 52 is preferably a CAD engine designed to read, (limited) write and display/manipulate most three dimensional objects generated by and used in AEC, mechanical, automotive and aerospace industry. The geometric library supports lines, arcs, polylines, B-splines, Bezier curves, triangles, polygons, 3D surfaces, solids (brep). Functions include, but are not limited to, matrix transformation, view clipping, Picking/Selection, Text/font/glyph handler, pseudo/true-color handlers and a sophisticated dynamic tessellator for analytic 3D objects.

The graphics module 50 and the rendering module 48 allow for displaying and manipulating three-dimensional objects from various industry standard file formats. For display, options include standard wireframe, wireframe with the Z-buffer HLR (Hidden Line Removal), HLR with ghosting, smooth shading and flat shading, real-time orbit, redlining and markup and adjustment of lighting. Rendering with polygonal normals and rendering with dynamic tessellation over analytic surfaces where applicable are supported.

In addition to supporting industry standard libraries such as OpenGL, DirectX, DirectDraw, the collaboration application 30 offers a double-buffer shared-memory direct-blast software rendering module 48 which provides a tremendous performance boost for slower systems that are not equipped with a high-end graphics display device/card. The following file extensions are supported:

| | |
|---|---|
| gtf | fully supported for ARRIS and BuildersCAD. |
| .igs | supports V 1.0. |
| .wrl | supports VRML 1.0. |
| .stl | fully supported. |
| .o2c | supported except mapped textures. |

The rendering module 48 employs a Markup Tools Engine having a plurality of functions such as 2D and 3D markup tools, measurement tools, file compare tools, interference checking and document write tools. With regard to 2D and 3D markup tools, markups are overlaid over the document currently loaded, locally and remotely if the document is in conference real-time, and dynamically. Properties of individual markup objects including size, thickness, font, color for foreground and background are fully configurable. Text notes can be added with a pseudo-rich text editor on the fly. In addition to standard ASCII characters, extended and multi-byte character sets are fully supported for users in Europe and Asia. Line drawings include a sketch pen, a high-lighter with alpha-blending algorithm, polylines and sophisticated bspline curves to allow conference participants to sketch, draw and annotate hosted and shared files. Box shadings support both opaque (solid) and transparent. Performance for panning and zooming in and out for all document type are fully optimized. Measurement tools for straight lines and angles are available. The "lineal distant" shown is based on the unit stored in the original file without any calibration. As an example, for 2D hpgl vector files, measurements shown are in plot unit. A unique "compare file" tool allows users to visualize the differences by overlaying two documents. A unique "interference checking" tool allows users to visualize the differences by overlaying two 3D objects. The collaboration application 30 is designed as a read-only viewer. The purpose of SAVE is mainly for storing add-on markups and notes in the compound conference files. However, for convenience, a user can create 2D snapshots for raster images or 3D vrml (1.0) for models from the currently loaded document. Formats such as png, jpeg, bmp are preferably the supported raster formats for making snapshots.

The view manipulation controls that are implemented by the collaboration application 30 are seven orthogonal view settings, rotations in world/camera coordinates and a trackball-like control. Four light sources can be set and be manipulated dynamically. A dynamic sectioning tool is provided that allows real-time slicing of a 3D solid object. Sectioned views can be blended with shading, wireframes and a mixed translucent view. Section profiles can be saved separately.

The collaboration application 30 employs a raster reader to open and display files of most popular raster formats, regardless of their size, shape or color-depth. Although some limitations may apply due to the rapid-changing technology, common "picture" files such as the following are supported:

| | |
|---|---|
| .bmp | fully supported. |
| .jpg | fully supported. |
| .png | fully supported. |
| .tif | supports FAX format: CCITT group IV compression monochrome only |

-continued

| | |
|---|---|
| .gif | |
| .tga | fully supported |
| .pdf | fully supported |
| .3ds | fully supported. |

Using a vector reader, the collaboration application 30 is able to open and display files of several vector formats for users in the technical field. Architectural floor plans, building site plans, mechanical drawings, and almost all various technical layouts can be viewed via formats such as:

| | |
|---|---|
| .dwg | Implemented via OpenDWG Viewkit with layer control enabled. |
| .dxf | Implemented via OpenDWG Viewkit with layer control enabled. |
| .cgm | single-precision backward compatible supports |
| .hpg | fully supported for ARRIS and BuildersCAD for CR, EP, FR, NP, PA, PC, PD, PE, PM, PR, PU and SP. |

The collaboration application 30 contains a very unique module, that is, the Read/Write/Display or RWD module indicated generally at 54 in FIG. 7 for opening and displaying documents using another resident application. Viewing Microsoft Office documents, such as Word, Excel and PowerPoint are supported with this technology. The foreign applications are preferably OLE-enabled and codes in this module are preferably Windows-specific. The collaboration application 30 is therefore advantageous because participants' computers need not be pre-configured prior to a conference to enable them to open the different file types being hosted and shared during the conference.

A collaboration application file is preferably a "folder" for many different files. It is preferably based on Microsoft compound storage technology. This hierarchical tree is designed to contain multi-disciplined files in organized fashion and build growth for the future. Like a directory structure, "sections" are the first level and "parts" are the second level. For the mechanical engineers, for example, a meeting or conference file can be a motor, with the sections being motor components and the parts being bolts and screws. All supported file types can be stored under a selected collaboration application file extension, along with saved markup files and saved view files. Associated tools or adding and deleting sections are provided.

The collaboration application 30 employs a browser. Similar to file manager or Windows explorer, the browser is designed for traversing a meeting document and selecting a component visually. It can also be used to access files on a client computer disk directly. The browser is document-dependent. In other words, each document within the collaboration application 30 has its own browser. Selecting a section, a part of a file from browser triggers a replacement of the current document. If the document is currently in conference, the replacement takes over the document ownership of the conference in session. The collaboration application 30 also provides a snap shot function via the user interface (i.e., FIGS. 13 and 37) that enables conference participants to select and capture (e.g., via user-friendly screen capture routines) all or a particular part of essentially anything on their desktops to be hosted and shared during a conference. In addition, the user interface of the collaboration application 30 allows the participant to gather information (e.g., stock information, maps, weather data, and so on) from the Web or any other source the participant's computer can access.

The collaboration application 30 of the owner computer preferably pushes a document in a compressed format to the runtime memory of the local collaboration application 30 processes of all participating members. During the conference, only command and operation messages are sent between members to synchronize the display accordingly. This unique approach in document preparation and message exchange not only enables the collaboration application 30 to function with various file/data types, but also dramatically improves the performance of all real-time data manipulation, including complicated 3D objects. The collaboration application, along with its Graphical User Interface Module 46, hosts all markup objects, defaults settings, controls the state of tools, including view, as well as File I/O and read/write. For document transfers, zlib algorithm is used for compression, and data are blocked into smaller packets before transmission. In conjunction with the graphics system library, the instance of the entire document object is created on the fly during the read. Since there are no proprietary data formats, no conversion is required.

The collaboration application 30 keeps track of privileges (license related), ownership, properties and the member-sensitive pointer. With regard to network utilities, a conference-dependent "chat room" utility is provided that allows all participating members to write text messages simultaneously. It is preferably implemented based on the Microsoft chat control. File transfer is generally based on a commercially available file-sharing feature. With multiple channels that have already been established in accordance with the present invention, the collaboration application 30 is capable of transferring files to multiple recipients simultaneously.

Figure 9:
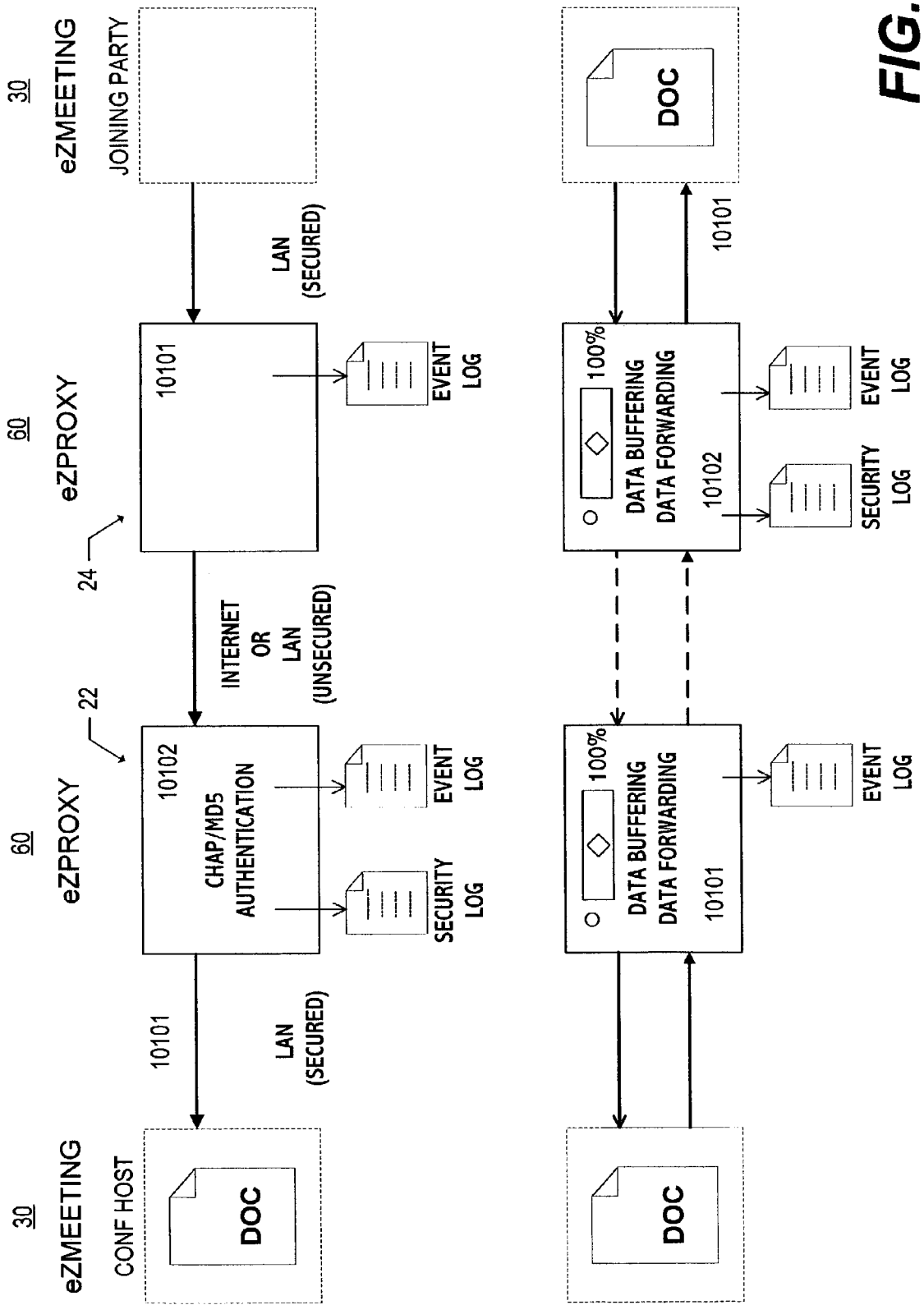
FIG. 9 depicts operation of a proxy module in accordance with an embodiment of the present invention.

The proxy engine will now be described, as well as internet and LAN connection establishment, in accordance with the present invention. FIGS. 8A, 8B, 8C and 8D depict establishment of an internet or LAN connection between computers 22 and 24, each of which are executing collaboration applications 30. To establish a connection, a machine identifier (ID) and an IP address corresponding to the channel to be used are provided to both computers to enable bi-directional P2P communication. The proxy module 60 is used for deploying a conference in a private LAN separated from the internet by a firewall, router, Network Address Translation (NAT) device or IP forwarding (IPFW) software. With reference to FIG. 9, the proxy module 60 detects the internet connection, resolves the IP address, authenticates incoming and outgoing meeting packets and forwards them between connected meeting channels. The proxy module 60 also guards the specific port from unwanted intruders and reports such events in a security log. The present invention can be compatible with existing firewall and virtual private network (VPN) technologies.

A port (e.g., default=10102) on the user's control device (e.g., a router) must preferably be "open" and redirected to a designated computer inside the protected LAN. The proxy module 60 preferably runs on this computer to authenticate and direct traffic between meetings. Firewalls are built for good reasons that are not compromised by the proxy module 60. The proxy module 60 not only takes security measures to authenticated packets for the collaboration application 30, but also serves as a port keeper. In the event of unauthorized intrusion, the proxy module 60 reports its origin (IP) and the time of occurrence, and records the history of such alerts in a security log. The designated machine on which the proxy module 60 runs can be the DMZ machine of the user firewall or a UNIX server running linux, FreeBSD, Sun Solaris or SGI irix.

In addition to linking the socket and conference libraries, functions of the proxy module 60 include, but are not limited to, AcceptIdleConnection, AcceptSocket, CloseIdleConnection, ListenHandler, LogConnect, LogCreateBridge, LogDestroyBridge, LogException, LogFunctionError, LogRoute, LogSecurity, LogTrace, ReceiveProxyIdentify, ReceiveServerIdentify, SendProxyIdentify, StartBroadcast. Both the proxy module 60 and the collaboration application 30 are registered ports (i.e., TCP/10102 and UDP/10102 for eZproxy and TCP/10101 and UDP/10101 for eZmeeting) with the Internet Assigned Numbers Authority (IANA).

Data (e.g., documents) in conference are considered private and unique. As stated previously, they are not permitted to be copied. They are temporarily distributed in a compressed format to the runtime memory of participants in the conference. They are destroyed as the session ends, and only the document owner can record the changes, if any, to his or her disk. A password can be implemented as an option prior to starting a conference. Should a user set a password, no other party can join his conference without knowing this password. Prior to the data transmission, hosts or proxies on both ends must be authenticated for security reasons. The private key mechanism based on Challenge Handshaking Authentication Protocol (CHAP) with Message Digest (MD5) is implemented for a secure channel. For data transmitted via the network, an encryption of either 40-bit or 128-bit is used. A password scheme to exclude uninvited members is preferably initially implemented.

Figure 10C:
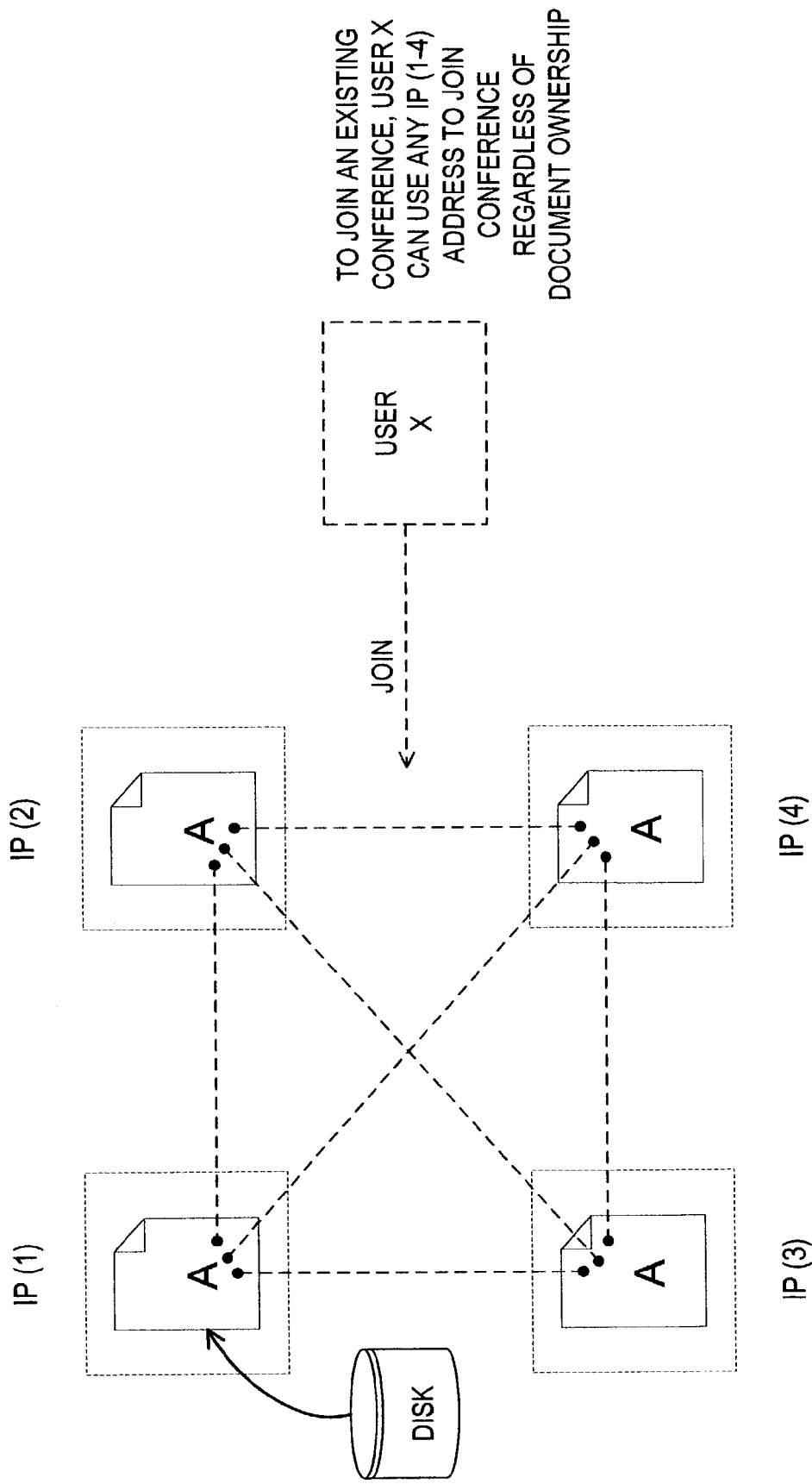
Figure 12:
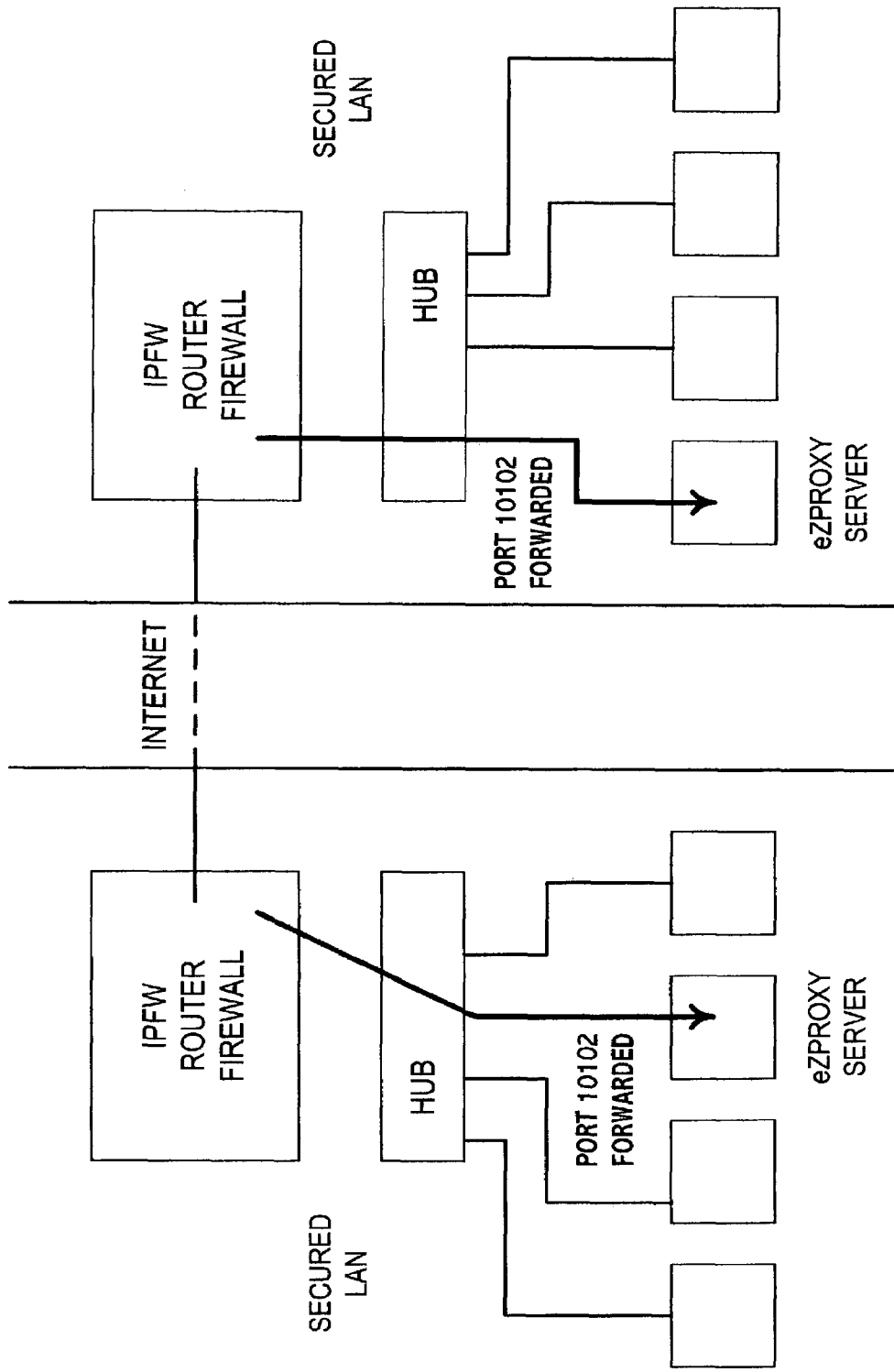
FIG. 12 depicts operation of a proxy module in connection with a secured LAN in accordance with an embodiment of the present invention.
Figure 13:
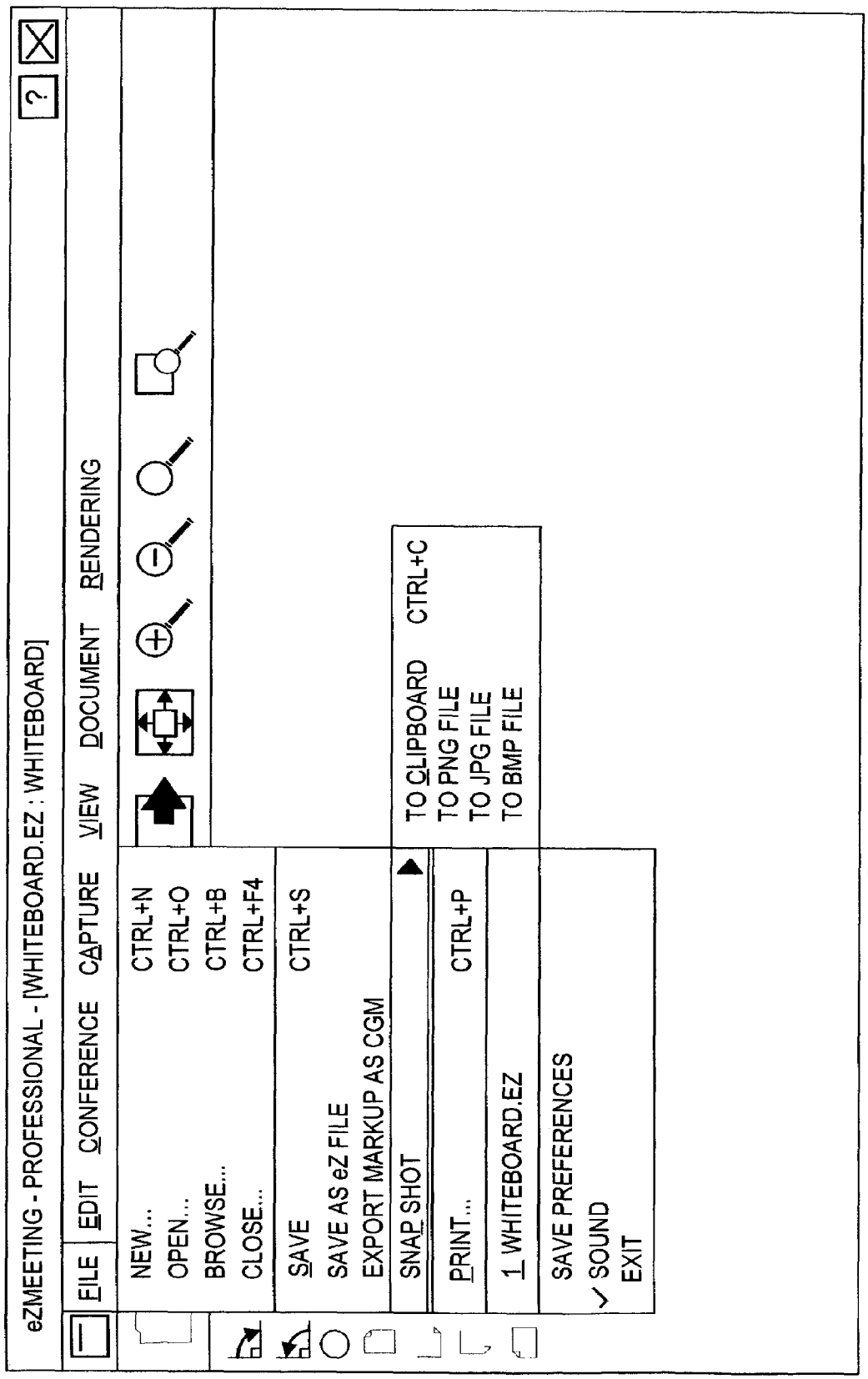
FIGS. 13-52 depict user interface screens in accordance with an embodiment of the present invention.
Figure 14:
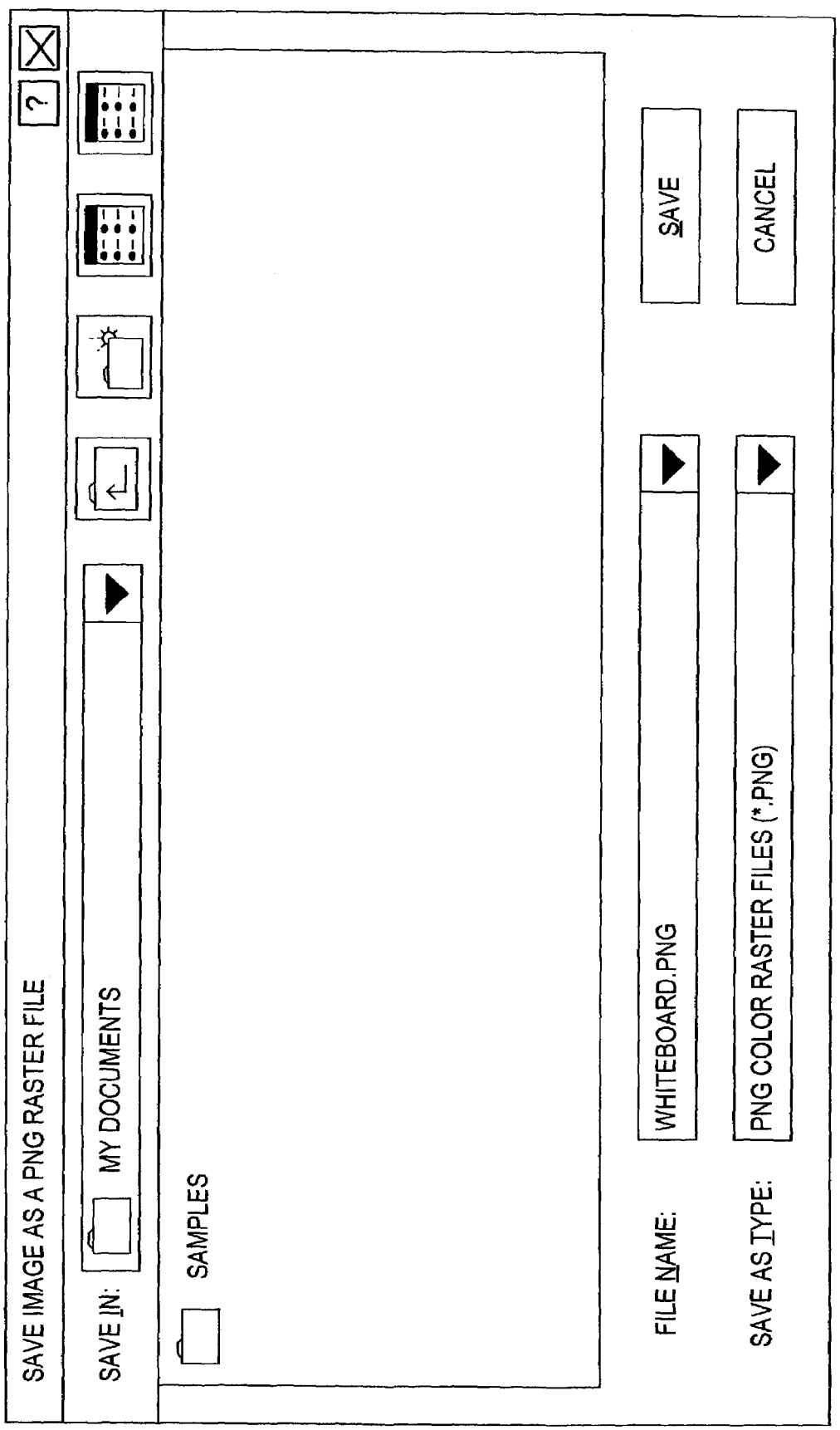
Figure 15:
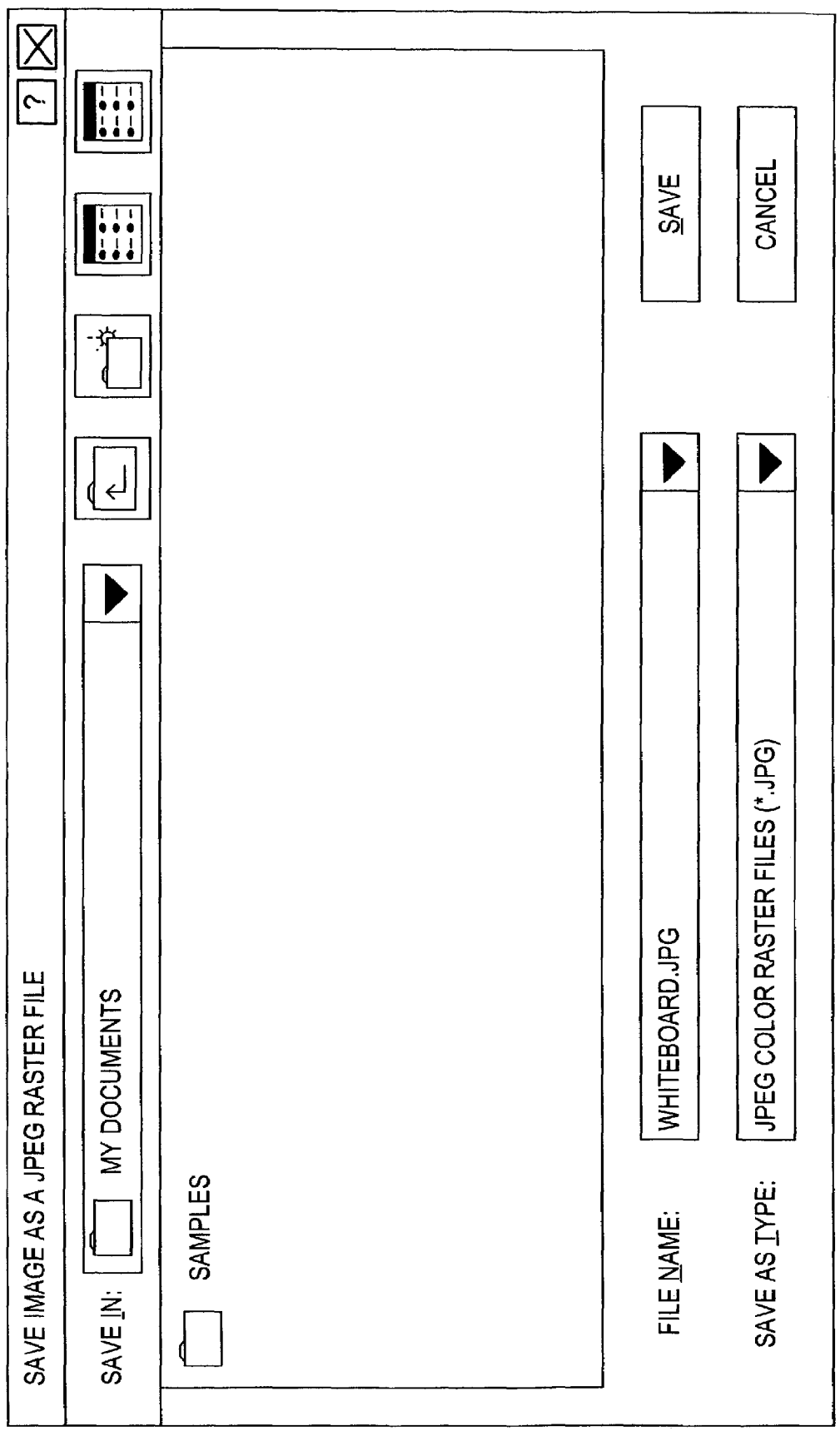
Figure 16:
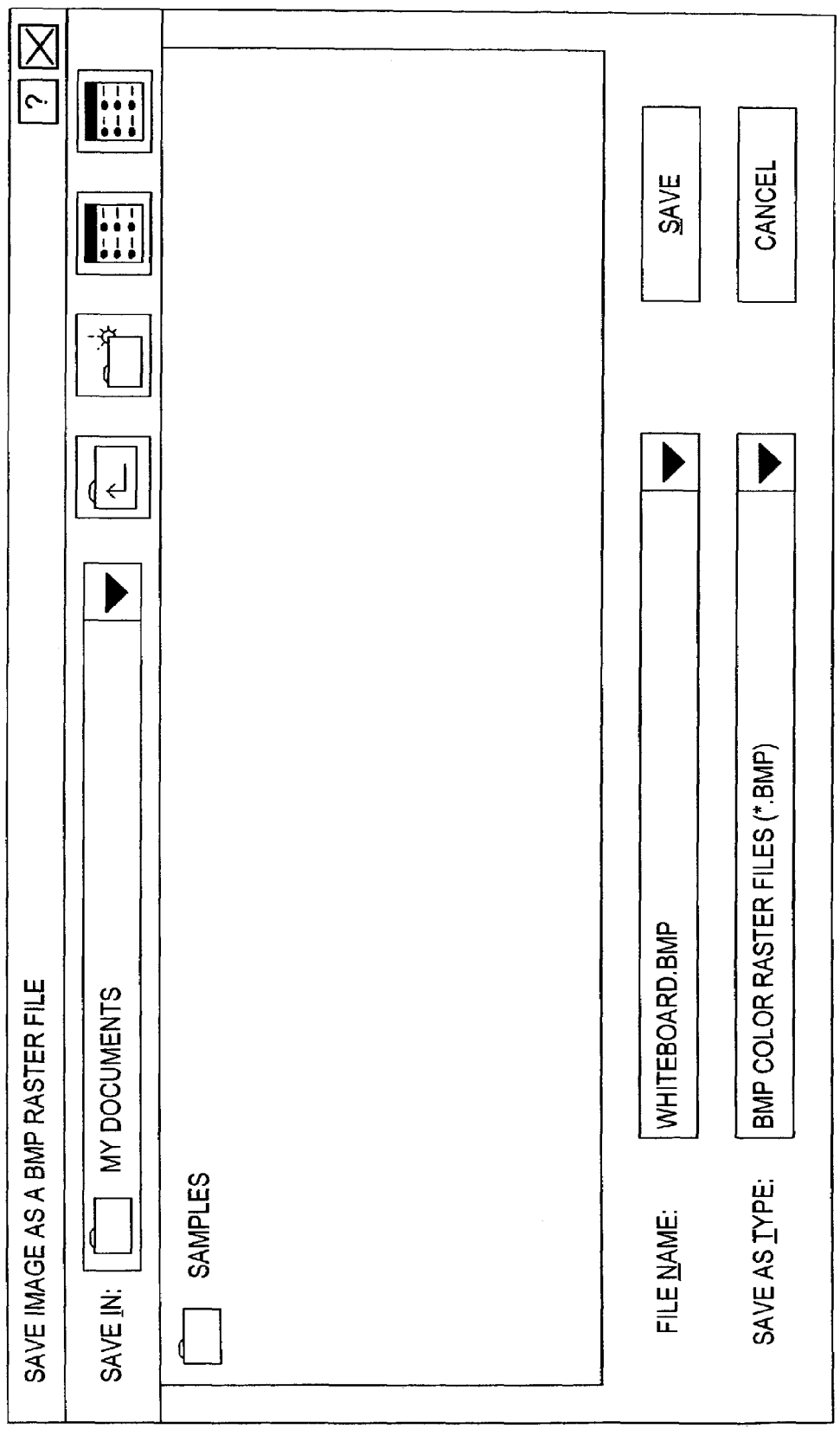
Figure 17:
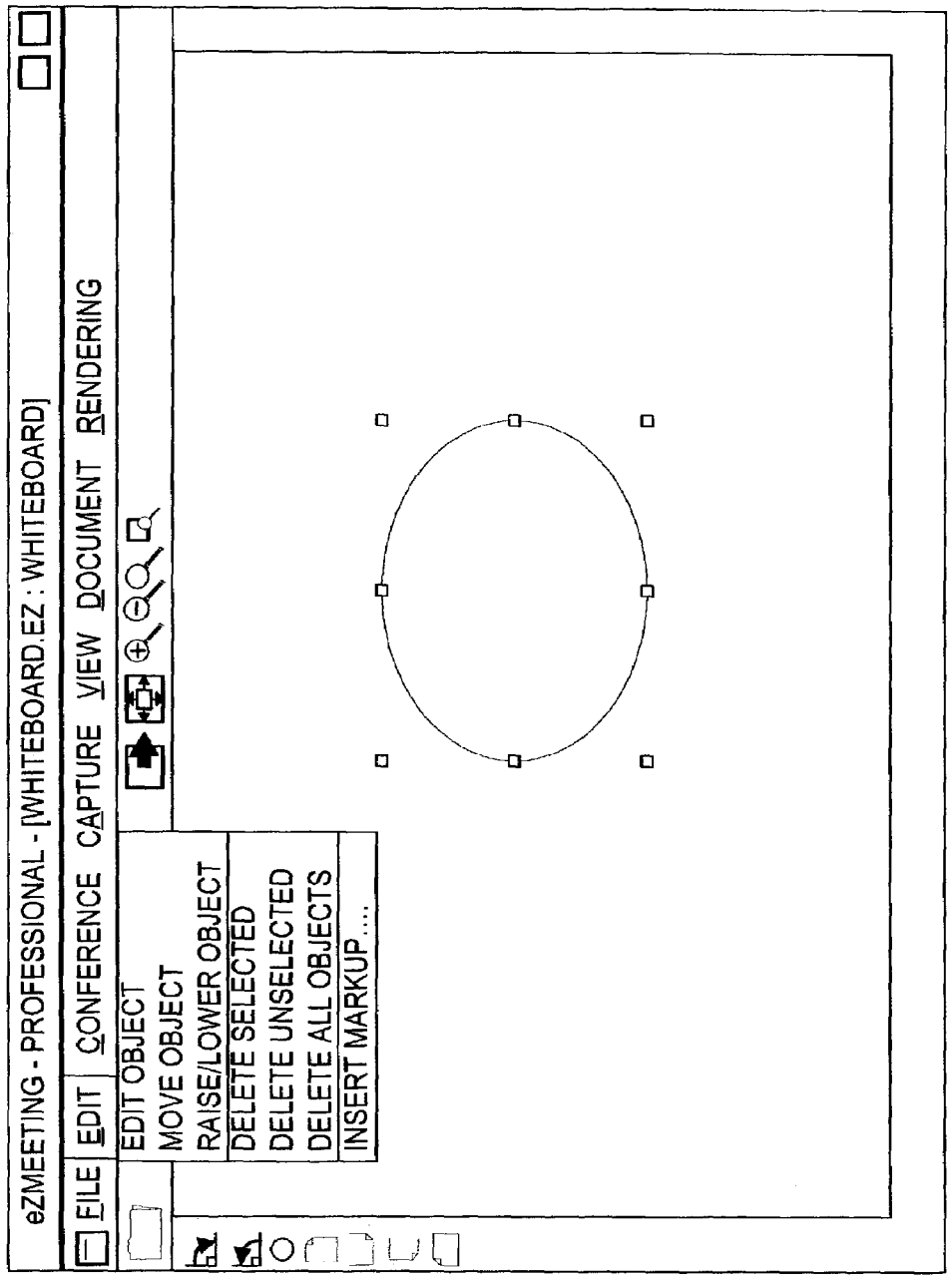
Figure 18:
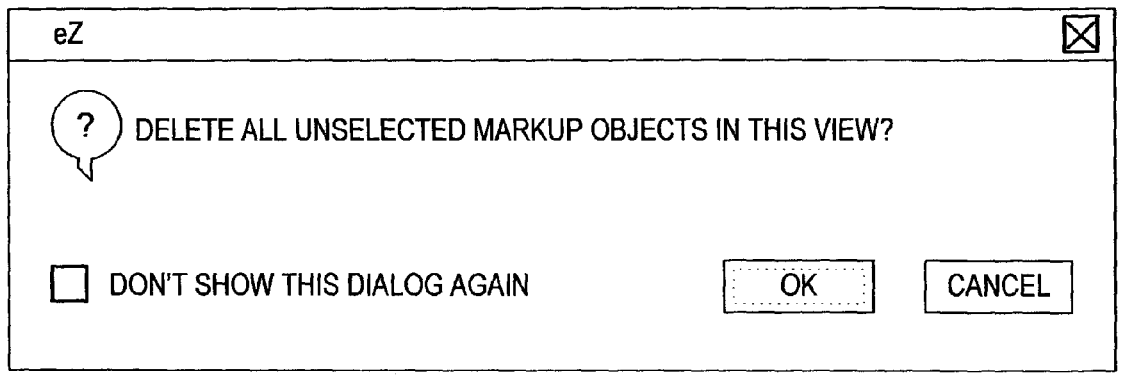
Figure 19:
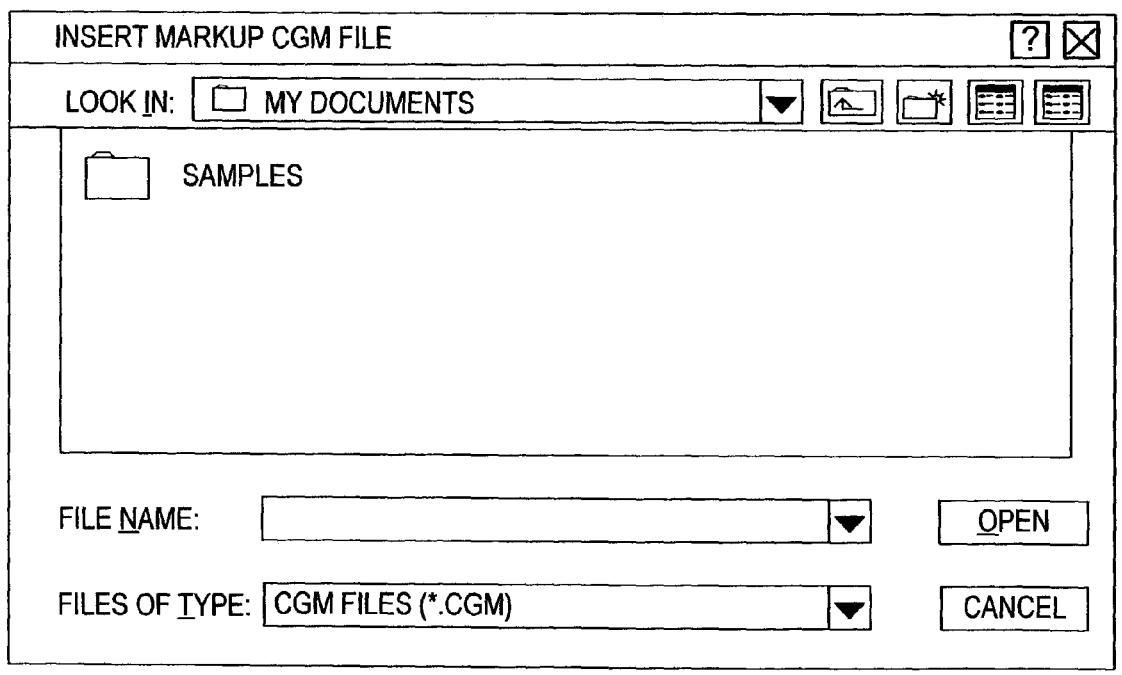
Figure 20:
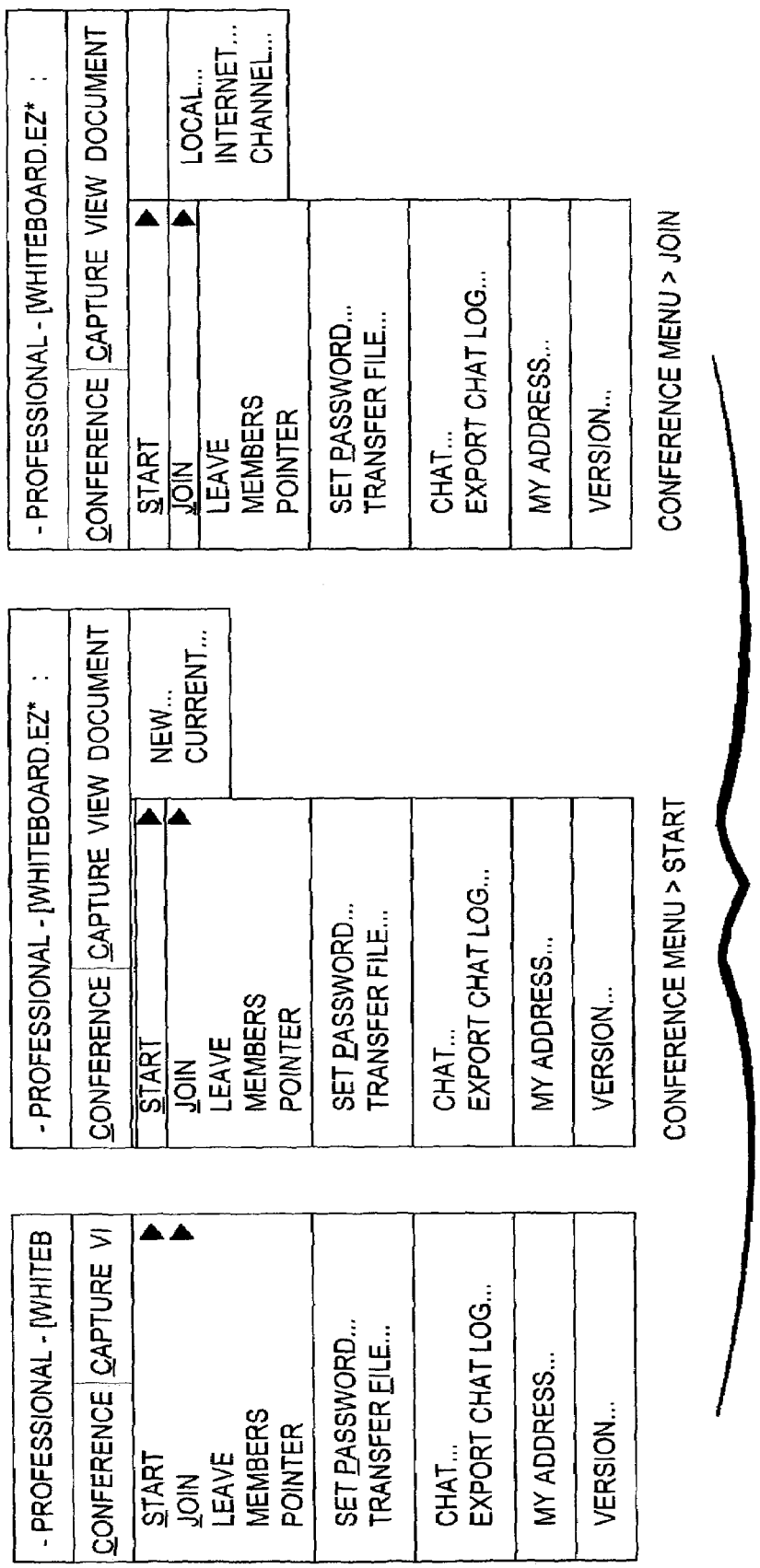
Figure 21:
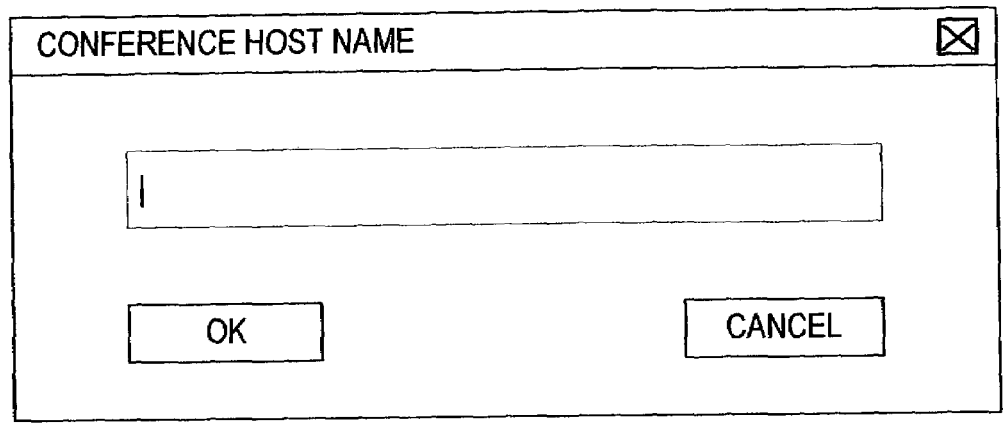
Figure 22:
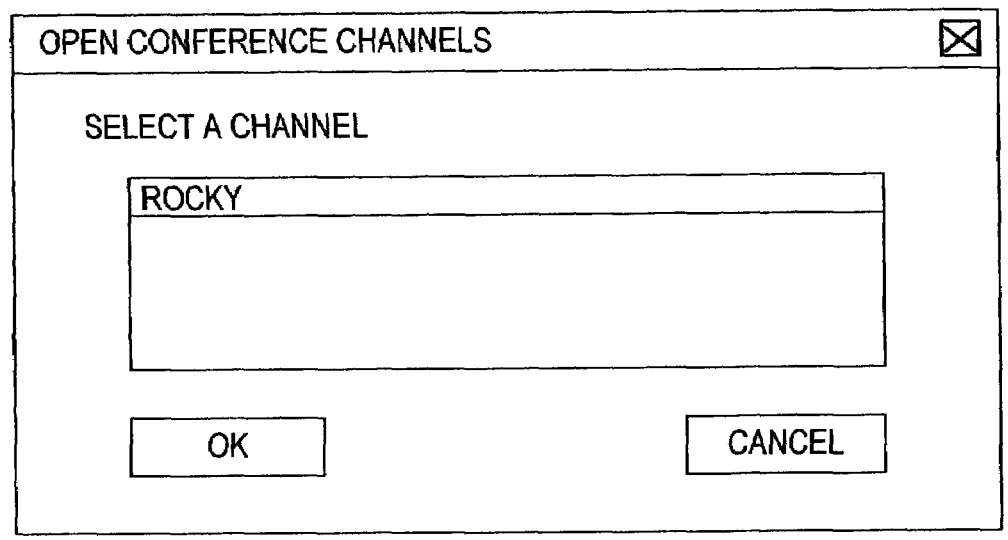
Figure 23:
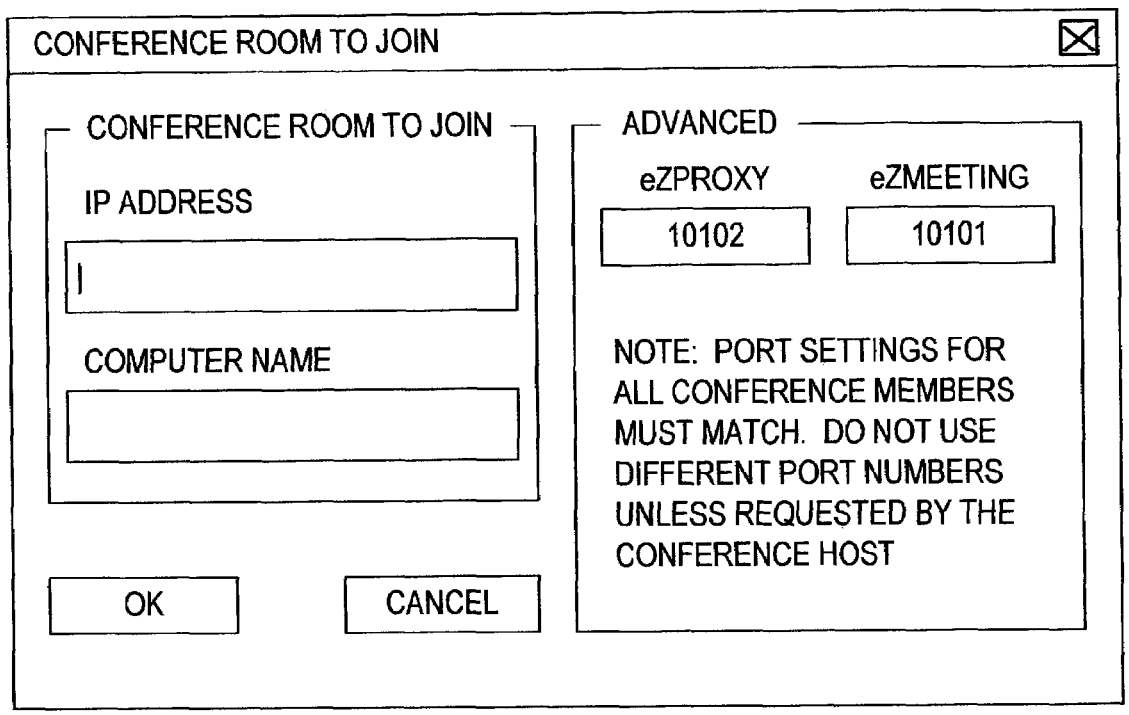
Figure 24:
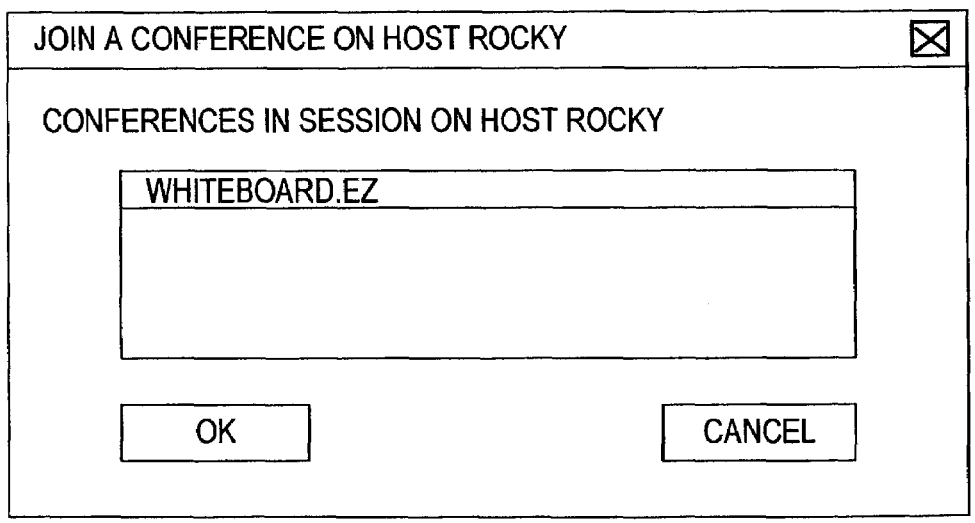
Figure 25:
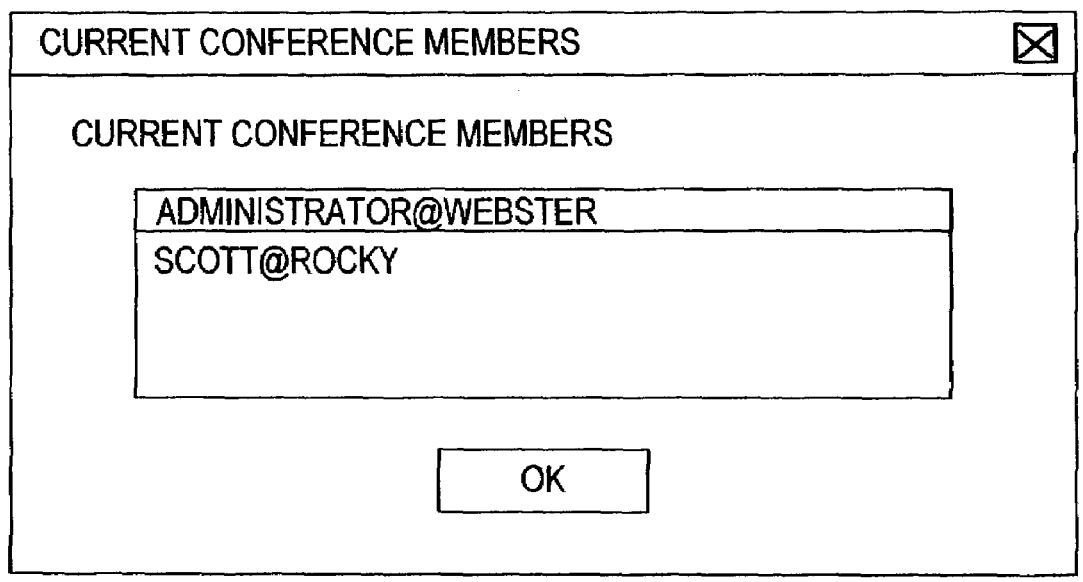
Figure 26:
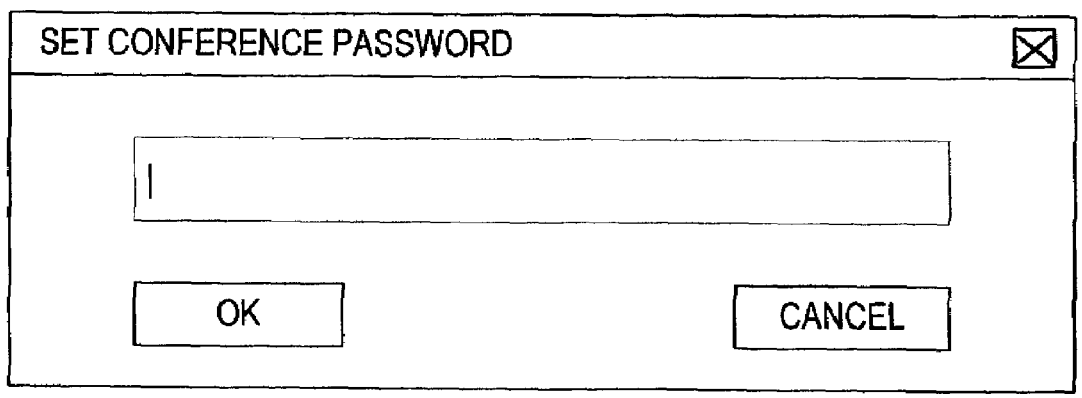
Figure 27:
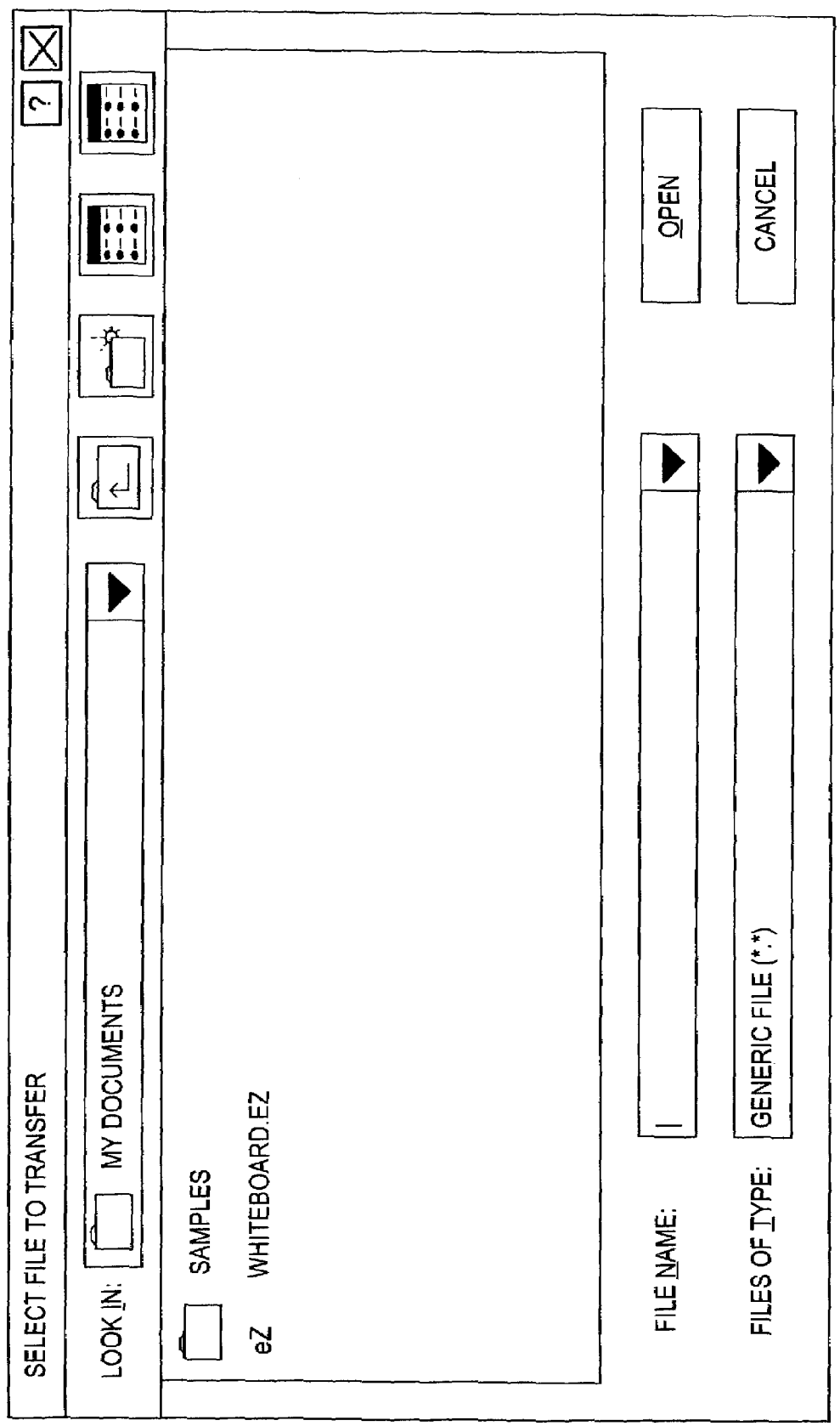
Figure 28:
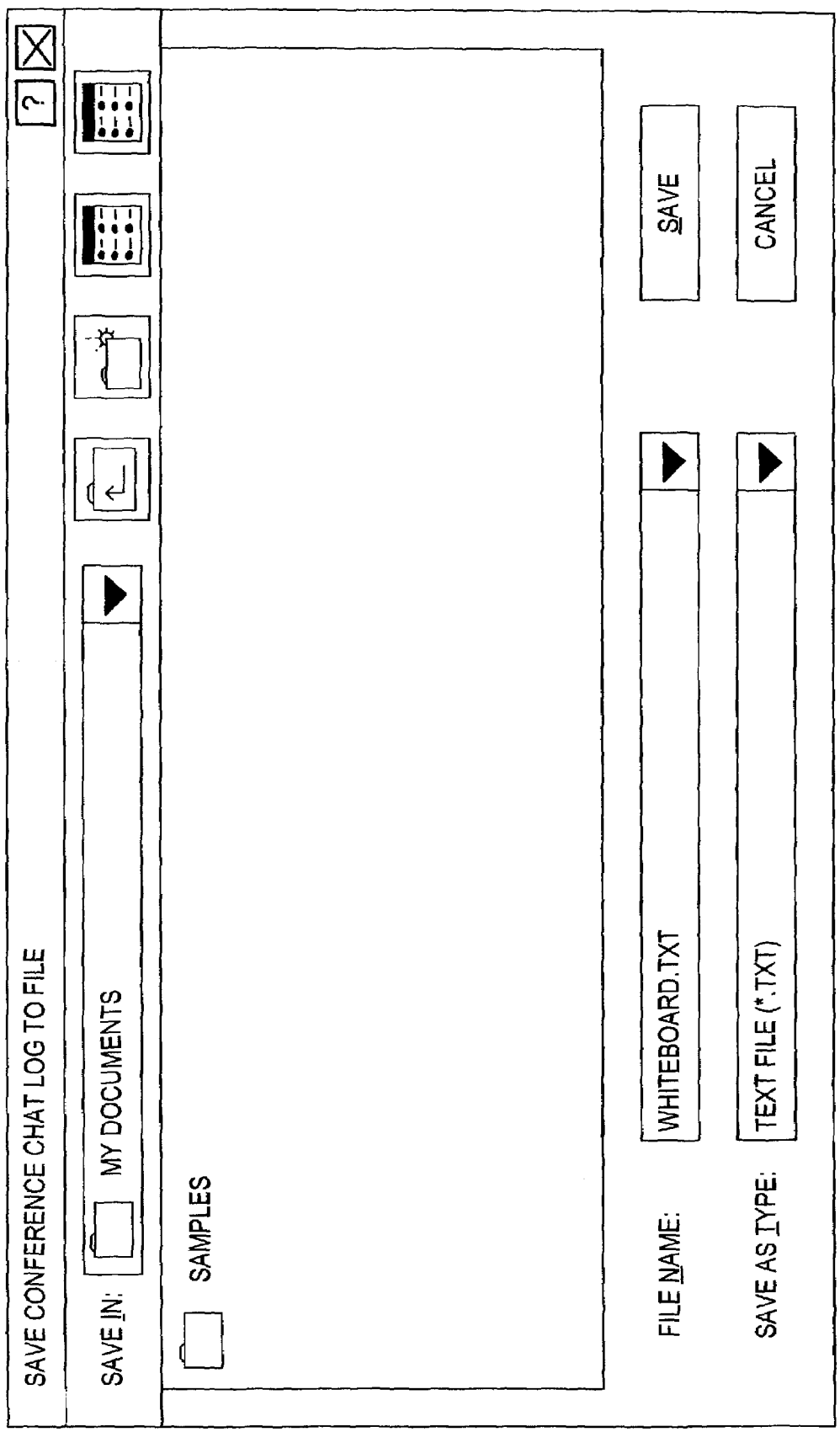
Figure 29:
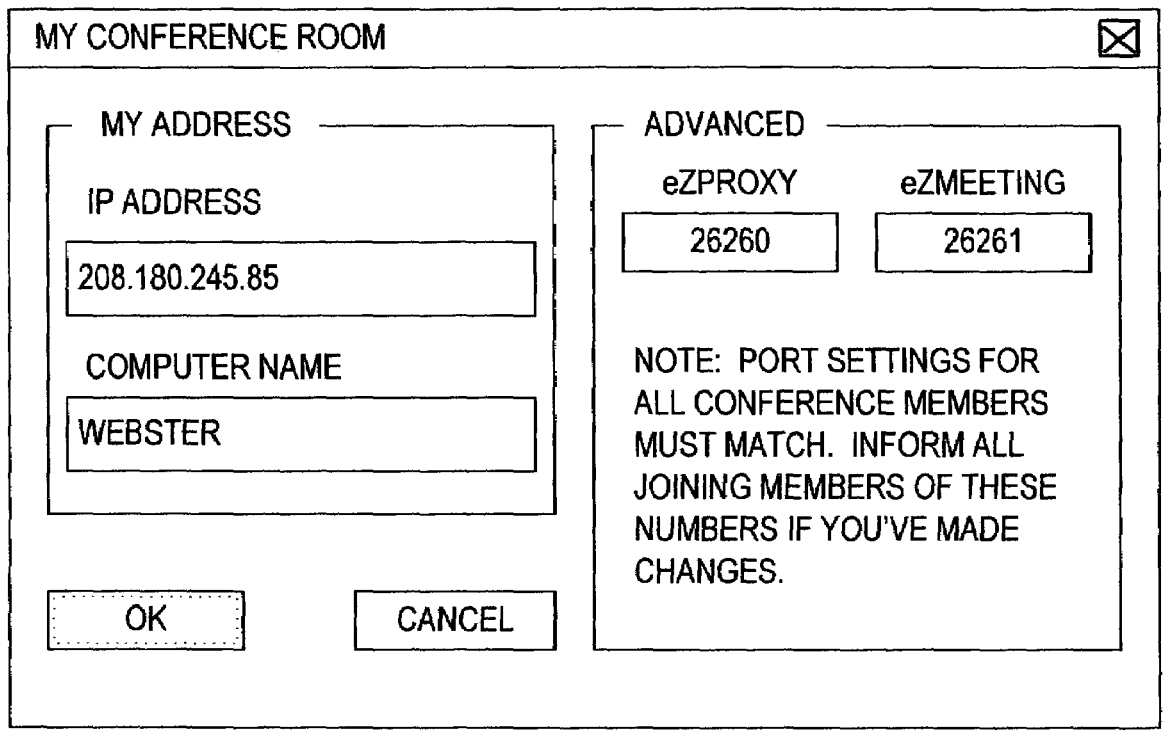
Figure 30:
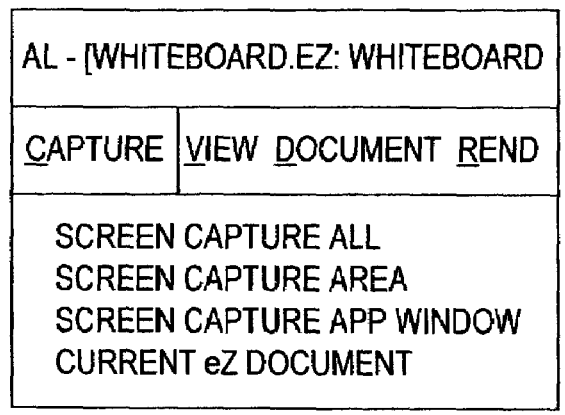
Figure 31:
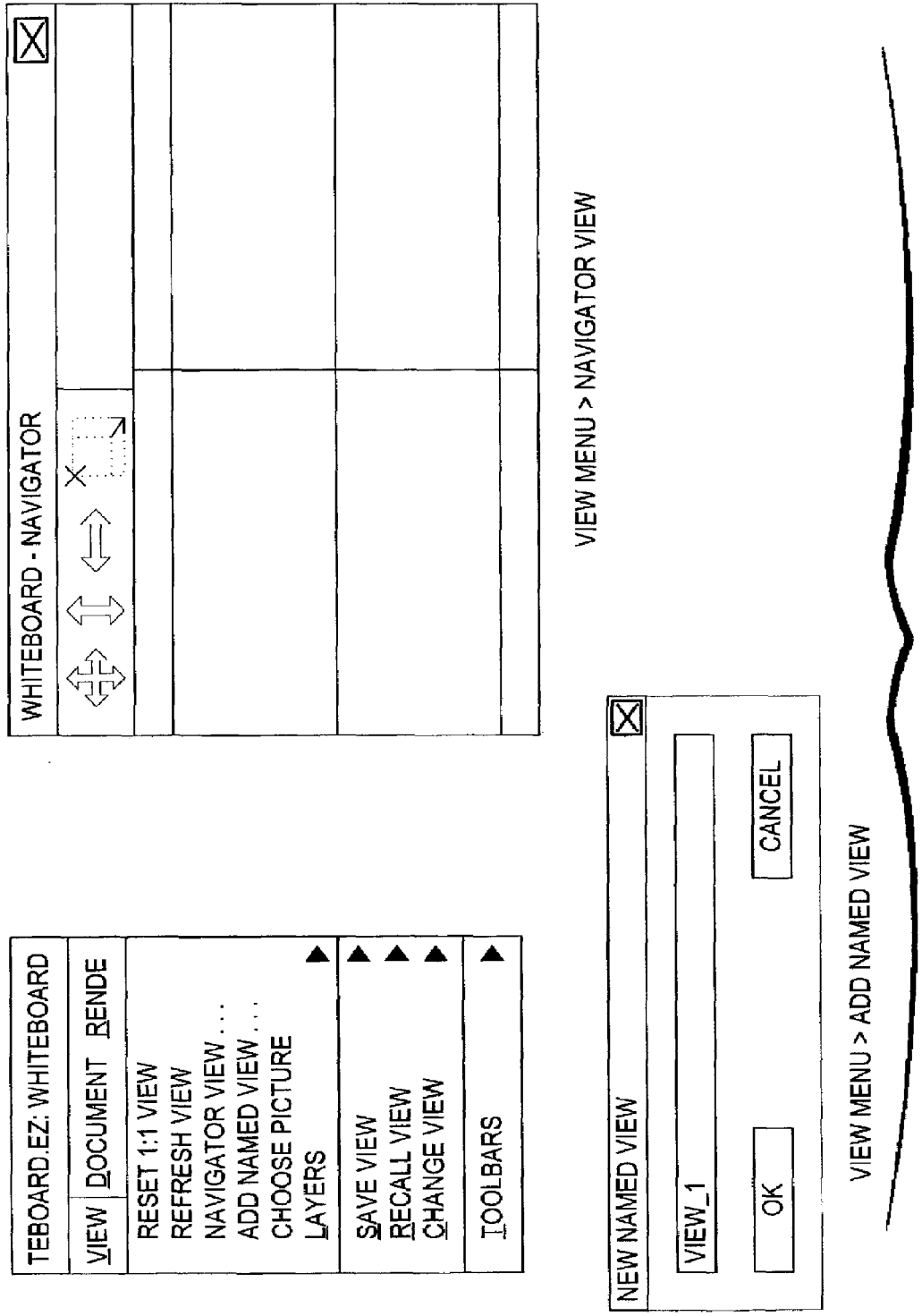
Figure 32:
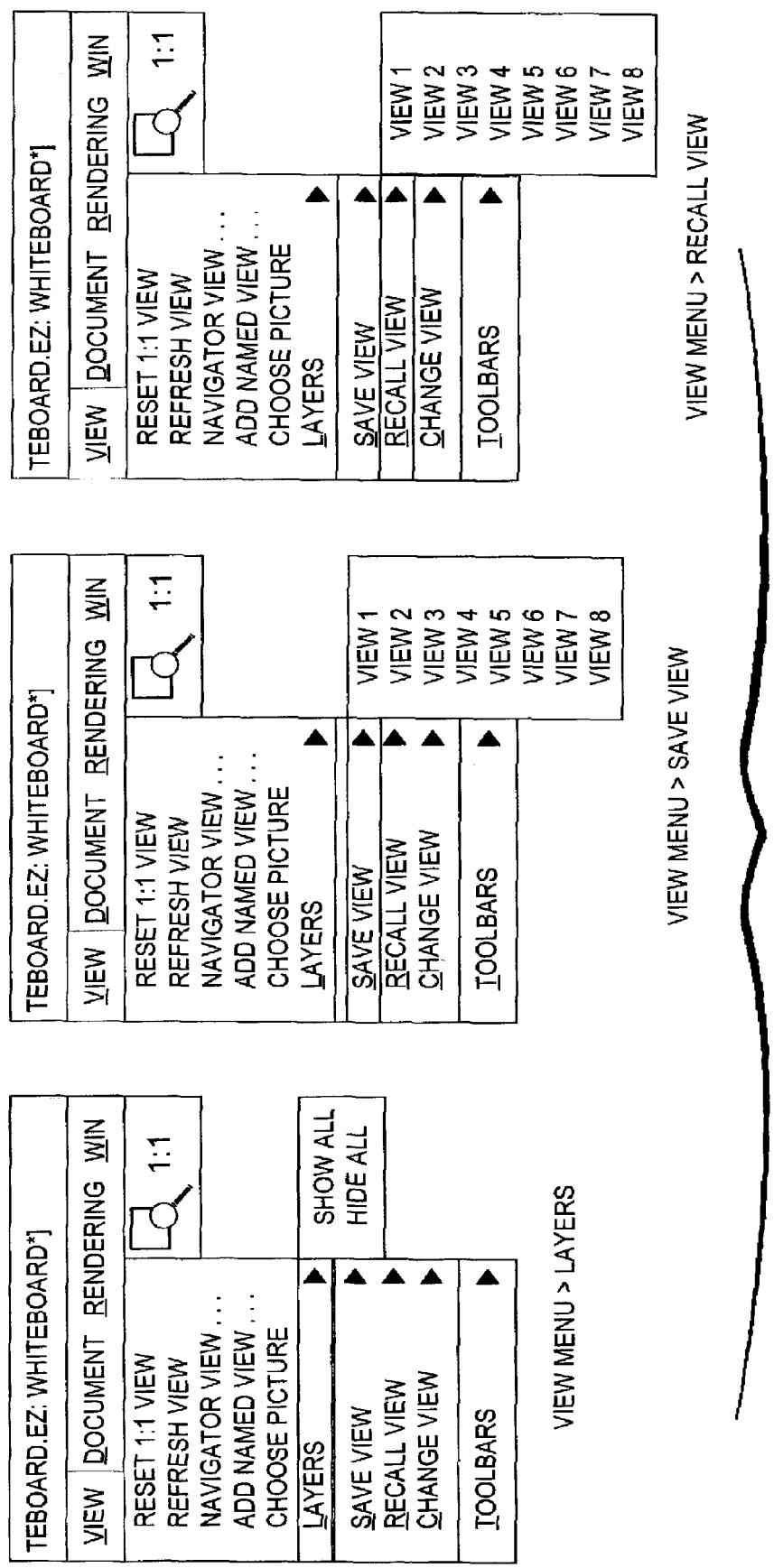
Figure 34:
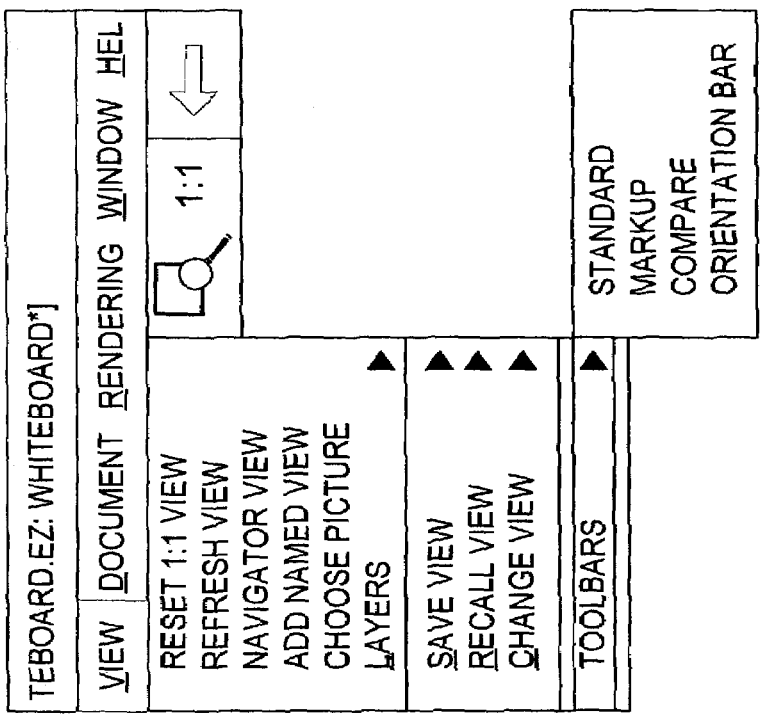
Figure 33:
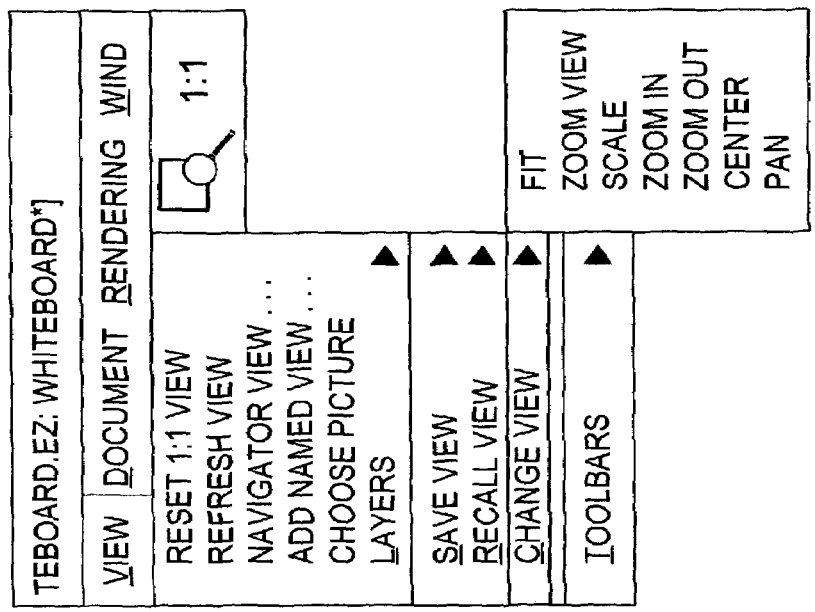
Figure 35:
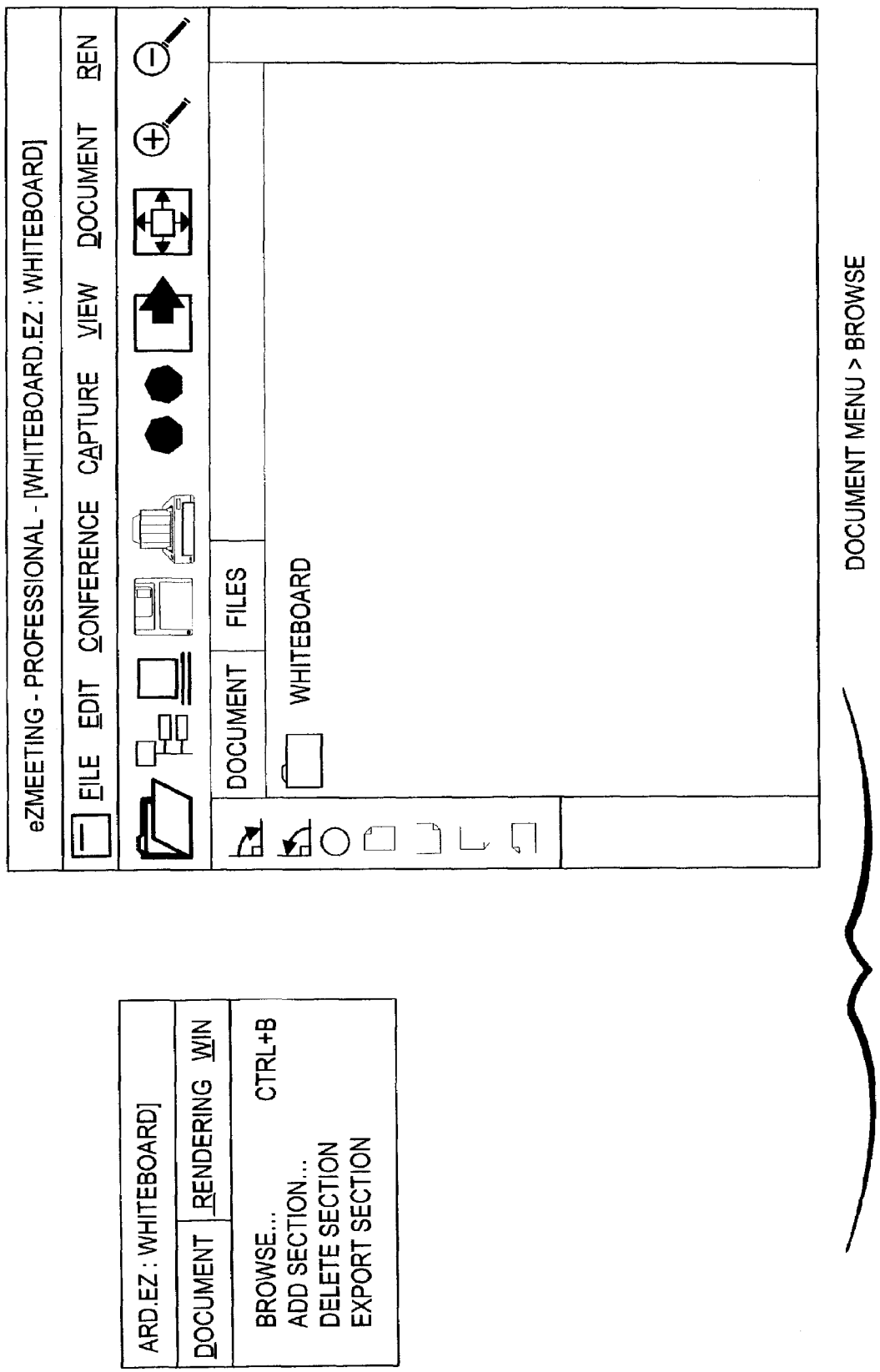
Figure 36:
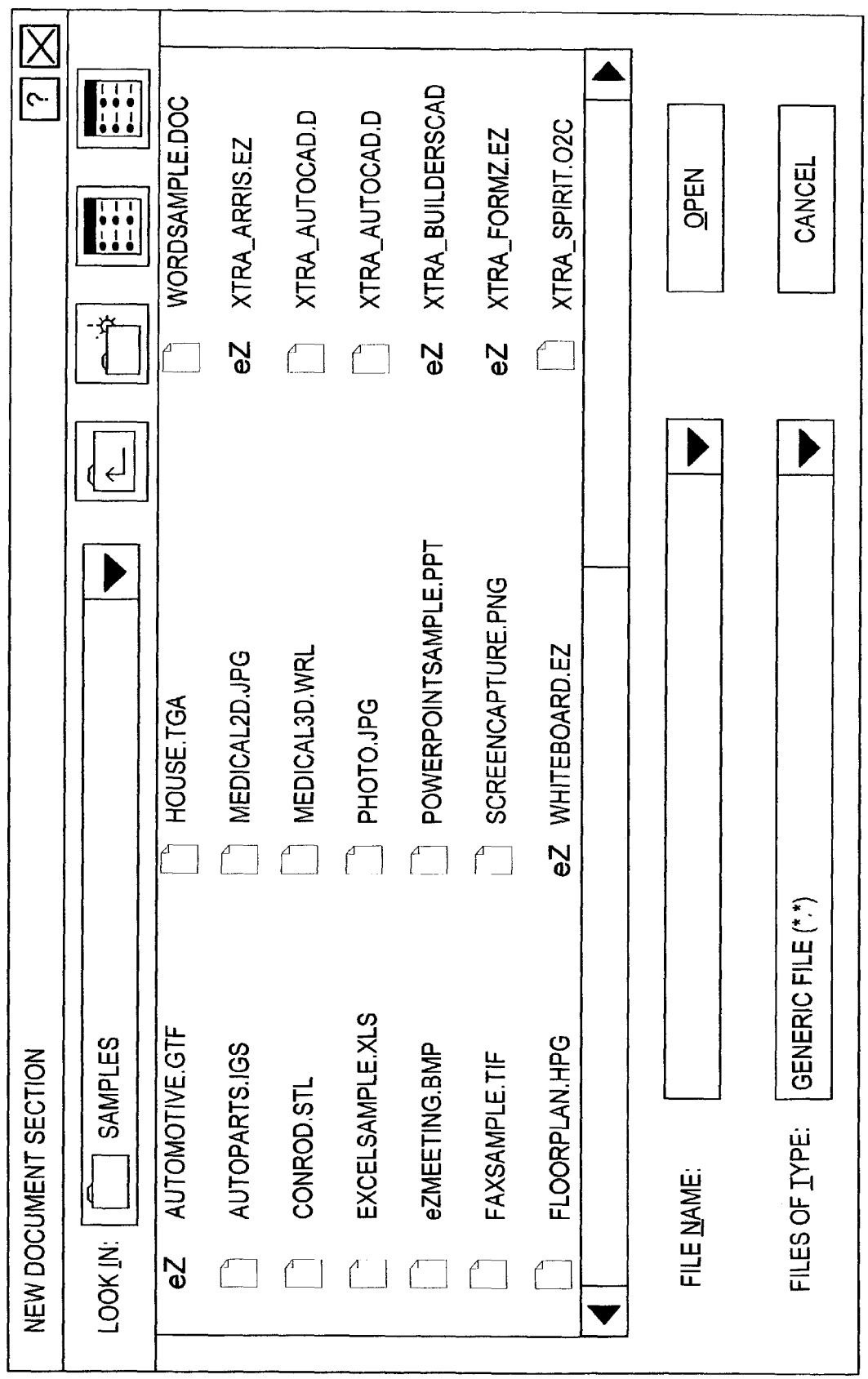
Figure 37:
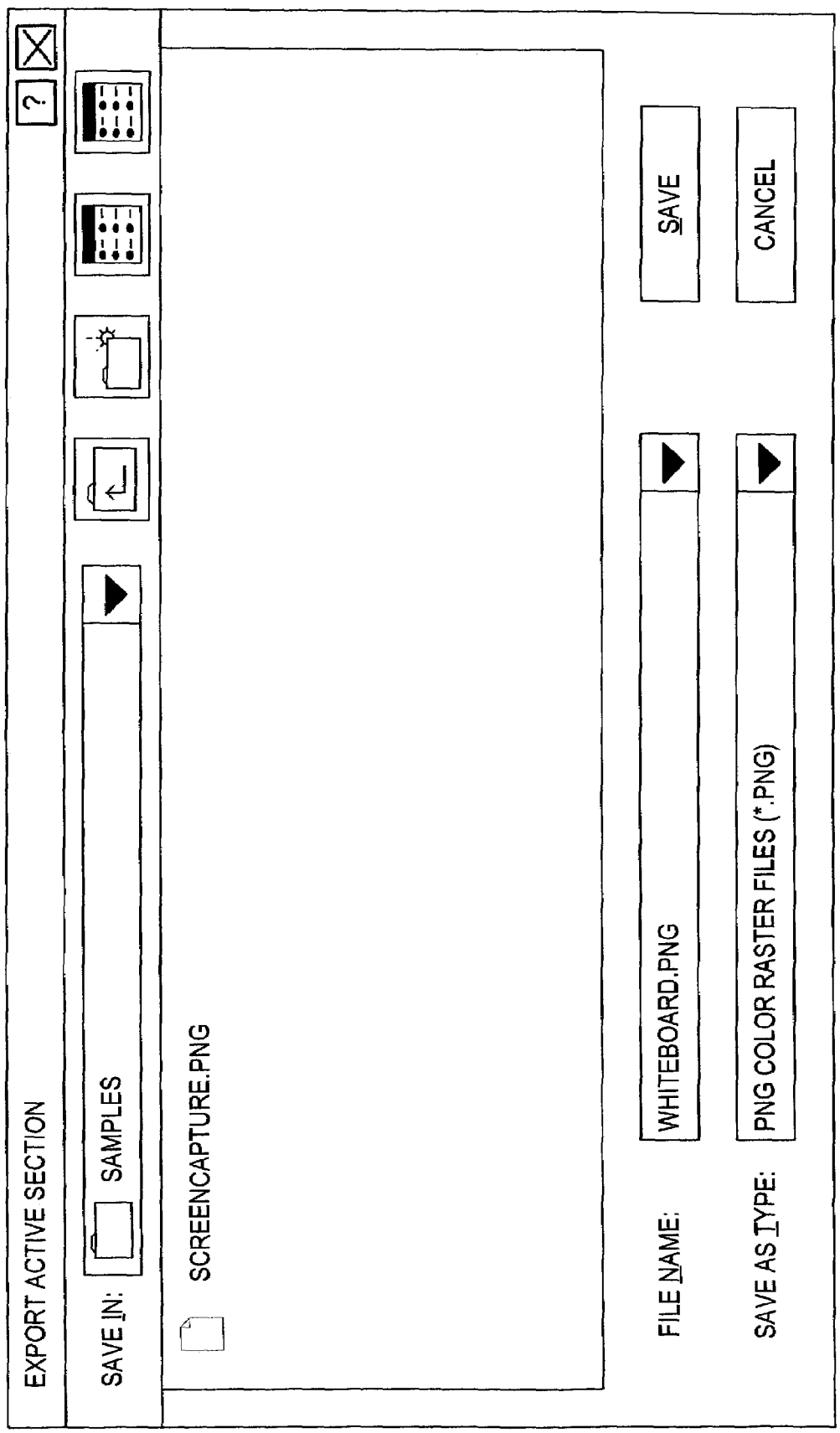
Figure 38:
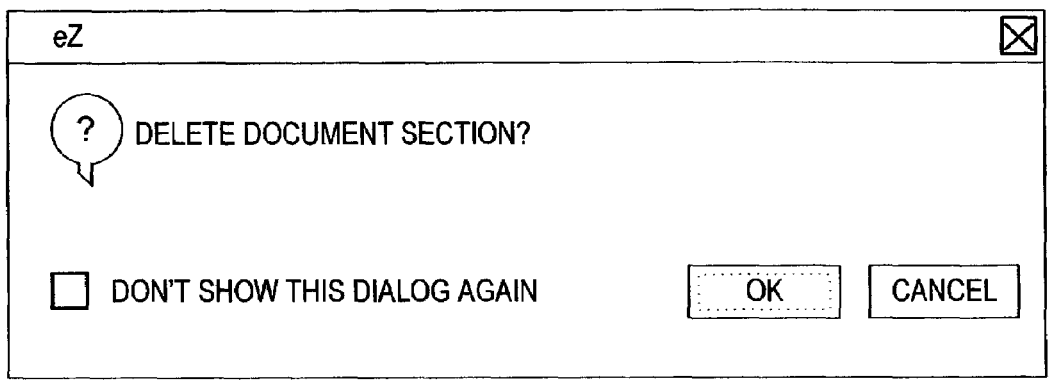
Figure 39:
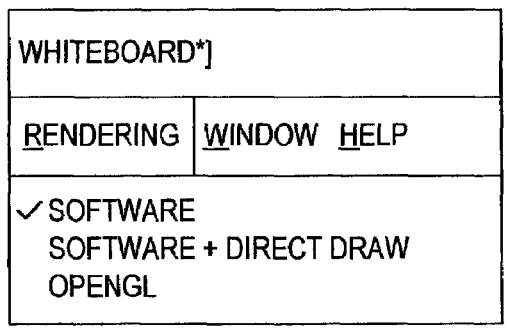
Figure 40:
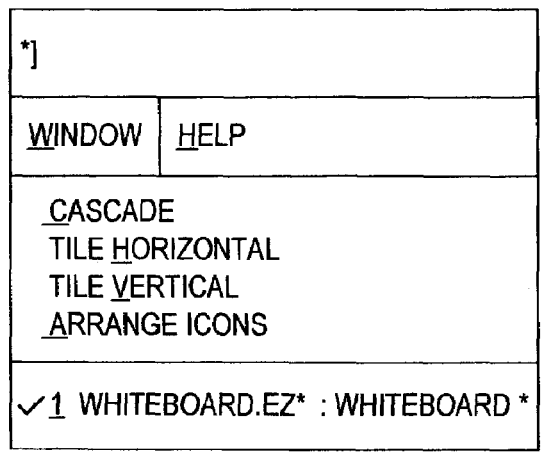
Figure 41:
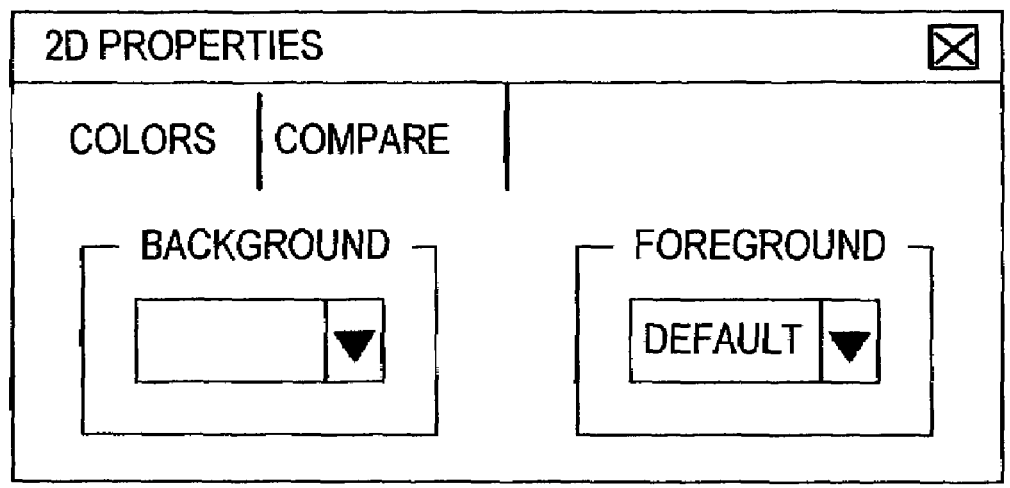
Figure 42:
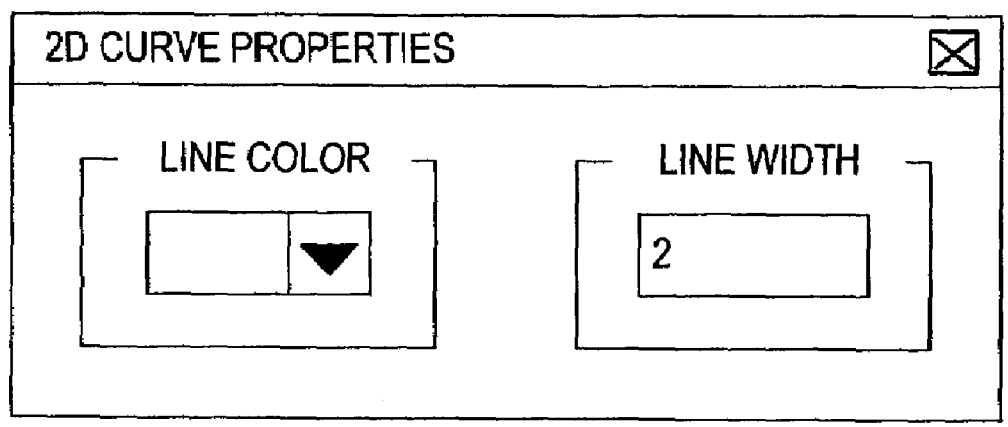
Figure 43:
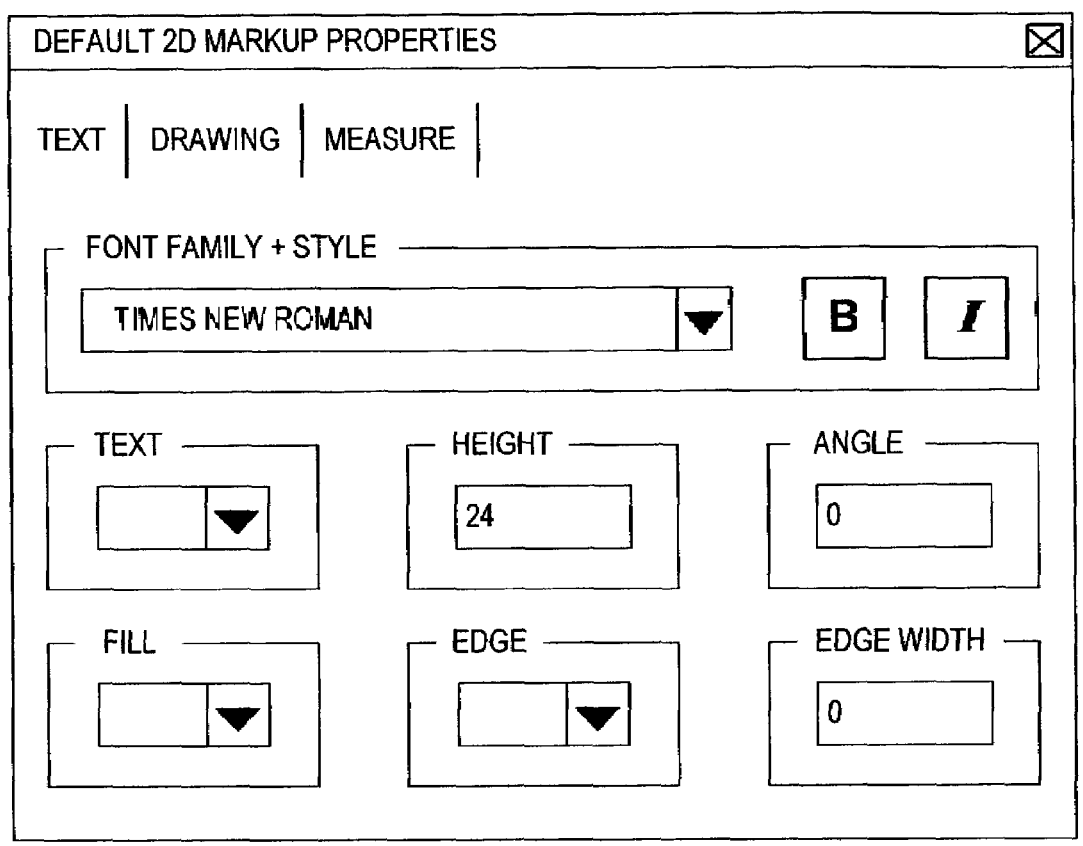
Figure 44:
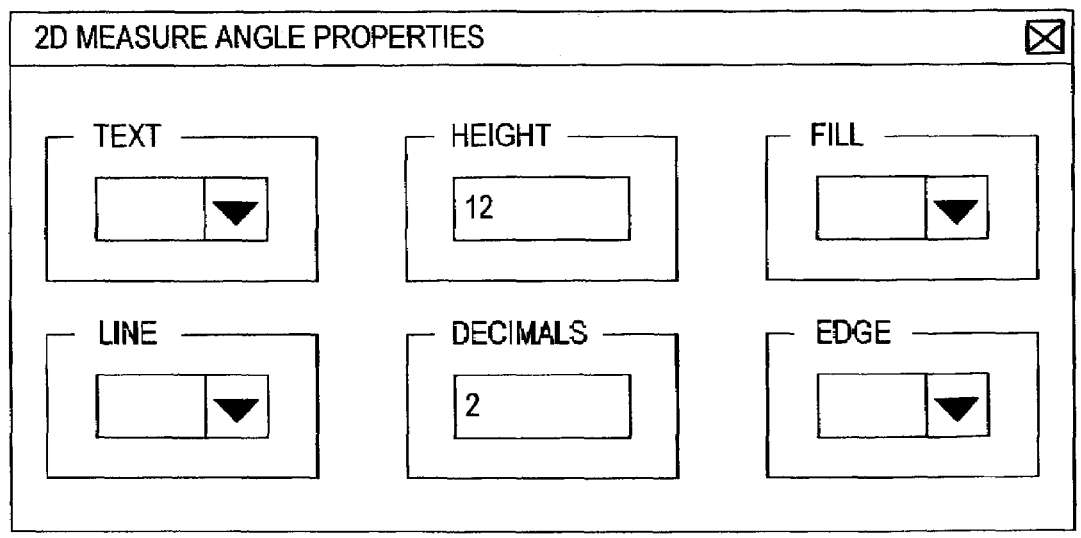
Figure 45:
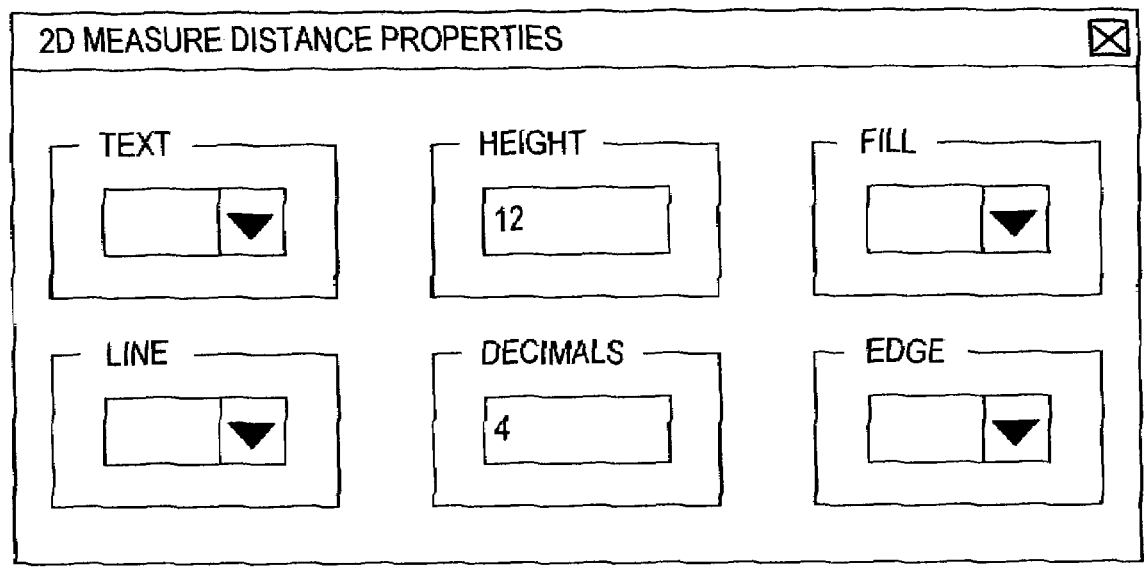
Figure 46:
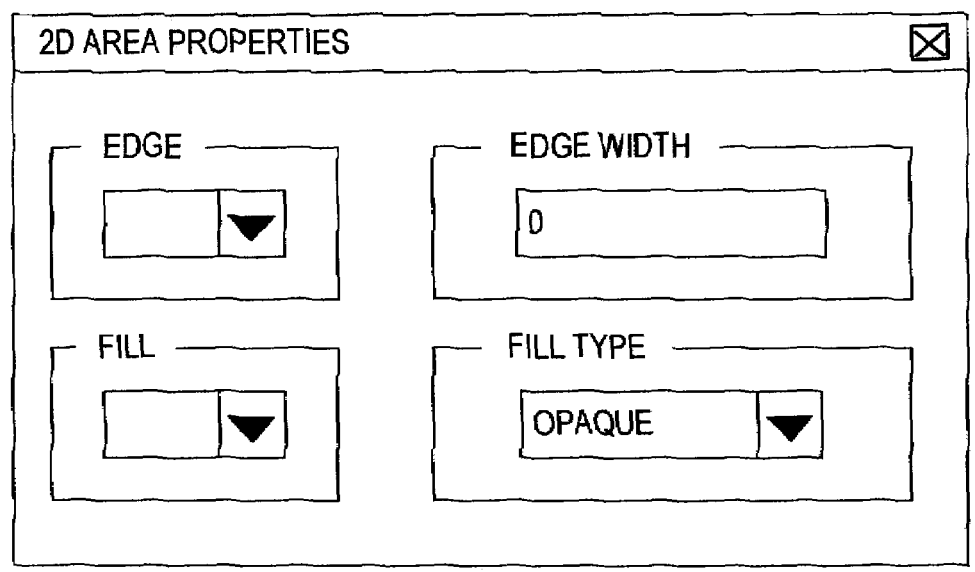
Figure 47:
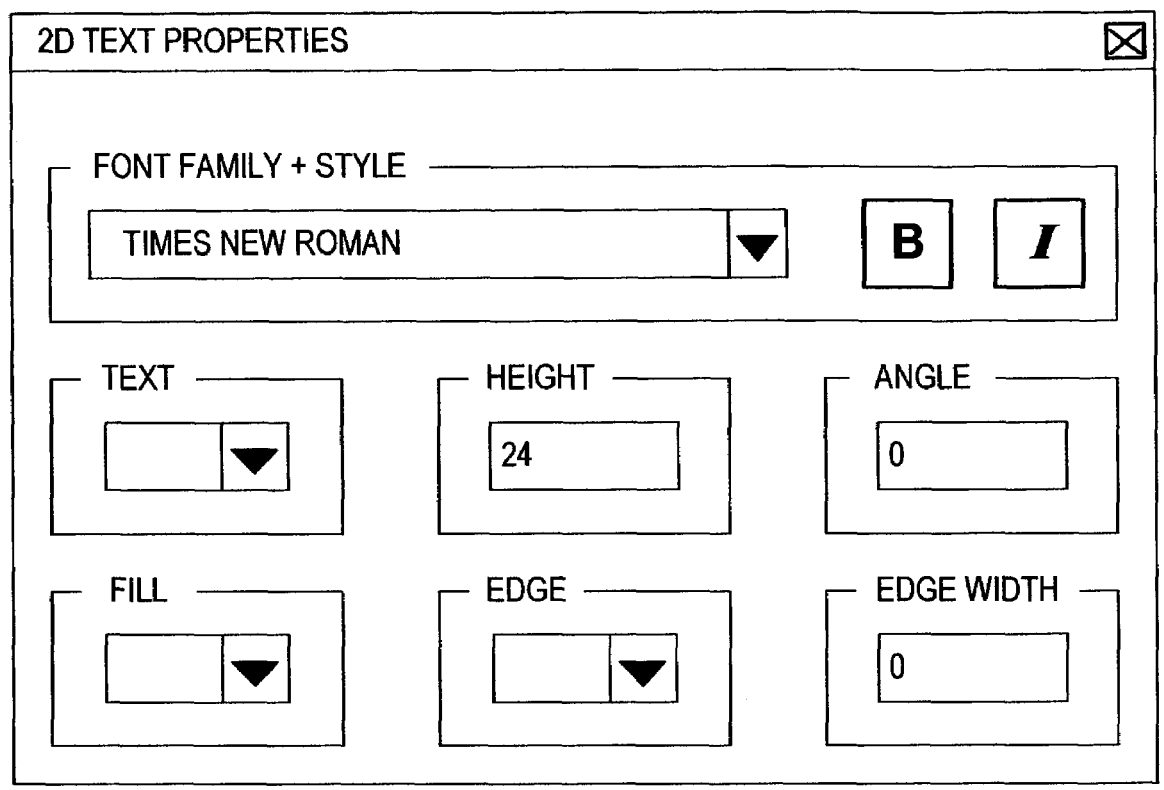
Figure 48:
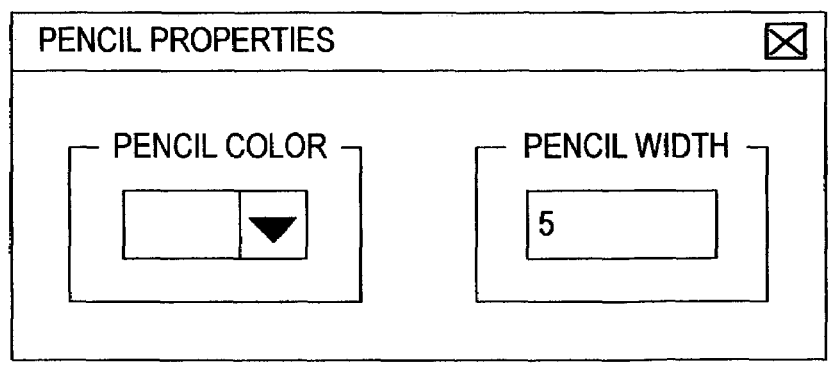
Figure 49:
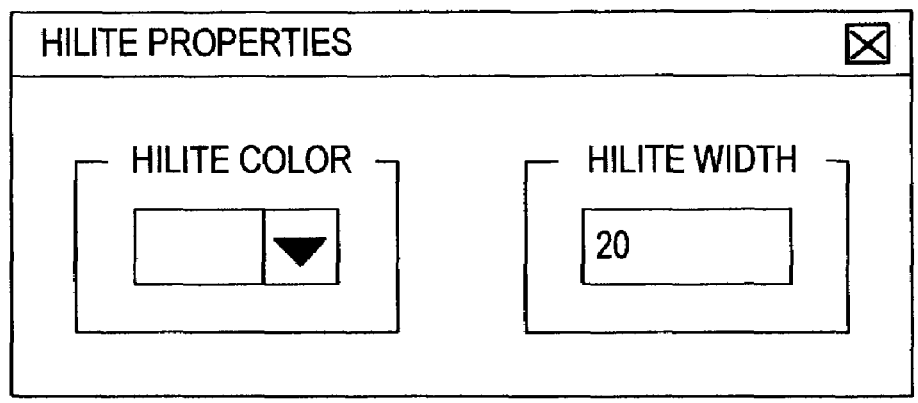
Figure 50:
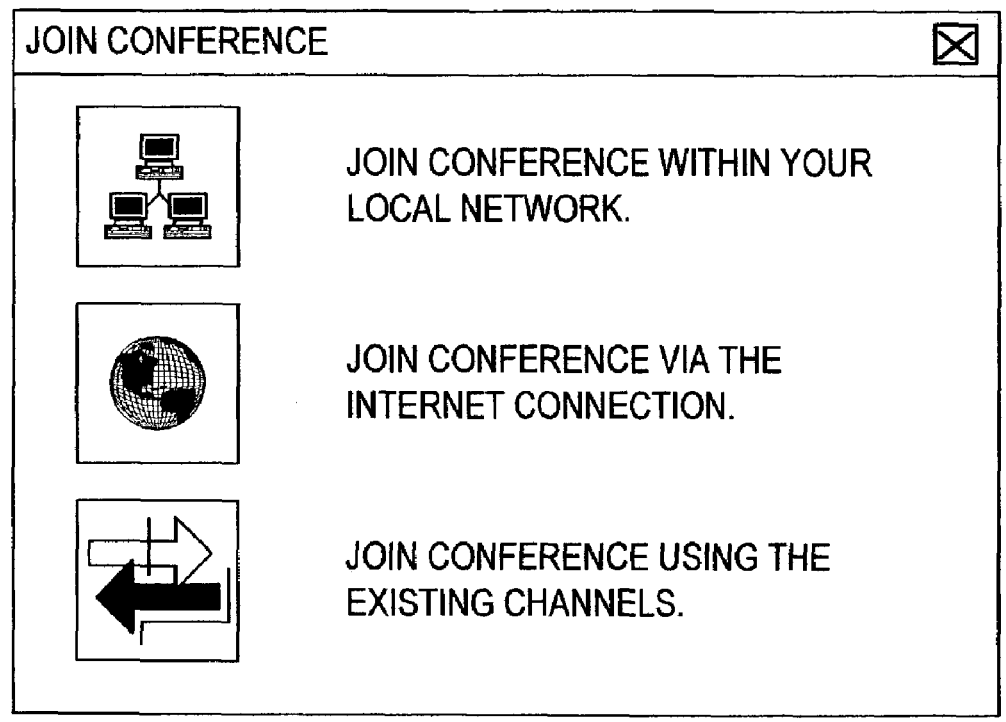
Figure 51:
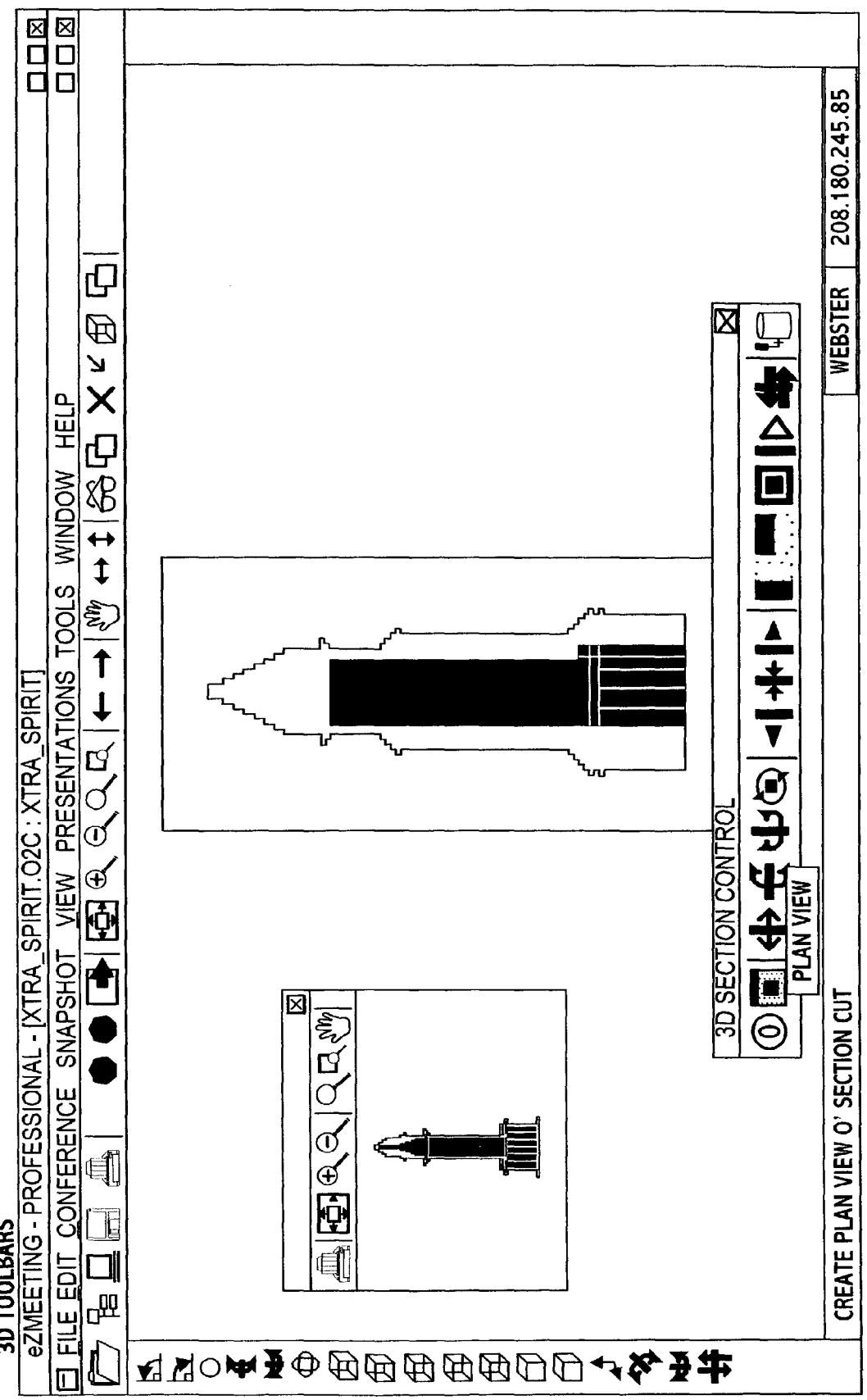
Figure 52:
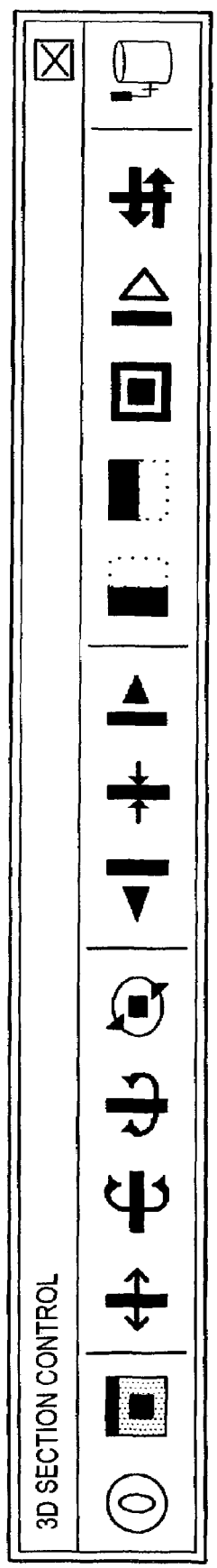

FIGS. 10A and 10B illustrate routing information embedded in packets. Routing information (e.g., IPs) are stored as they accumulate enroute to the conference host, thereby making the return route simple and fast. FIG. 10C illustrates the manner in which a user can join a conference using any of the IP addresses of the participants, that is, IP(1)-IP(4) as illustrated. FIGS. 11A and 11B illustrate the routing of information for sharing and relating purposes. For example, a conference participant A receiving documents from hosts B and C (FIG. 11A) can instruct participant C how to connect to participant B. FIG. 12 illustrates the use of the proxy module 60 in connection with a secured LAN and associated IPFW, router and firewall technology. An IANA registered port is designated as a proxy port. A router forwards packets for port 10102 to the proxy which authenticates all data and serves all eZmeetings running within the secured LAN.

FIGS. 13-52 illustrate a number of user interface screens generated using the collaboration application of the present invention. For examples, screens are generated to guide a user through such operations as creating a snap shot of an electronic file to be shared (FIG. 13), saving images in different formats (FIGS. 14-16), editing objects in a shared document (FIG. 17), deleting markups (FIG. 18), saving markups (FIG. 19), initiating a conference or joining a conference initiated by another (FIGS. 20-29), capturing all or part of a screen image or window (FIG. 30), viewing operations (FIGS. 31-34), document management operations (FIGS. 35-38), rendering operations (FIG. 39), window operations (FIG. 40), property dialog selection (FIGS. 41-49), connection options (FIG. 50), and 3D toolbar options (FIGS. 51 and 52), among other function, operation, menu or property selections.

With regard to localization and resource dynamic link library (DLL), text strings used in menus, toolbar, short tool tips, long tool tips, dialog messages, alert messages are all consolidated and externalized in one DLL distributed with the software. Modifying Gtvrestc.dll with Microsoft Visual Studio under the appropriate local Windows environment is the only step required to localize the collaboration application 30. MSVC 4.2 is particularly useful.

With regard to internationalization (e.g., Asian or multi-byte characters support), the multi-byte character recognition/display in the collaboration application 30 is preferably implemented through Microsoft IME as input and standard Microsoft text display API. Its original text format remains intact in saved markup text. Therefore, unique texts/fonts cannot be displayed properly in Windows environment other than in the language/country it is created. Due to the nature of document sharing and command messages interpretation, a native Microsoft Windows for the desired language/country is preferably required for all participating conference members. The collaboration application 30 markup text does not support language software that intercepts and manipulates text messages to display multi-byte on a regular version (e.g., United States version) of Windows. The collaboration application 30 is designed for real-time conferences/meetings internationally. As long as there is a connection to the internet, there are no geographic boundaries. Therefore, a common language/font (e.g., English) is recommended for all markup texts. Using special language/fonts such as Chinese, Japanese is preferably limited to conferences within the country.

With regard to version compatibility, the collaboration application 30, with the proxy module 60, is capable of handling DHCP, IP forwarding and Network Address Translation through various types of servers running Microsoft Windows, linux, sun solaris, sgi irix, and so on. While general limit and group provisions to separate meetings can be used, a password scheme is preferred. To have a private meeting room, a user can set the password (e.g., under the conference menu) and give that password only to those members allowed to join. By default, the password is not set nor is it required.

The collaboration application 30 can be built on Windows 2000, as well as WIN9x (Me/98/95) and Window Nt4/Whistler(beta) with Microsoft Office97/2000/XP. It is designed to run on essentially all Microsoft 32-bit Windows systems.

In accordance with another aspect of the present invention, the collaboration application 30 is configured to support a plurality of connection states and mixed mode conference participation. For example, hosts and clients to a conference can include one or more users in respective modes such as, but are not limited to, local only mode, out-going only mode and full access with valid IP mode. Accordingly, users behind a firewall with outgoing-only internet access can join other conferences without requiring a properly configured proxy running locally. Further, the proxy module 60 is configured to allow outgoing-only non-proxy conference participants to connect it as a relay server to host conferences without requiring a properly configured proxy running locally.

The collaboration software can also support PDF, 3DS and other extended file type support, as well as thumb nails and file organization functions, Microsoft Office markup, paint operations, different encryption options, e-mail, voice over IP, video, 3D client viewer for web-delivered information, cut and paste operations from other applications, texture mapping, and so on.

By linking conference members directly, the present invention greatly enhances everyone's ability to communicate and interact in a "live" environment. The present invention employs a P2P architecture wherein all conference members have equal participation in the conference. Web-based systems simply cannot deliver this level of connectivity and interaction. In addition, the direct pipelines formed between conference members allows for multi-directional communication such that input from multiple members of the conference is allowed simultaneously. There is no stop and wait. Thus, the system of the present invention is much like the behavior of existing telephone systems wherein interaction is natural and spontaneous.

The present invention exceeds other collaboration solutions in terms of performance because it enables conference team members to see documents from multiple locations at the same time. Further, they can collaborate on multiple types of files all at the same time within the conference. This means that one member of the conference might be sharing a Word document, while another shares an Excel spreadsheet, and another member of the conference is showing a digital photo that is relevant to the overall discussion. Everyone can see each other's information, and everyone can work with each other's data.

The P2P architecture of the present invention is private by design. There is no dependency on outside servers or third parties. The collaboration application 30 places users in complete control of their organization's proprietary information. The unique "owner-in-control" design of the present invention keeps all conference documents at the computer from which they originate. All conference members collaborate directly with the original document on the owner's computer. Only the owner of a particular document has an actual copy of the information that can be saved and printed. Because the present invention facilitates direct, totally private interactions between document owners, it avoids copyright infringement and other intellectual property issues associated with many peer-to-peer models that use public servers to enable information sharing.

Figure 53:
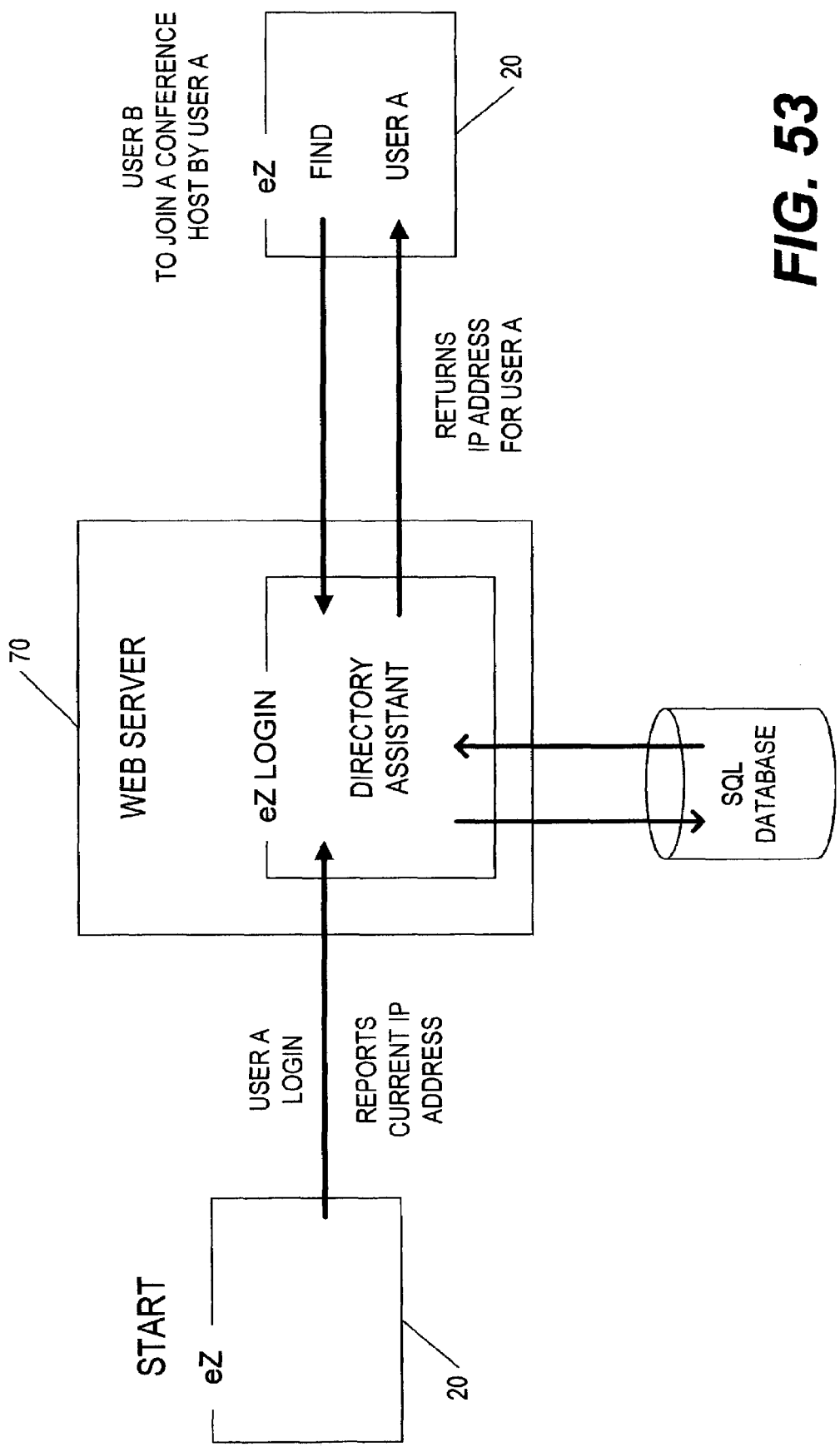
FIG. 53 illustrates a server for simplified conference log-in procedures in accordance with an embodiment of the present invention.

With reference to FIG. 53, the IP address and proxy routing can be shielded from end users for user friendliness purposes. Basically, each user is provided with a "NAME" and can join a conference by simply referring to the "NAME" of another known user. The "login" procedure can be added to the startup sequence of the collaboration application 30. Essential data regarding the user/host identification, connection IP and associated properties are reported to a "server" 70 that keeps track of the whereabouts of all active users. Therefore, when joining by "NAME", the "server" 70 responds to a request from the collaboration application 30 and supplies the necessary information for immediate and direct connection. This "server" 70 can either be a web server providing the database service for general the collaboration applications 30 of users worldwide or a proprietary server customized and installed within a corporation for privacy. In the illustrated example of FIG. 53, User A logs in and reports a current IP address, and User B joins the conference hosted by User A. The server 70 helps to find other users by name. The SQL database maintains a list of users that are currently logged in. Once User B obtains the address for User A, a direct channel is established between User A and User B.

Figure 54:
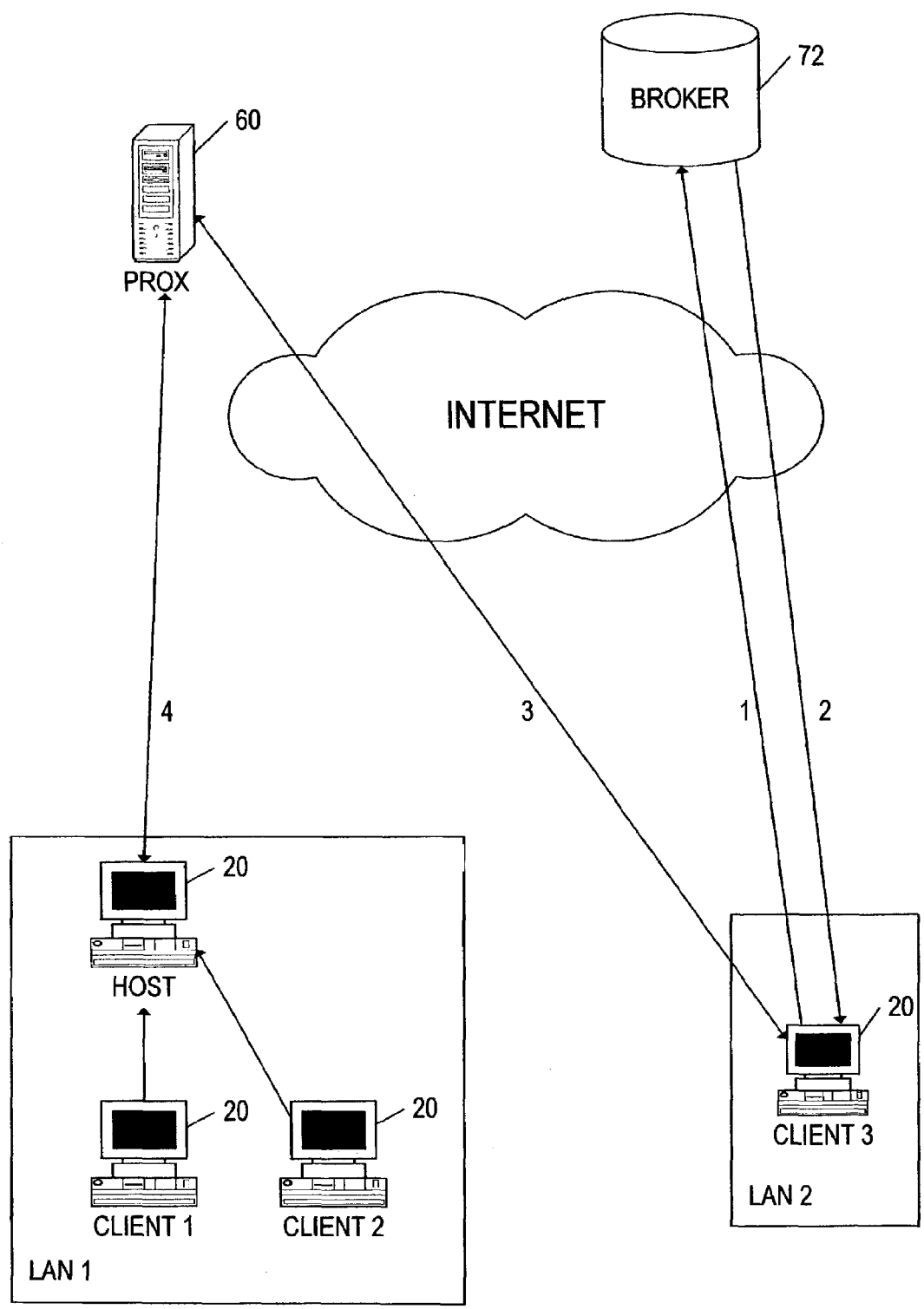
FIG. 54 illustrates a broker for facilitating contact lists using user-selected names and organizing member information and files in accordance with an embodiment of the present invention.
Figure 55:
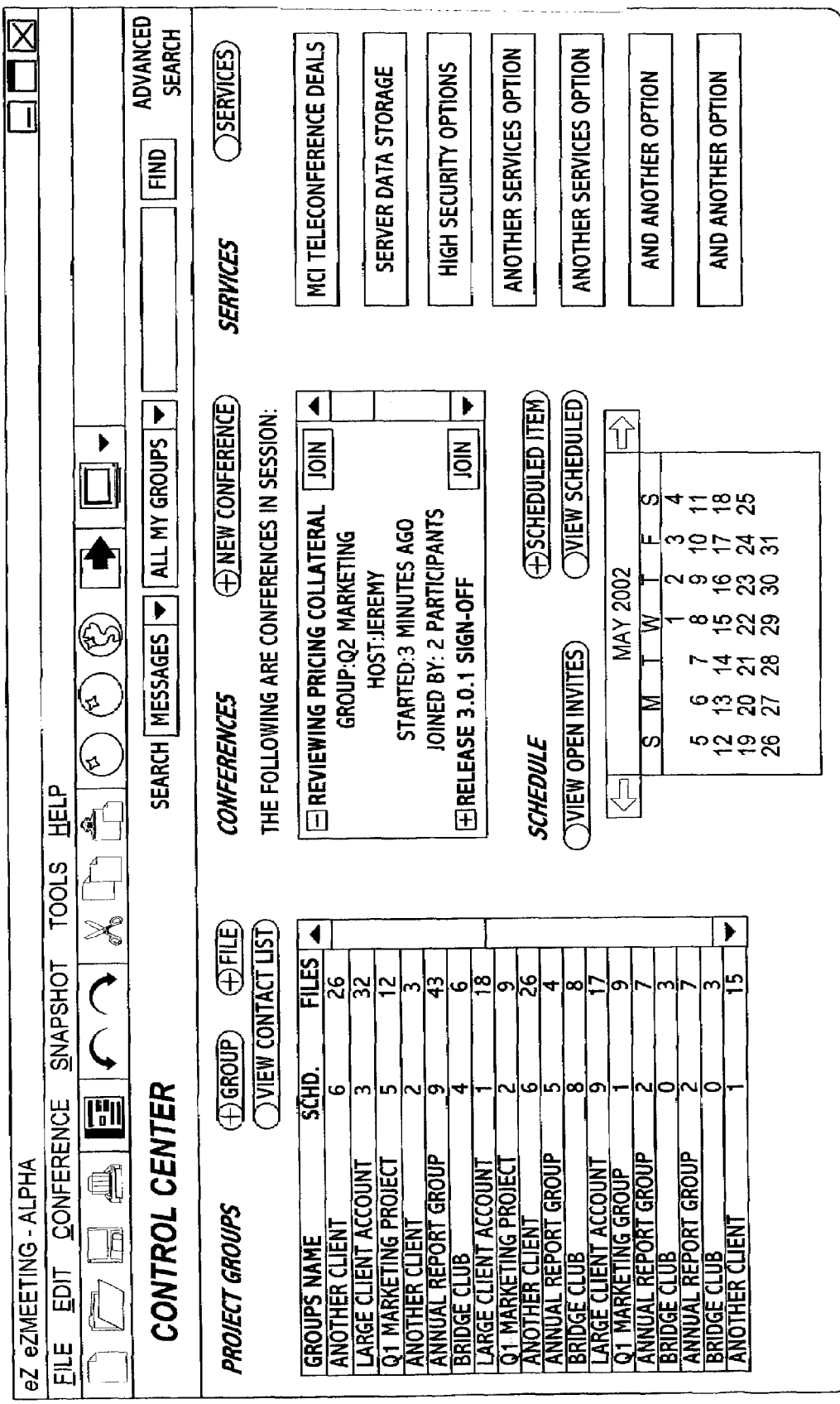
Figure 59:
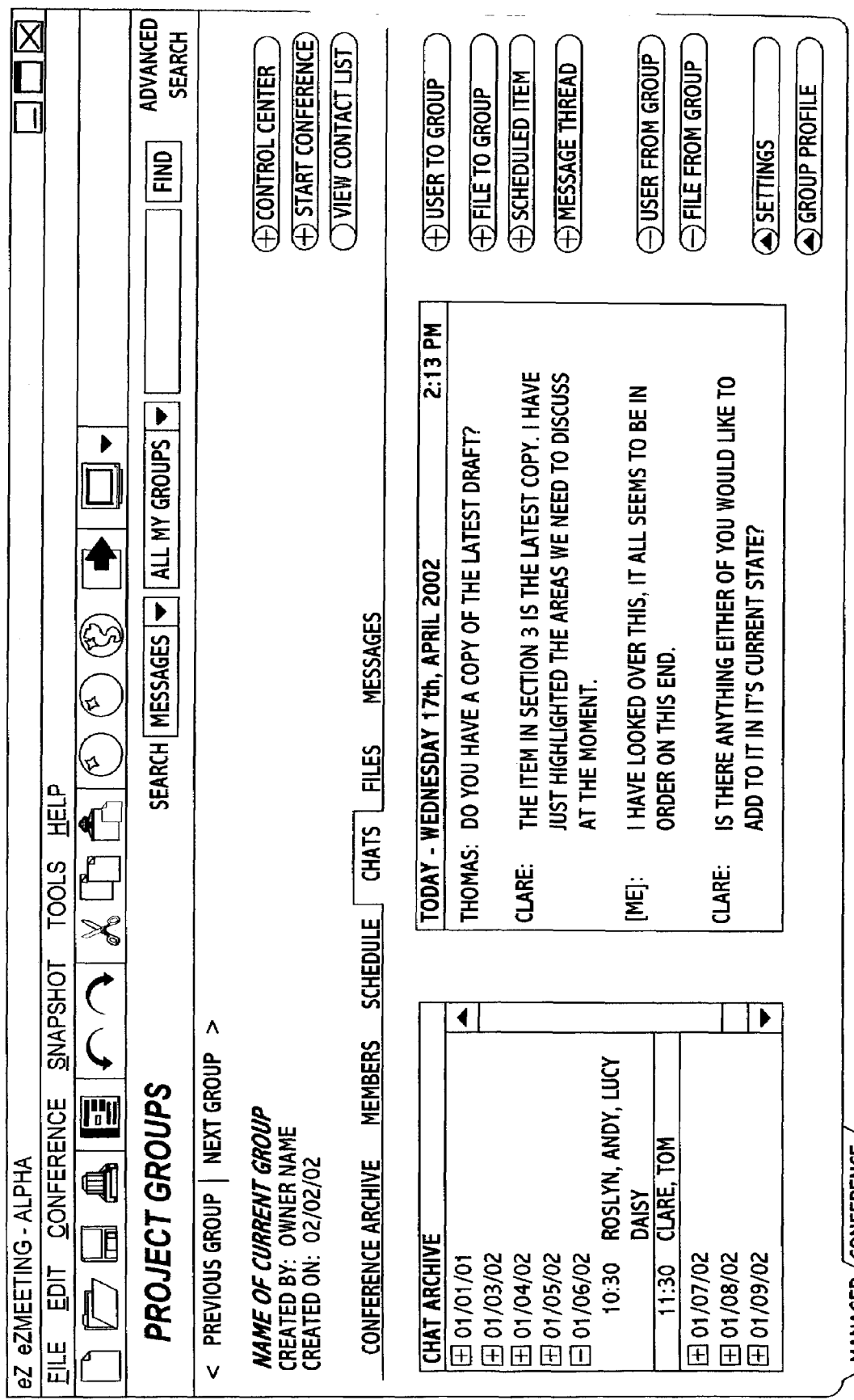
Figure 67:
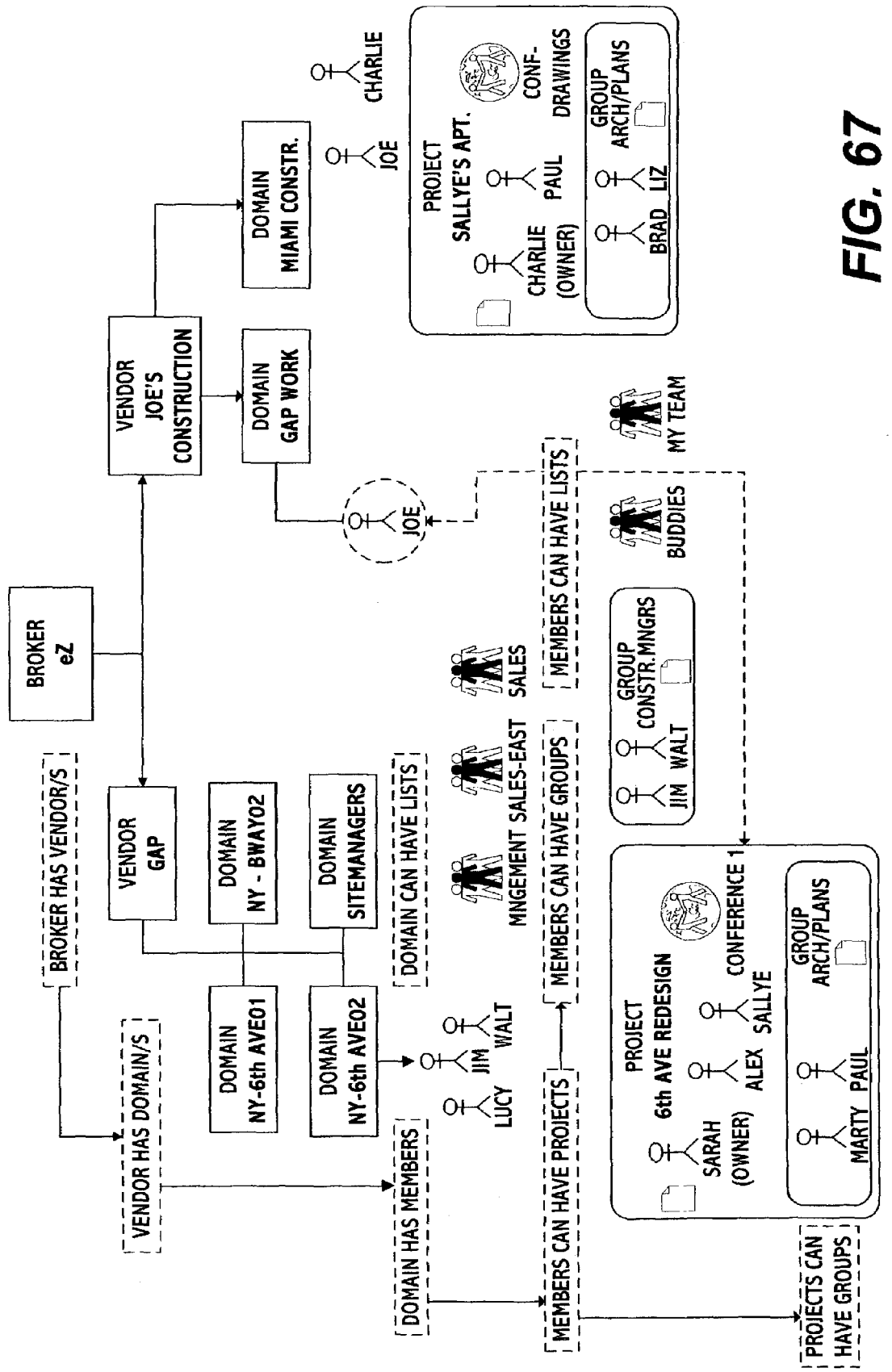
FIGS. 67-69 are block diagrams illustrating establishment of domains in accordance with an embodiment of the present invention.
Figure 68:
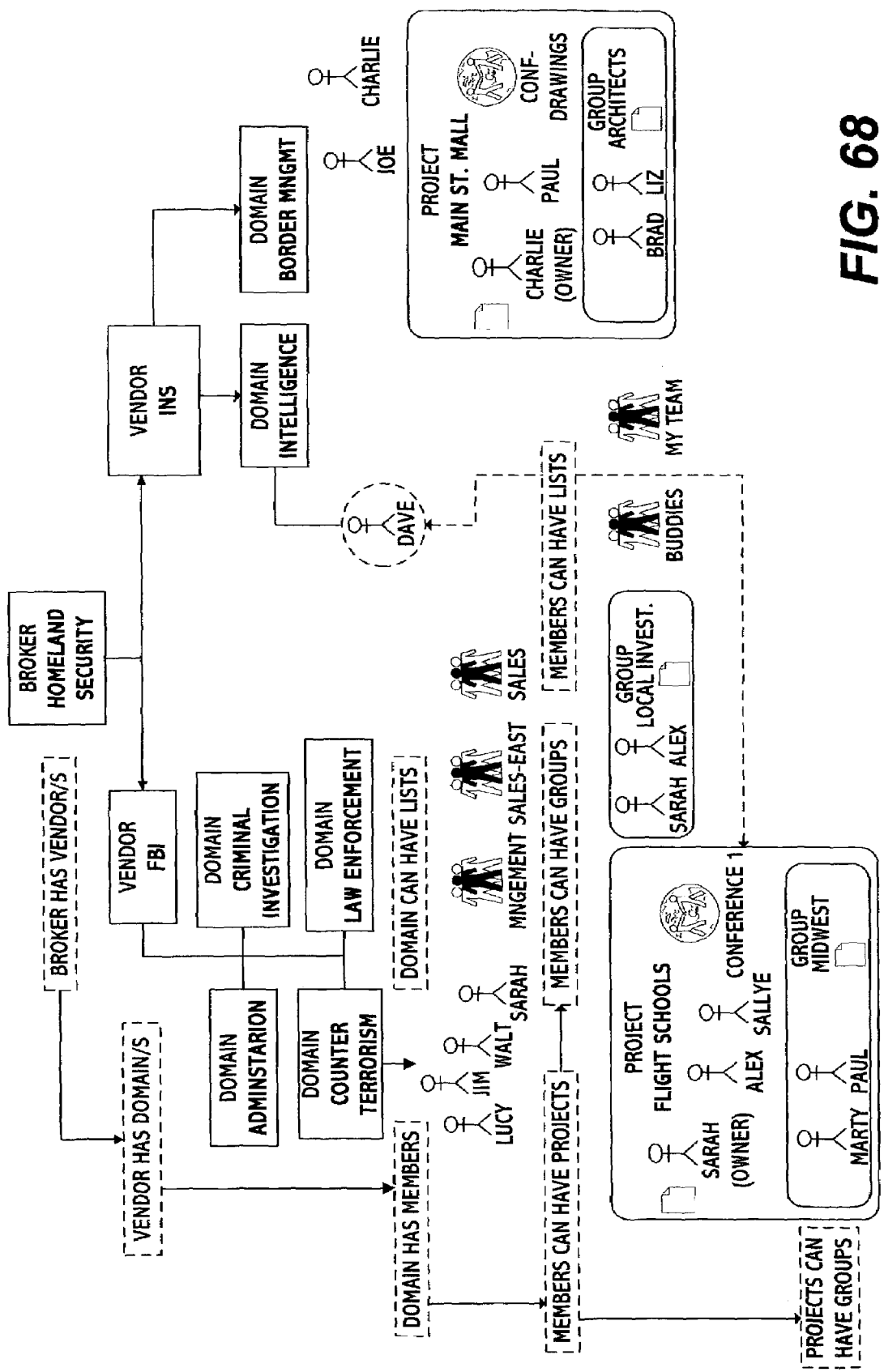
Figure 69:
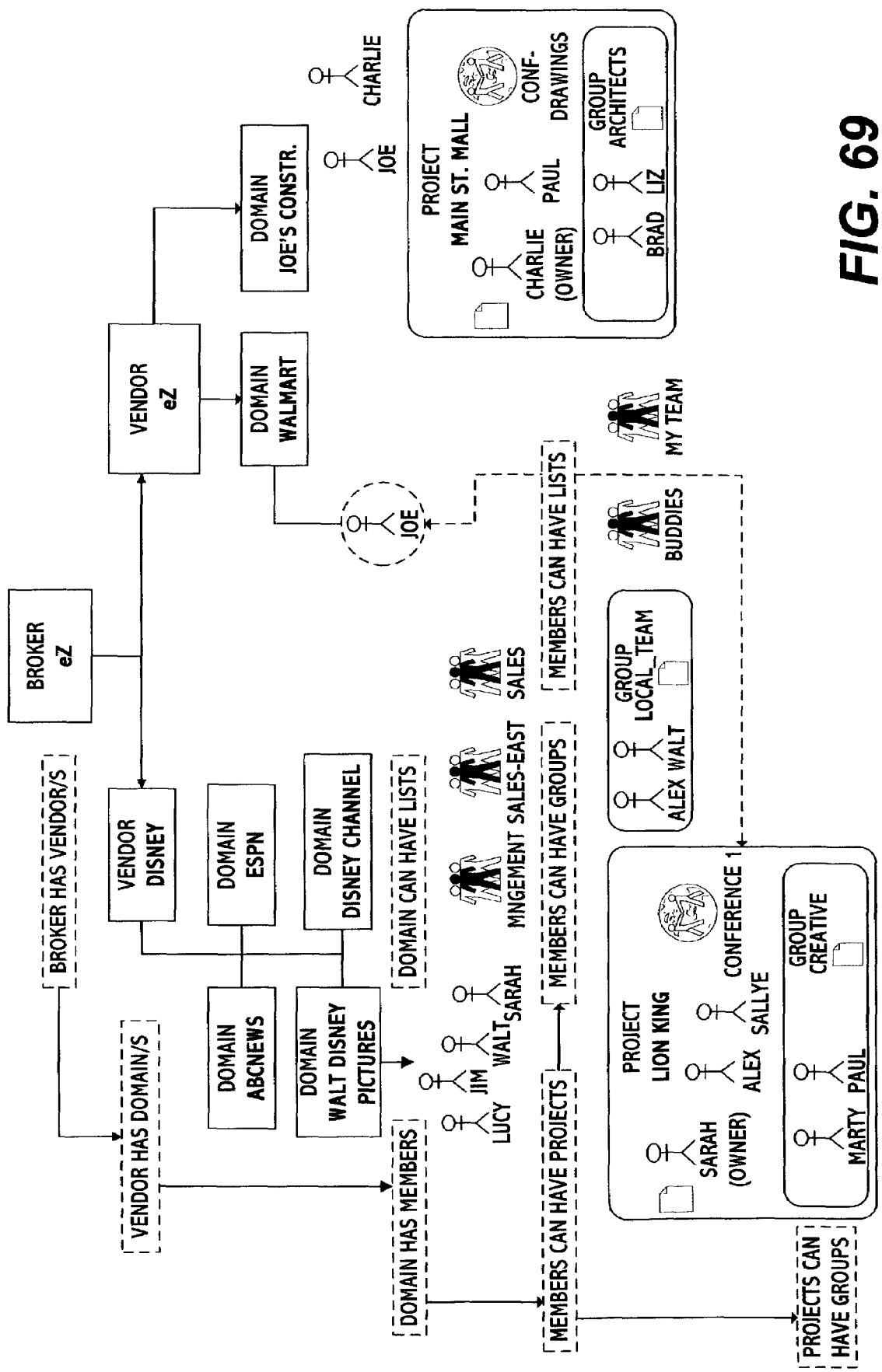

In accordance with another embodiment of the present invention, the P2P architecture operates in conjunction with a broker 72 (e.g., a server), as illustrated in FIG. 54. Using aliasing and instant messaging, a broker 72 can negotiate connections between peers, organize information about members and organize documents that are shared, as well as enable a "friendly name space" and provide a repository for members' addresses to facilitate updating connection data. These operations are illustrated in FIGS. 55-61. In addition, users (i.e., hosts and clients) can maintain contact lists, restrict access to conferences (e.g., via passwords) and set individual permissions based on groups (e.g., limit which members can markup, save or print a shared file), as illustrated in FIGS. 62-66. With reference to FIGS. 67-69, the P2P architecture of the present invention can employ a broker 72 to allow clients to be members of an organizational domain, of different groups, of different projects and so on.

With continued reference to FIG. 54, client 1 requests a connection with host from a broker. The Broker 72 returns the IP and port of the proxy and the local information for the host (i.e., either the local IP and port or port and gateway). Client 3 connects to the proxy. The proxy then connects to the host to complete a triangulated path. Client 3 is then given a list of meetings to join or host and then selects a meeting.

Figure 61:
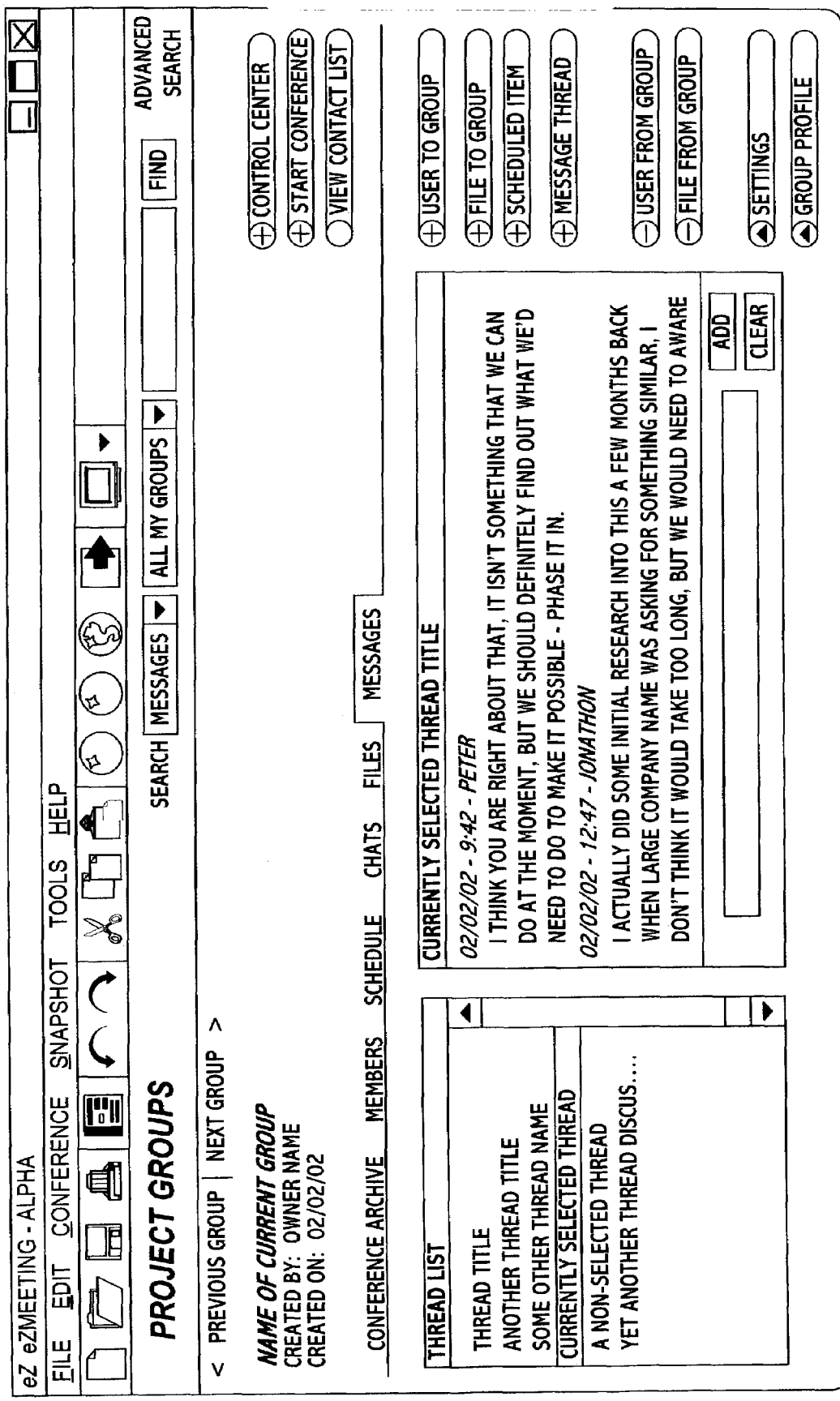

The exemplary screens illustrated in FIGS. 55-61 can be generated at the broker 72. The screen in FIG. 55 allows a user connected to the broker 72 to perform administrative operations such as oversee conferences in session, to schedule and establish a new conference and view project groups, which will be described below in connection with FIGS. 67-69. As shown in FIG. 56, a conference archive for a particular group can be viewed, as well as a list of its members (FIG. 57), and scheduled conferences for that group and invitee information (FIG. 58). The administrative software and corresponding provided to the broker 72 can also allow a user to view current and archived chats (FIG. 59), a list of files that can be shared within the group (FIG. 60), as well as messages between group members (FIG. 61).

Figure 62:
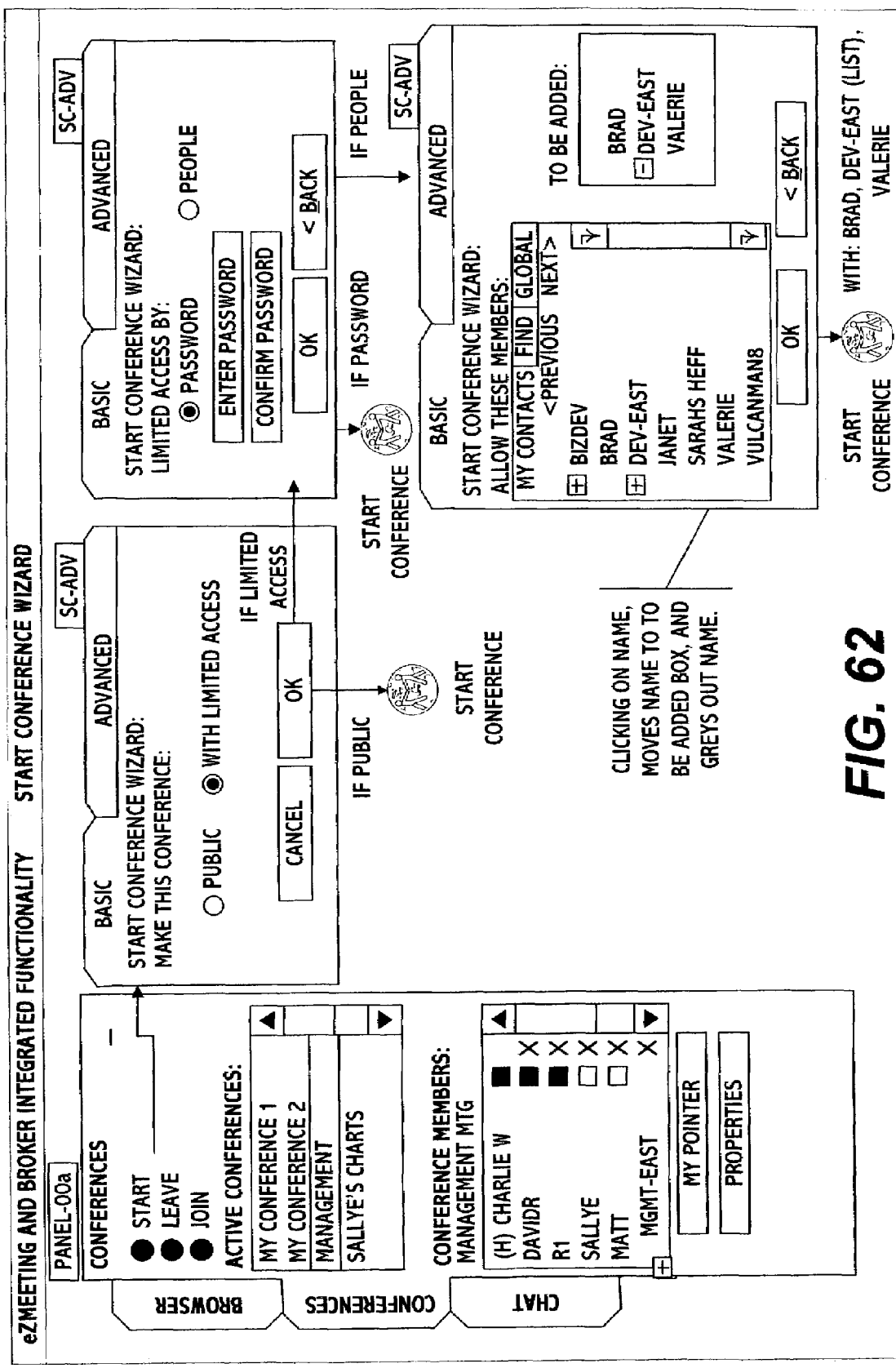
FIGS. 62-66 are exemplary user interface screens generated at a client to maintain contact lists and set individual permissions in accordance with an embodiment of the present invention.
Figure 63:
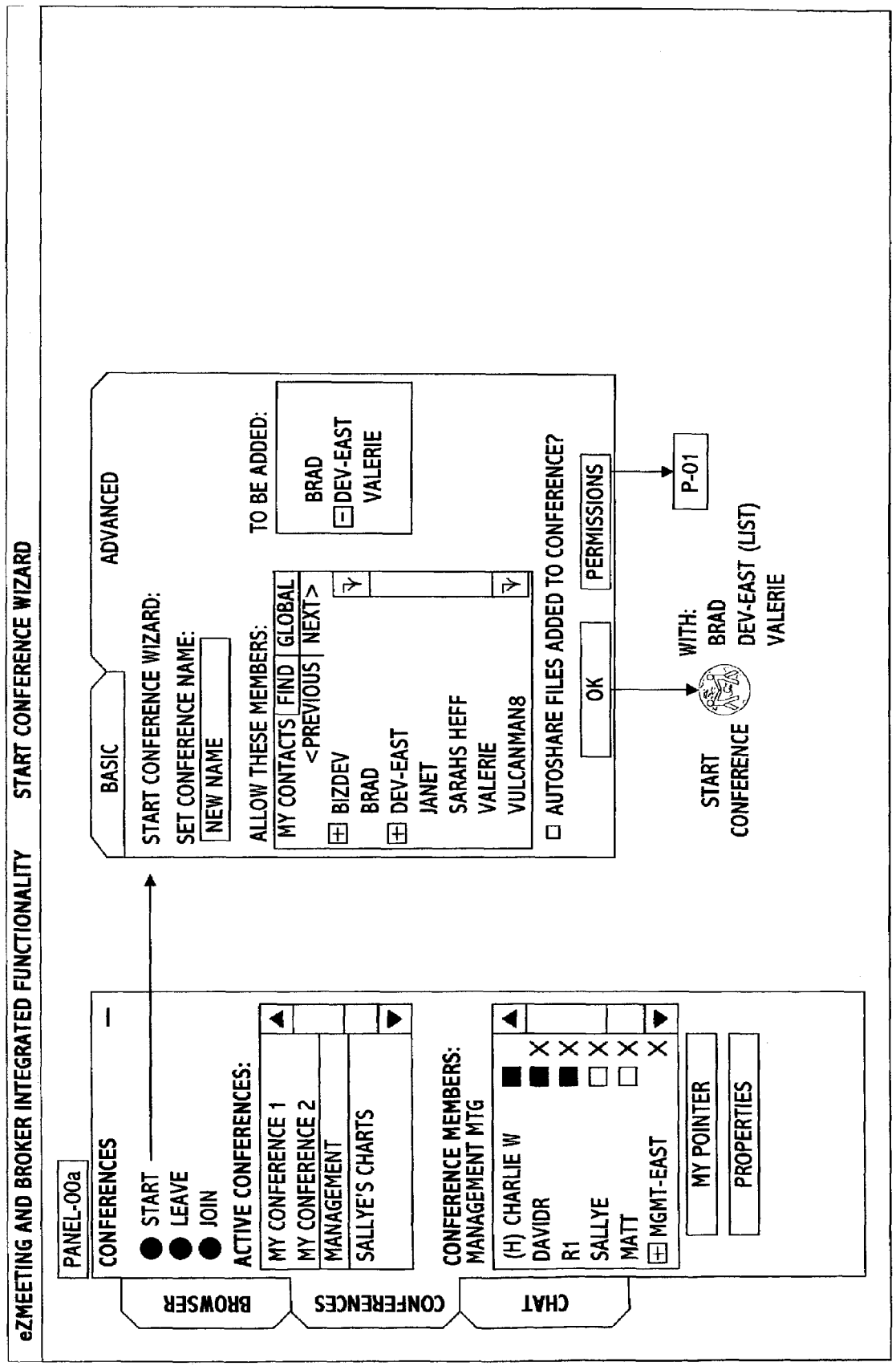
Figure 64:
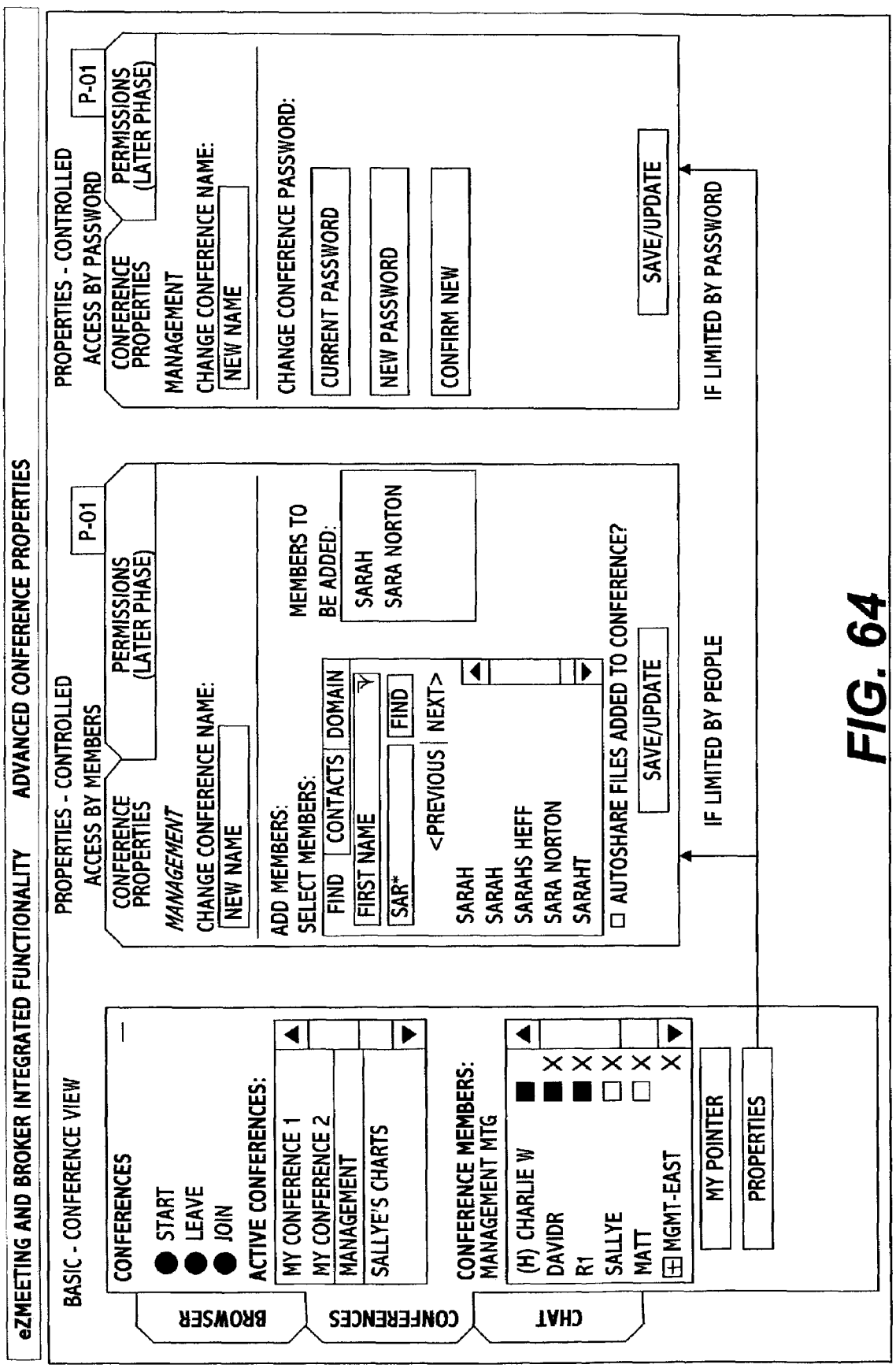
Figure 65:
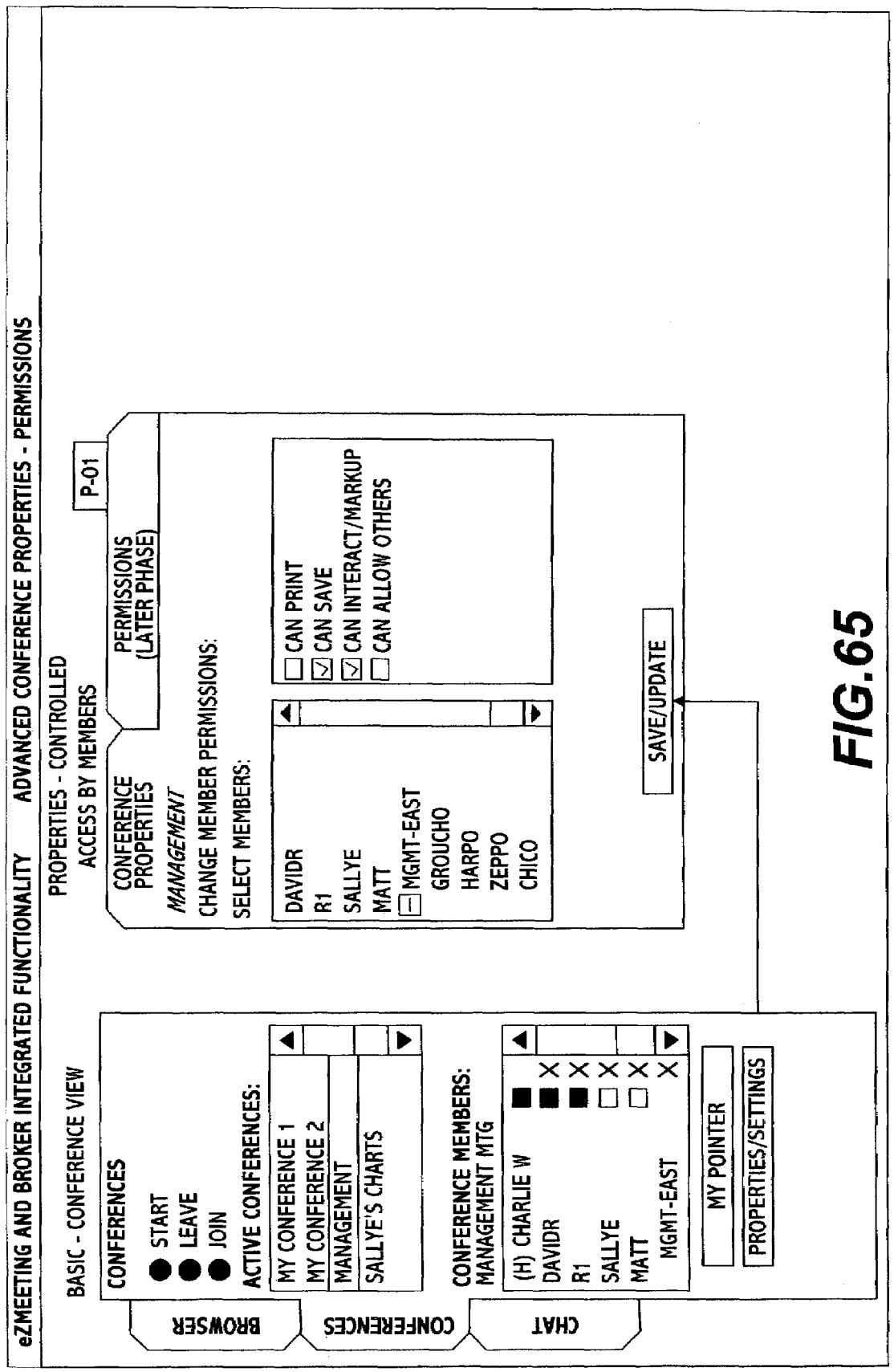
Figure 66A:
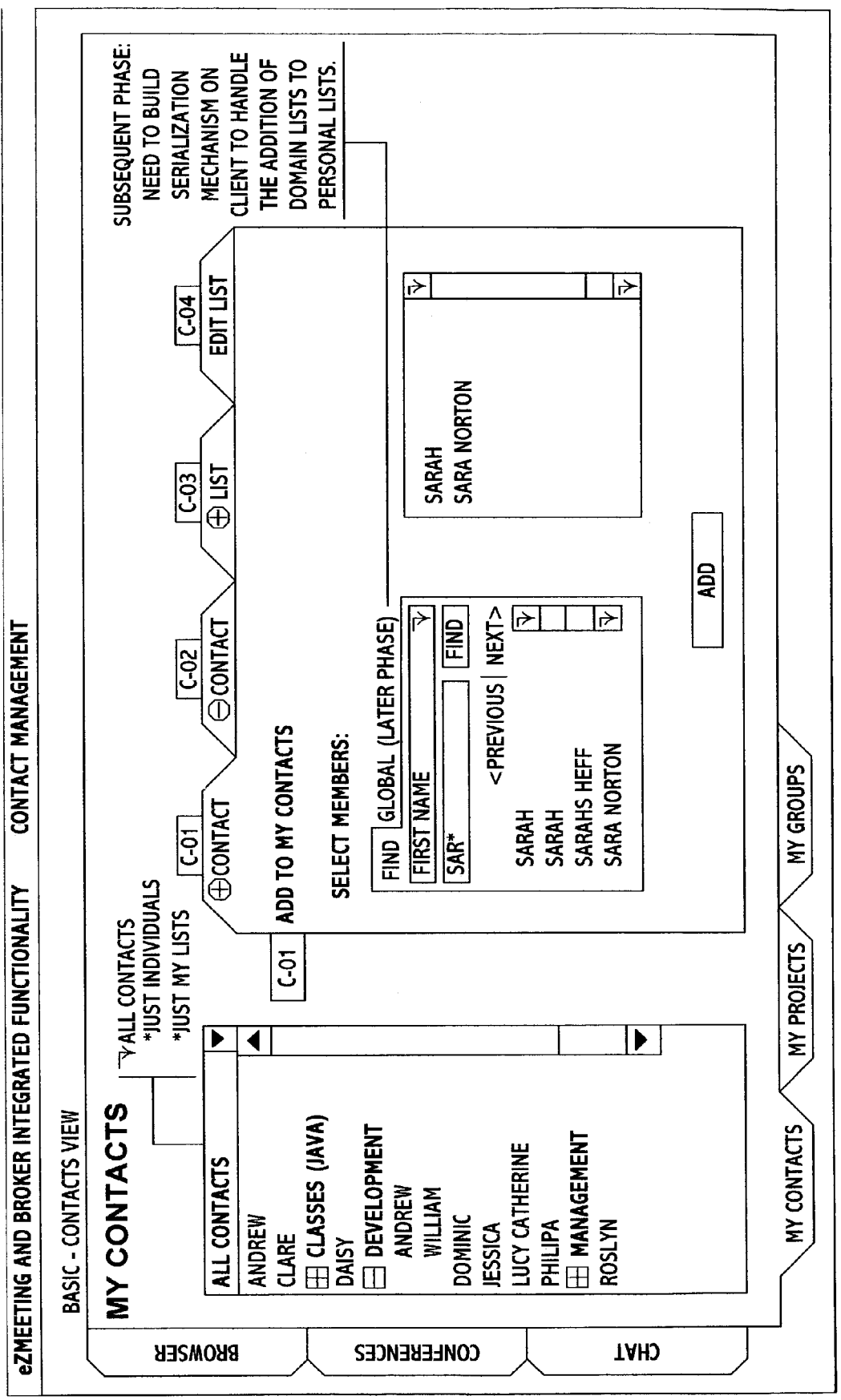

The expanded functionality afforded the P2P architecture of the present invention via support by a broker 72 allows for client screens such as the exemplary screens illustrated in FIGS. 62-66. A client 20, for example, can view active conferences and members, as well as start a conference among users selected from a contacts list, including limiting access, if desired, via a password (optional) (FIGS. 62 and 63). Conference properties can be modified and saved by the user, as illustrated by the user interface screen in FIG. 64. A user can set permissions of conference members, as illustrated in FIG. 65. Further, as shown in FIG. 66, a user can manage their contacts list, including, but not limited to, adding members and editing and deleting contact information. In addition to maintaining contacts information, the screen(s) exemplified in FIG. 66 can also allow a user to view domains (e.g., FIGS. 67-69), as well as information on projects and groups to which the user belongs.

As stated previously, the broker 72 allows users to be members of one or more organizational domains, of different groups, of different projects and so on. For example, different organizations (e.g., companies) can each have a separate domain through which data can flow essentially in-house and not through an outside server such as the broker 72. Thus, members of the domain can connect to the outside server 72 to contact clients connected within the P2P system of the present invention; however, members can also connect to and exchange information within a domain to the exclusion of non-domain members. As depicted in FIGS. 67-69 using different types of users and companies for illustrative purposes, the broker 72 has different vendors, which can each have one or more domains associated therewith. Domains can, in turn, each have members and lists. In addition, members of a domain can be organized in terms of lists, projects and groups. Further, projects can have groups and lists, and so on.

Figure 70:
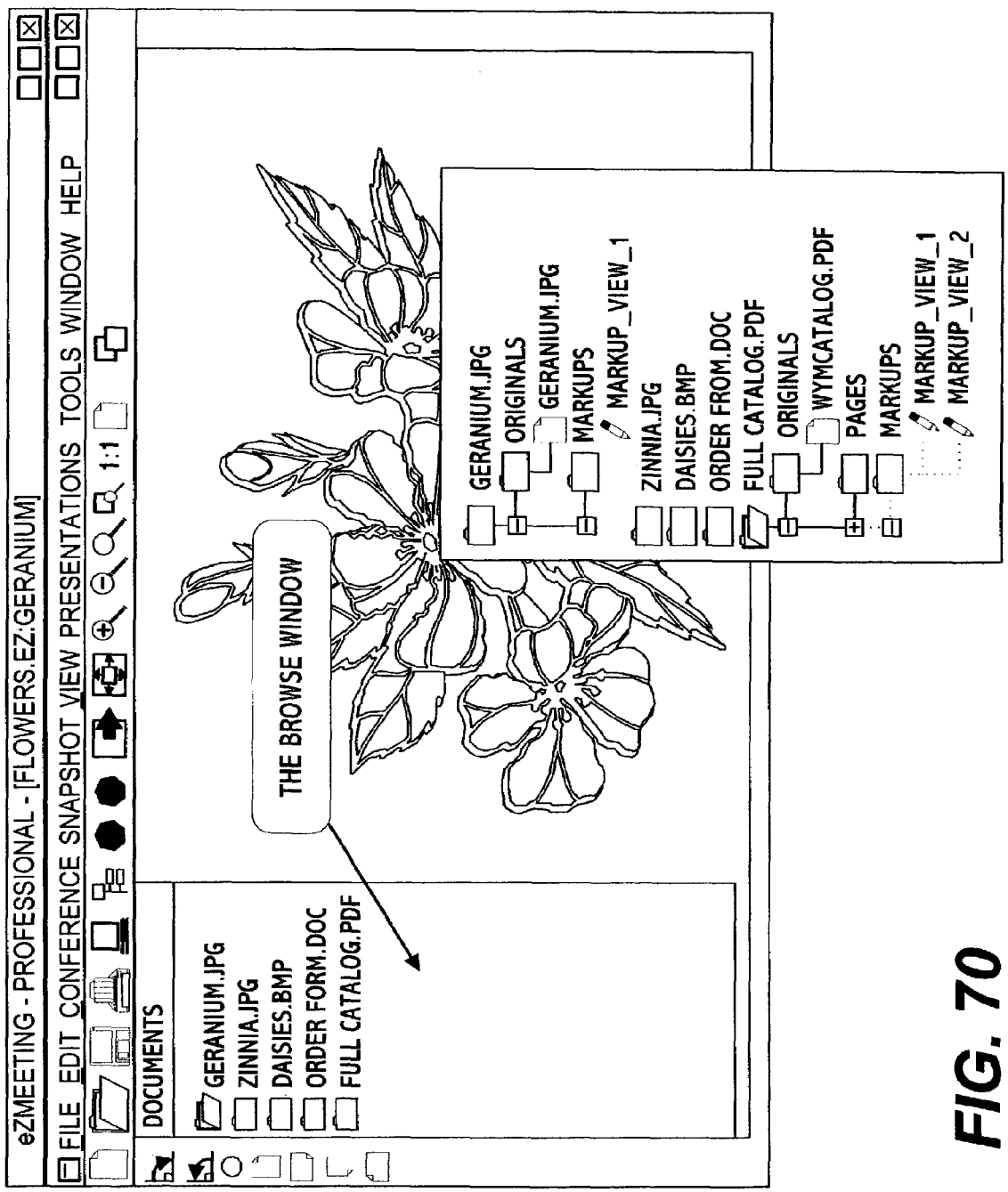
FIG. 70 is an exemplary user interface screen illustrating use of compound files in accordance with an embodiment of the present invention.

Regardless of whether a server 70 (e.g., a broker 72) is used, the P2P architecture of the present invention is advantageous in that is provides for information organization, among other reasons. For example, the collaboration application 30 allows a user to collect different types of information (e.g., a .pdf file, a web page, a Word document, spreadsheets, photographs and so on) and assemble it in a single compound file based on, for example, Windows compound file technology. The compound file can then be presented, for example, as a Power Point file, allowing a user to point and click to different information and present it as a slideshow. Thus, users can save items to be discussed during a meeting in one eZ compound file. Files opened during the meeting, or any data captured on the computer screen of any of the participants, can be inserted in the original eZ compound file at the document owner's computer. eZmeeting's browse function, as illustrated in FIG. 70, allows meeting participants to explore parts of each item in the compound file, flip through the items' pages, and present a fully interactive slideshow using a variety of data. The Browse window in FIG. 70 lists the items in the compound file. Users can select items from the list for display in the display window of the collaboration application 30 on the client computer 20. When conferencing, every participating client's window is updated to reflect changes.

Figure 71C:
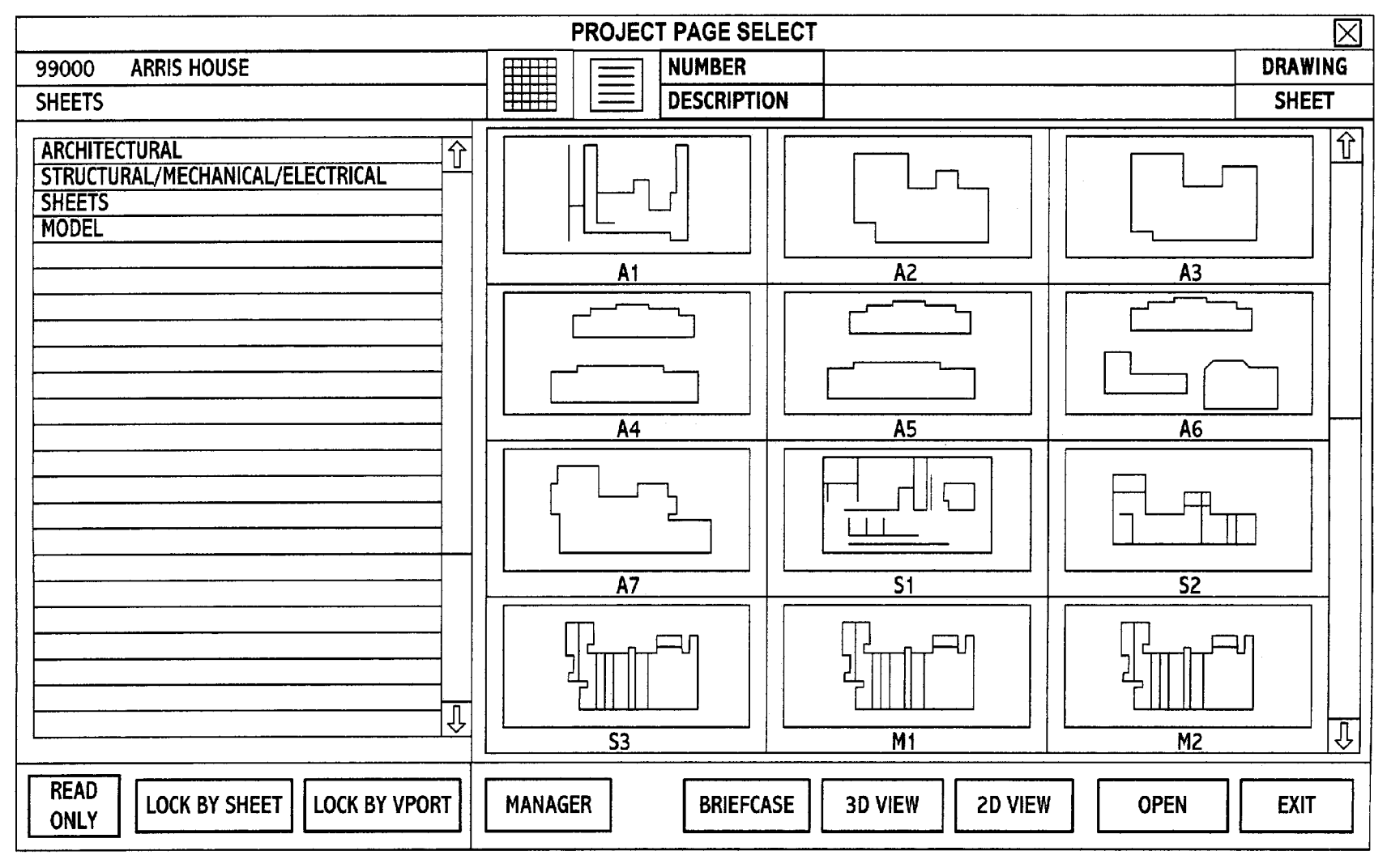
Figure 72:
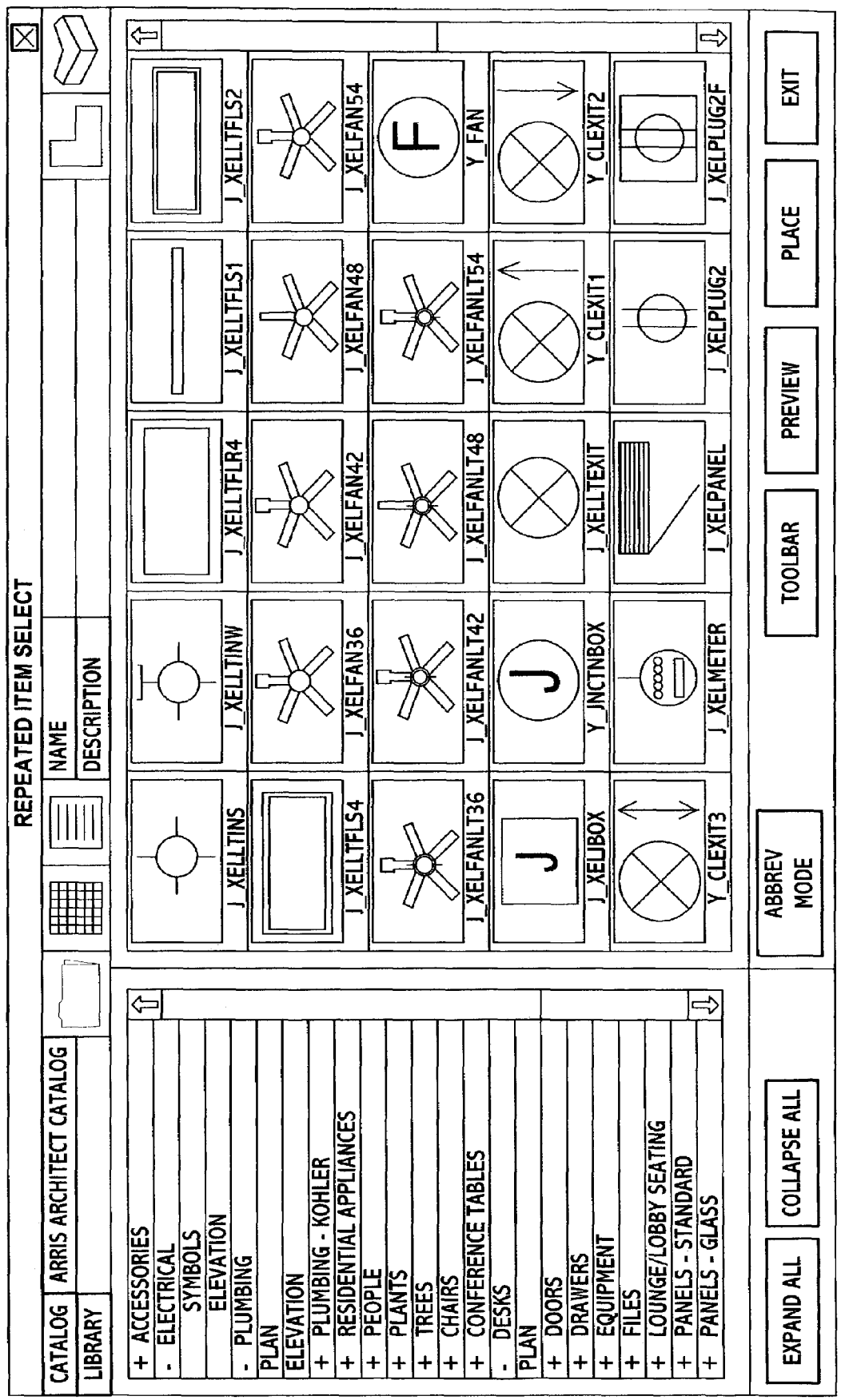

In addition, the collaboration application 30 allows a user to use thumbnails to facilitate navigation of data. For example, data can be saved by a client 20 under projects with descriptive names (FIG. 71A). Once a project is selected, a descriptive category list is shown (FIG. 71B). For any selected category, thumbnails are shown of the items in that category (FIG. 71C). The exemplary screen in FIG. 72 provides another method of organizing data using thumbnails. Items can be listed in more than one category, and under more than one project, even though they exist in only one location on the hard drive. The thumbnails therefore provide a visual reference to the data.

The P2P architecture of the present invention is advantageous because it provides a simple and appealing interface for users that is created in software than can be executed on a personal computer, a PDA/handheld device, a cell phone, a digital camera, among other types of programmable devices. The collaboration application 30 allows that device to become a universal viewer of essentially any type of data and provides for sharing of the data and manipulation of data via control commands between users connected via the software of the present invention. Only visual copies of the data files are provided to the users in temporary memory to maintain security and integrity of the data. Markups and annotations can be performed in raster and vector formats.

Although the present invention has been described with reference to preferred embodiments thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A collaboration application for a computer for direct transmission of electronic files, interactive collaboration and simultaneous multi-file support with other conference participant computers comprising:
 a conference engine configured to maintain connections in a decentralized manner using peer-to-peer network channels without requiring a server and to coordinate connections between said computer and other said conference participant computers for concurrent communication with said conference participant computers via transmission of command messages that identify said network channels based on sockets and concurrent collaboration on documents hosted by said conference participant computers, said conference engine comprising a conference module and socket module, said conference module being a thread manager operable to queue events and requests transmitted between said conference participant computers when operating as participants of different conferences on first-come-first served basis, and to manage commands, routing controls, user controls and conference-joining controls generated by said conference participant computers to support simultaneous multi-hosting and multi-conferencing that allows said computer to operate as both a conference participant and a host simultaneously when desired by a user, to host plural conferences simultaneously, and to participate in multiple conferences simultaneously as a non-host participant, said socket module being a multi-threaded TCP/IP socket manager that uses sockets to allow bi-directional communication between two of said conference participant computers that are identifiable via respective IP addresses and that supports socket messages selected from the group consisting of create, destroy, read, write, connect, close, receive, send, accept, binding, password authentication; and
 a universal viewer engine for supporting different file types and corresponding file operations during conferences between said computer and other said conference participant computers, said different file types comprising both raster-type files and vector-type files and including common file types and proprietary file types, said viewer engine comprising a platform that is configured to interface with an operating system, a display device and a disk input/output device of said computer, said universal viewer engine comprising a read-write-display or RWD module operable to provide codes for said different file types to allow the opening and display of said documents using another resident application to obviate the need to preconfigure said computer prior to said conference to open said different file types hosted and shared during said conference;
 wherein, when said computer operates as a nonowner conference participant computer, said conference engine temporarily stores a file owned by another computer, prevents printing or saving the file, and deletes the file when corresponding conference connections are terminated.

2. A collaboration application as claimed in claim 1, wherein said universal viewer engine comprises a CAD engine to read, write, display, and manipulate three-dimensional objects in one of said documents.

3. A collaboration application as claimed in claim 1, wherein said universal viewer engine comprises a rendering module that supports a file compare function and mark-up tools for marking up at least one of said documents during a conference.

4. A collaboration application as claimed in claim 3, wherein said rendering module is operable to overlay mark-ups over said document at said conference participant computers in real-time and dynamically.

5. A collaboration application as claimed in claim 4, wherein said rendering module is operable to add markups and notes to said document that are generated via said conference participant computers during a conference and store said markups and said notes in a compound conference file.

6. A collaboration application as claimed in claim 1, wherein said universal viewer engine comprises a vector reader to open and display vector-type files during a conference and provides additional functions related to vector data from said vector-type files selected from the group consisting of turning layers on and off, setting background and foreground colors, comparing, intersecting, and advanced navigation, additional functions related to three-dimensional models selected from the group consisting of sectioning through the model, opacity, transparency, wireframe, ghosting, rotation, saving views, and advanced navigation), and additional functions related to PDF documents selected from the group consisting of navigation and mark up of multi-page PDF documents.

7. A collaboration application as claimed in claim 1, wherein said conference engine is configured to assemble different types of information into a compound file, said information being selected from the group consisting of a PDF file, a word processing document, a spreadsheet file, a graphical image, a digital photograph, a vector-two-dimensional drawing, a geometric-three-dimensional model, a raster image, and a vector image, and transmit said compound file from a first one of said conference participant computers operating as its host to at least one of the other said conference participant computers, said compound file being a source file copy from said host, said host being an owner-in-control of said compound file and the other said conference participant computers being nonowners; and when said computer operates as a nonowner conference participant computer, said conference engine temporarily stores a compound file assembled by another computer, prevents printing or saving the compound file, and deletes the compound file when corresponding conference connections are terminated.

8. A collaboration application as claimed in claim 7, wherein said universal viewer engine comprises a raster reader to open and display raster format files during a conference, maintains said different types of information in said compound file as individual elements, said different types of information comprising at least two of raster bitmap, vector drawing, computer aided design (CAD) data, a three-dimensional (3D) model, and a PDF document, and allows said conference participant computers to mark up at least one of the elements and save it in a single file.

* * * * *